(12) United States Patent
Lee et al.

(10) Patent No.: US 9,350,944 B2
(45) Date of Patent: May 24, 2016

(54) CONNECTING TO AN ONSCREEN ENTITY

(71) Applicant: QUALCOMM Incorporated, San Diego, CA (US)

(72) Inventors: Arthur Chung-Hao Lee, San Diego, CA (US); Mark A Lindner, Superior, CO (US)

(73) Assignee: QUALCOMM Incorporated, San Diego, CA (US)

( * ) Notice: Subject to any disclaimer, the term of this patent is extended or adjusted under 35 U.S.C. 154(b) by 196 days.

(21) Appl. No.: 13/969,719

(22) Filed: Aug. 19, 2013

(65) Prior Publication Data

US 2014/0055553 A1   Feb. 27, 2014

Related U.S. Application Data

(60) Provisional application No. 61/692,812, filed on Aug. 24, 2012.

(51) Int. Cl.
*H04N 7/15* (2006.01)
*G06K 9/00* (2006.01)
*H04W 4/20* (2009.01)

(52) U.S. Cl.
CPC .............. *H04N 7/15* (2013.01); *G06K 9/00288* (2013.01); *G06K 9/00295* (2013.01); *G06K 9/00979* (2013.01); *H04W 4/206* (2013.01)

(58) Field of Classification Search
USPC ..................................................... 348/14.07
See application file for complete search history.

(56) References Cited

U.S. PATENT DOCUMENTS 5,412,738 A *  5/1995  Brunelli ............... A61B 5/1176
                                                                  382/115
7,231,205 B2   6/2007  Guyot et al.
(Continued)

FOREIGN PATENT DOCUMENTS

EP      2237533 A1   10/2010
GB   2 380 080 A    3/2003
(Continued)

OTHER PUBLICATIONS

International Search Report and Written Opinion—PCT/US2012/065358—ISA/EPO—Apr. 15, 2013.
(Continued)

*Primary Examiner* — Amal Zenati
(74) *Attorney, Agent, or Firm* — The Marbury Law Group, PLLC

(57) ABSTRACT

A method for identifying unknown third parties appearing within video call data based on generated image characteristics data. A user's computing device and a participant computing device may exchange and render video call data in which the user's computing device may display the unknown third-party. The user's computing device may generate image characteristics data based on selected imagery. The user's computing device may compare the image characteristics data to stored contact information on the user's computing device to find a match, and may transmit the image characteristics data to the participant computing device for comparison with local stored information stored. The participant computing device may transmit a report message to the user's computing device indicating whether a match is found. In an embodiment, a server may transmit the facial data to other devices for comparison. In another embodiment, the user's computing device may request contact information from participant computing devices.

83 Claims, 18 Drawing Sheets

(56) References Cited

U.S. PATENT DOCUMENTS

| | | |
|---|---|---|
| 7,847,815 B2 | 12/2010 | Patel et al. |
| 2002/0183052 A1 | 12/2002 | Tachikawa |
| 2003/0031210 A1 | 2/2003 | Harris |
| 2003/0145064 A1 | 7/2003 | Hsu et al. |
| 2006/0063539 A1 | 3/2006 | Beyer, Jr. et al. |
| 2006/0259755 A1 | 11/2006 | Kenoyer |
| 2007/0004426 A1 | 1/2007 | Pfleging et al. |
| 2007/0078965 A1 | 4/2007 | Shimamura et al. |
| 2007/0094409 A1 | 4/2007 | Crockett et al. |
| 2007/0117576 A1 | 5/2007 | Huston |
| 2007/0142091 A1 | 6/2007 | Gasborro et al. |
| 2007/0188598 A1 | 8/2007 | Kenoyer |
| 2008/0076418 A1 | 3/2008 | Beyer, Jr. |
| 2008/0132243 A1 | 6/2008 | Spalink et al. |
| 2009/0268009 A1* | 10/2009 | Oya ............... H04L 12/1822 348/14.09 |
| 2010/0149305 A1 | 6/2010 | Catchpole et al. |
| 2011/0074911 A1* | 3/2011 | Khouri ............... H04N 7/147 348/14.08 |
| 2013/0331130 A1 | 12/2013 | Lee |

FOREIGN PATENT DOCUMENTS

| | | |
|---|---|---|
| WO | 2007048131 A1 | 4/2007 |
| WO | 2009077852 A1 | 6/2009 |
| WO | 2009099364 A1 | 8/2009 |
| WO | 2010022756 A1 | 3/2010 |
| WO | 2012046425 A1 | 4/2012 |

OTHER PUBLICATIONS

International Search Report and Written Opinion—PCT/US2013/055812—ISA/EPO—Dec. 4, 2013.

* cited by examiner

480

```
//Find the unknown party based on facial data
facial_data;
user_contacts = get_contacts(user);

match = compare(facial_data, user_contacts);

//if no match, check contact info of participants of video call
if(match == NO)
{
        //get list of video call participants aside from user
        participants[] = get_participants();

//check contact info of each participant
        for(selected_prt in participants)
        {
                //get list of contacts for selected participant
                partcipant_contacts = get_contacts(selected_prt);

//any match the facial data?
                match = compare(facial_data, participant_contacts);
                if(match == YES)
                { finish();}
        }

//check contact info of each participant's contacts (e.g., "descendants")
        for(selected_prt in participants)
        {
                //get list of contacts for selected participant
                partcipant_contacts = get_contacts(selected_prt);
                for(descendant in participant_contacts)
                {
                        sel_descendant_contacts = get_contacts(descendant);

//any match the facial data?
                        match = compare(facial_data, sel_descendant_contacts);
                        if(match == YES)
                        { finish();}
                }
        }

}
else
{
        //user's contact list contains the unknown party!
        finish();
}
```

FIG. 4C

CONNECTING TO AN ONSCREEN ENTITY

RELATED APPLICATIONS

The present application claims the benefit of priority to U.S. Provisional Application No. 61/692,812, entitled "Method for Connecting to an Onscreen Entity" filed Aug. 24, 2012, the entire contents of which are hereby incorporated by reference.

BACKGROUND

Video calling provides an efficient manner for remote participants to convey ideas visually with each other. Typically, participants to a video call (or video conversation) may position their video streaming camera in such a way that non-participants may also be represented in the streaming video imagery (or video feed). For example, the participant may be video chatting while riding in a public bus or sitting in a restaurant. In such situations, a user may see an unknown third-party within imagery of the video call that the user may wish to identify and potentially invite to participate in the video call. Heretofore, participants have relied upon a manual process that involves the video call user explicitly asking the video call participant on the other end of the video call to identify the third-party and possibly provide contact information for the third-party.

SUMMARY

Using the various embodiments, a computing device may be configured to automatically identify unknown third parties represented by facial or other image data with a video call or a video image captured by the computing device using facial recognition or other image data recognition techniques or methods, and distributed contact databases. In response to detecting a user input selecting a portion of a displayed image of the video call or other image that encompasses an unknown third-party's face, the user's computing device may analyze the imagery to generate facial or other image characteristics data (or "facial/other characteristics data") suitable for use in facial or other image recognition algorithms. The user's computing device may compare the facial/other characteristics data to locally stored contact information, such as in an "address book" database, and determine whether there is a match. If there is a match, the contact information may be presented to the user.

If the facial/other characteristics data does not match a local contact, the user's computing device may transmit the facial/other characteristics data to a participant computing device associated with another video call participant (e.g., the computing device close to where the unknown third-party appeared in the video call) for comparisons with that device's stored contact information. If a match is detected, the corresponding contact information is returned to the first user's computing device.

If no match is detected by the participant computing device, the process may be repeated with computing devices of other participants in the video call. If no match is detected within the contact databases of the video call participants, a call participant computing device may forward the facial/other characteristics data to a computing device of an individual relatively close (in terms of distance and/or organization) with a similar request for contact information. Again, if a match is detected, the third-party's contact information is forwarded to the first user's computing device.

These procedures may be repeated in a recursive fashion, with each computing device receiving the facial/other characteristics data and forwarding the data to computing devices of contacts within their respective address books until a match is reported to the originating user's computing device. In an embodiment, the originating some or all of the computing devices performing the embodiment methods may be mobile devices, such as a smartphone, tablet computer or laptop computer.

In various embodiments, the computing device may utilize information other than facial data to identify the unknown third-party. For example, the computing device be configured to perform recognition operations using other imagery within captured video/photography (e.g., symbols, patches, clothing, light signals, etc.), as well as individual features other than facial (e.g., head size, hair color, body dimensions, shoulder-to-head perspectives, tattoos, etc. As another example, the computing device may identify an unknown third-party based on analyzing sounds associated with the third-party, such as voice data and/or sound signals transmitted by a mobile device carried by the third-party.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 4C lists example pseudocode for accomplishing operations illustrated in FIGS. 4A and 4B.

DETAILED DESCRIPTION

Figure 1:
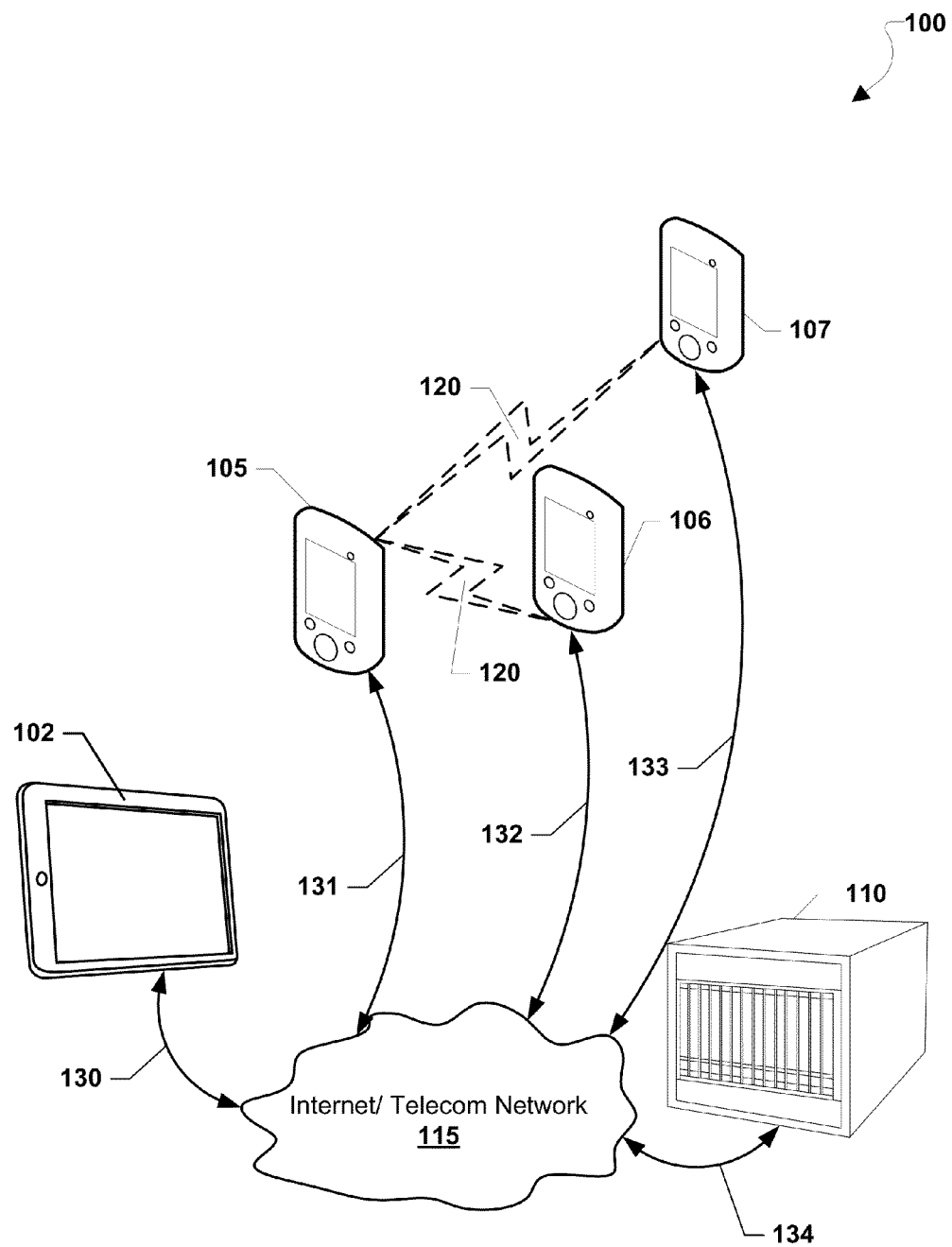
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "computing device" is used generally herein to refer to any computing device configured to perform operations of the various embodiments, including one or all of personal computers, cellular telephones, smart phones, personal data assistants (PDA's), laptop computers, tablet computers, smart books, palm-top computers, wireless electronic mail receivers, multimedia Internet enabled cellular telephones, and similar personal electronic devices which include a programmable processor, memory, and circuitry at least capable of sending and/or receiving wireless and/or wired data transmissions, accessing local or remote database structures, and configured to support a video call.

For the purposes of this disclosure, the term "participant" is used herein to refer to a person participating in a video communication exchange, including sending and/or receiving data related to the video call. For example, a participant may be any of the persons actively engaged in a group video call. All participants engaged in the video call may be known to each other (e.g., each participant may have identifying information of the other participants). The term "user" is used herein to refer to a video call participant who initiates (or originates) procedures to identify and obtain contact information for non-participant persons appearing within video imagery of a video call. The term "unknown third-party" is used herein to refer to a person appearing within the video imagery of a video call who is not a participant and who is unknown by the user. The unknown third-party may become known and engage in an established video call, however, for the purpose of consistency, may continue to be referred to as a third-party after becoming known to the user.

As the embodiments involve processes implemented on computing devices associated with the user, with other participants in the video call, with and third-parties, references to computing devices herein may identify the device with a particular one or type of individual for purposes of clarity. Thus, the terms "user computing device," "user's computing device" and "first computing device" refer to the computing device being used by the video call participant who initiates (or originates) procedures to identify and obtain contact information for non-participant persons appearing within video imagery of a video call. Similarly, the term "participant computing device" refers to the computing device being used by a participant on the video call, and the term "third-party computing device" refers to a computing device associated with a third-party."

The various embodiments provide methods for solving the inefficient manual process of discovering contact information for an unknown third-party appearing within the video imagery of a video call. By enabling a user's computing device to automatically identify an unknown third-party based on facial recognition data and intelligent database mining, the user's computing device may automatically add the third-party's contact information to an address book or contacts database, enable adding the third-party to the video call, and/or transmit messages to the third-party.

A video call (or video conversation) may involve two or more participants, located in two or more locations. For example, a group video call may include people located at opposite ends of an office building, in separate buildings, in different countries, etc. Each participant may join the video call by utilizing a computing device capable of capturing, displaying and exchanging video data, such as a smartphone, a laptop computer, or a tablet computing device. In an embodiment, the computing devices may connect in the video call using a common messaging application (or "app") which establishes real-time video streaming communication over a network data link.

As the video call proceeds, a user may see an unknown third-party on the video call imagery received from a participant computing device and rendered by the user's computing device. For example, the user may see within a streaming video feed that an individual has sat on the couch beside a current video call participant. If the user's computing device detects user input indicating the user has selected the image of the unknown third-party within the video call imagery, the user's computing device may initiate identification operations. For example, the user's computing device may begin identification routines in response to the user tapping the unknown third-party's image displayed on the touch screen display. The user's computing device may isolate the selection as an image file, and execute facial or other image recognition techniques or routines on the selected image to generate facial or other image characteristics data (referred to herein as "facial/other characteristic data") that may be used in searching contact information databases. In an embodiment, the user's computing device may include additional information with the generated facial/other characteristics data to supplement identification routines. For example, the user's computing device may detect unique characteristics of the third-party, such as emblems on clothing, and generate metadata describing the unique characteristics and delineating the search parameters based on the unique characteristics.

Images and video of the unknown third-party may also be obtained directly by a user taking a photograph or video of the individual with a camera of the computing device. Such direct images and audio data may then be processed in the various embodiments in manner similar to images obtained from a video call.

The user's computing device may use the generated facial characteristics data from the facial recognition analysis to discover similar data within information stored on the user's computing device. An example of such stored information may be an "address book" or any other database that contains contact identification information (e.g., names, addresses, phone numbers, email addresses, pictures, facial data, etc.). The stored information may also include information identifying or describing devices associated with various contacts, such as IP addresses of network-connected machines. The user's computing device may conduct look-up operations on the stored information, comparing the stored facial data (or images) of contacts with the generated facial/other characteristics data. For example, the user's computing device may compare the generated facial/other characteristics data from the facial recognition routine to digital pictures associated with a smartphone address book. If the user's computing device finds a match, the identity (and contact information) of the third-party may be provided to the user for contacting the identified individual, such as by adding that third-party to the on-going video call.

If there is no match in the stored information, the user's computing device may transmit the generated facial/other characteristics data to other sources for further searching. The user's computing device may continue the search based on the proximity of participants to the unknown third-party seen in the video call. For example, the user's computing device may first transmit the facial/other characteristics data to the participant computing device that captured the imagery of the unknown third-party. Proximity may be an important variable in expediting the search for the unknown third-party, as participants in the video call near to the unknown third-party may have a relationship or knowledge of the third-party. For example, the unknown third-party may be located near (or "co-located" with) the participant computing device because the unknown third-party and the participant are co-workers in the same office or department.

Each participant computing device receiving the generated facial/other characteristics data may perform the same analysis/comparison to information stored within their respective local contact databases to determine whether there is a match. If a matching contact is identified, the contact identity and contact information (e.g., IP address, phone number, etc.) may be transmitted to the user's computing device. If no match is found, each participant computing device may transmit the generated facial/other characteristics data to other computing devices, particularly devices whose contact information is obtained from the stored contact information within each respective participant computing device, which are referred to herein as "descendant computing devices." In this manner, the search process may fan out to innumerable devices in a recursive manner until a match is found.

Whichever computing device identifies a match for the unknown third-party, that computing device may report the contact information back to the original user's computing device, which may use the contact information to send communications to that third-party's devices. The user's computing device may transmit an email to the identified third-party's email address, an SMS text message to the third-party's mobile phone number, or another message or signal via a common application (e.g., a Facebook post, a Skype message, an AOL instant message, etc.) The communication sent by the user's computing device may contain information regarding how the third-party device may enter the current video call. For example, the third-party device may receive an email or SMS with a URL address link which, when selected, may connect the third-party device with the group video call. As another example, the third-party device may receive a chat request from the user's computing device. In another embodiment, the user's computing device may transmit commands to a server controlling the group video call to add the newly identified third-party. When the video call is over a peer-to-peer connection, the user's computing device may send a call to the peer device (i.e., participant computing device) asking it to establish a group communication call including the third-party device.

In an embodiment, the user's computing device may query other sources to find a match with the generated facial/other characteristics data. For example, the user's computing device may send the generated facial/other characteristics data to social networking services (e.g., Facebook®, LinkedIn®, etc.), which may compare the data to remote database information. The user's computing device may also extend its search to devices on a local network (e.g., WiFi network, local peer-to-peer network, etc.) that may have opted-in to a search service that scans address book information. For example, the user's computing device may query a company (or employer) profile database, comparing the generated facial/other characteristics data to employees and staff regardless of their proximity to the video call participants.

In another embodiment, the user's computing device may automatically conduct facial recognition and conduct identification routines for all third-party individuals who enter the viewable video feed. For example, as individuals walk in view of a video camera of a participant computing device (e.g., third-party walks behind the participant), the user computing device may automatically detect that a face is present in the image and determine the individuals' identities based on facial recognition analysis and address book analysis. In an embodiment, the user's computing device may render or otherwise present the user with a dynamic list of third-party individuals visible on the video feed, from which the user may simply select a third-party's rendered name to request the corresponding third-party's inclusion into the video conference session.

In the various embodiments, if at any time a new, replacement, or better image of a contact or the unknown third-party is obtained by the user's computing device, the generated facial/other characteristics data may be refreshed and the various facial data comparison operations may be restarted. For example, if an image is found within a photo gallery or a social media website that provides a clearer image of a contact, the user's computing device may restart the facial data comparisons between the contact and the generated facial/other characteristics data (i.e., new image characteristics data may be generated). Additionally, the various methods may be cyclic, continually performing facial data comparisons with more refined tolerances (or tolerance ranges) and threshold values. For example, after a complete execution of a search of contact databases and finding numerous likely matching contacts, the user's computing device may start a new search using more restrictive standards for determining similar facial data/traits. Subsequent executions of the various embodiments may be performed by the user's computing device and the other associated computing devices (e.g., participant mobile device, descendant computing device, etc.) on subsets of contacts stored within these devices. For example, subsequent comparisons of contacts' facial data stored within a participant computing device to facial/other characteristics data may include only contacts previously determined to be within a certain likelihood of matching the unknown third-party.

Additionally, if an embodiment method terminates and provides the user's computing device with several likely matching contacts, the user's computing device may search for more and/or better imagery representing the likely matching contacts, and re-execute (or restart) any of the embodiment methods using the improved imagery. For example, the user's computing device may find a new image of a possible matching contact on a social networking site and compare generated facial/other characteristics data to facial data from the new image.

In the various embodiments, the various computing devices (e.g., the user computing device, participant computing devices, etc.) may utilize audio data, exclusively or in combination with facial data (e.g., generated facial/other characteristics data), to identify an unknown third-party within video call data. The audio data may be referred to as identifying audio data. Computing devices may store voice samples and/or audio data of each contact within their respective contacts databases. For example, an address book may include a sample of speech audio for each contact therein.

Alternatively, contact information databases may contain voice recognition information that describes particular audio characterizations of the various stored contacts.

In an embodiment, the various computing devices (e.g., the user computing device, participant computing devices, etc.) may be configured to distinguish voice audio spoken by the unknown third-party appearing within video call imagery by comparing lip movements of the unknown third-party within the video imagery. The user's computing device may detect lip movement information (e.g., imagery changes in the video area determined to coincide with the unknown third-party's mouth), estimate voice/speech information based on an analysis of the lip movements, and compare the estimated voice information to the video call data to generate identifying audio data of the unknown third-party. For example, based on lip movements of the unknown third-party and the audio data transmitted along with the video call data, the user's computing device may be configured to distinguish the vocal audio data related to the unknown third-party. The user's computing device may use voice confirmation (or identifying audio data) to identify and/or reinforce identifications of third-parties.

The various comparisons and evaluations of image data (i.e., facial data, generated facial/other characteristics data, video imagery from video streaming data, stored photographs, etc.) described below may be considered interchangeable or combinable with similar comparisons and evaluations of audio/voice data. For example, the user's computing device, participants' computing devices, and/or descendant computing devices may use generated facial/other characteristics data interchangeably with audio data (e.g., voice confirmation) for comparisons with stored contact information and identifying an unknown third-party.

In an embodiment, the user's computing device may determine an unknown third-party's identity based on detected signaling by the unknown third-party within the video call data. The computing device of the unknown third-party (e.g., a smartphone with a touchscreen display) may be pictured or heard within video call data transmitted by a participant computing device. The unknown third-party computing device may emit, display, or otherwise render signaling information that contains identification and/or contact information describing the third-party. For example, the unknown third-party may hold a smartphone display such that a video call participant computing device records images or visual symbols rendered on the smartphone display. As another example, the unknown third-party may use his computing device speakers to render an audible message that can be detected by other computing devices. The signaling information may include a sound, an image, sequences of images, sequences of sound (including audio and inaudible sound), sequences of flashing lights (e.g., a strobe), special images, and a symbol (e.g., Quick Response (QR) codes), any of which may detected and analyzed by the user's computing device. Based on the detected signaling information, the user's computing device may determine the unknown third-party's identity within the signaling information itself or by looking in certain information locations described within the signaling information. For example, the signaling information may include audible sounds or light signals rendered in a certain manner, such as Morse code, and may indicate the unknown party's name and device contact information. As another example, the signaling information may be evaluated by the user's computing device and determined to include a URL that provides contact and identification information for the unknown third-party. In an embodiment, such detected signaling information may be processed by any or all of the video call devices (e.g., the user's computing device, participant computing devices, descendant computing devices, etc.). Additionally, operations for detecting and evaluating signaling information may be executed before, during or subsequent to the various identification methods described below, and also may be executed in combination or instead of the other identification methods described below. For example, based on signaling information detected at the beginning of a video call, the user's computing device may identify the unknown third-party without transmitting generated facial/other characteristics data to participant computing devices. As another example, the user's computing device may transmit an identification confirmation message, as described below with reference to FIGS. 5A and 5B, to a potential match's computing device that prompts that potential match computing device to emit signaling, such as a predefined audio pattern, that the user's computing device may detect to confirm an identity.

As noted above, a computing device may use other types of recognition methods data, such as voice recognition information from processing audio data and/or identifying information from processing signaling information. Also, image recognition methods may recognize individuals on characteristics other than facial features, including for example, eye color, hair color, body dimensions (e.g., shoulder-to-head perspectives, head size, shoulder width, etc.), tattoos, etc. In other words, the computing device may utilize any data within the captured imagery and/or sounds that is useful in a recognition technique for comparison with data in local contact information databases and/or for transmitting to other devices ("crawling" through others' databases). Therefore, the following embodiment descriptions are not intended to limit the scope of the claims to facial recognition techniques and facial characteristics. For this reason, the following descriptions and the figures refer to "facial/other characteristic data" and the claims refer generally to "image characteristics data" except in those claims directed to facial recognition techniques based on facial characteristic data.

Figure 10:
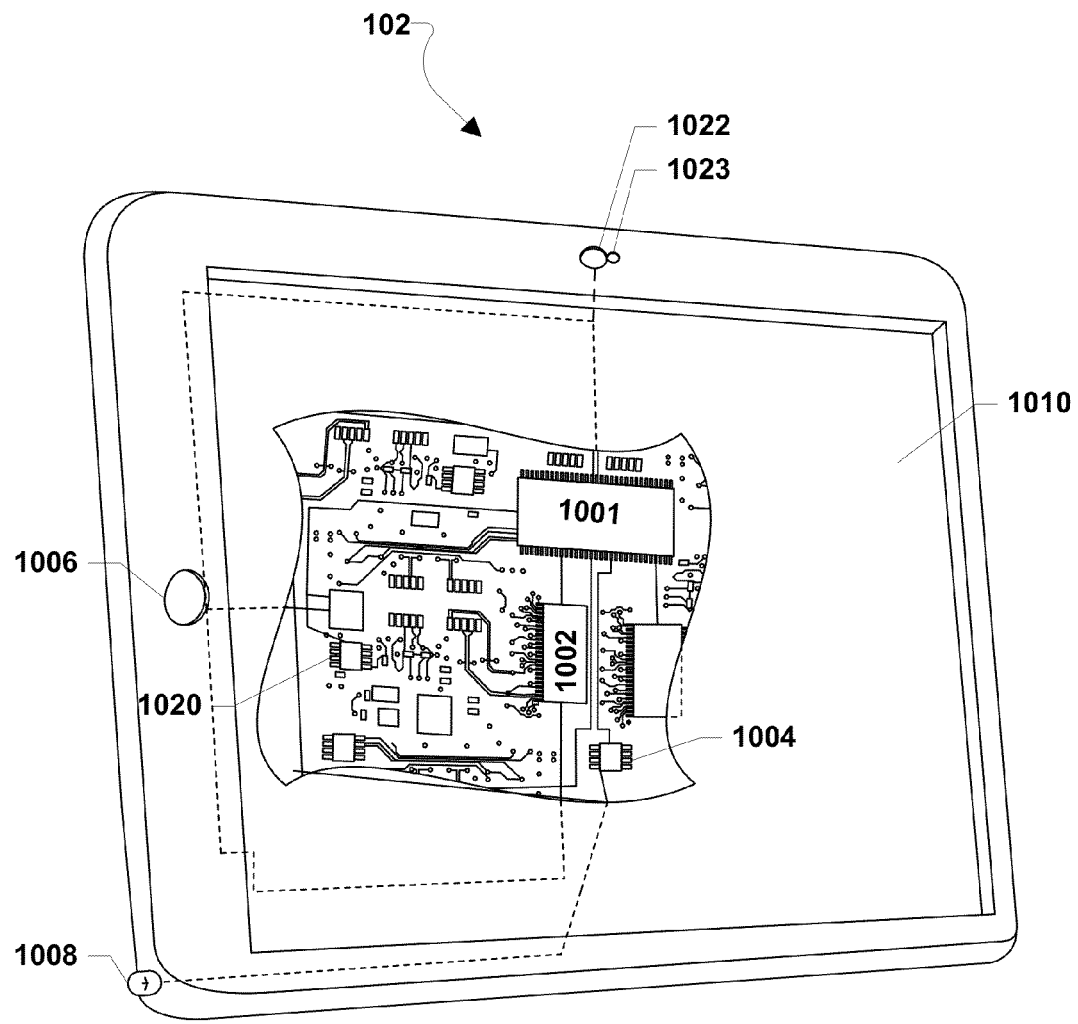
FIG. 10 is a component block diagram of an example tablet mobile computing device suitable for use with the various embodiments.
Figure 11:
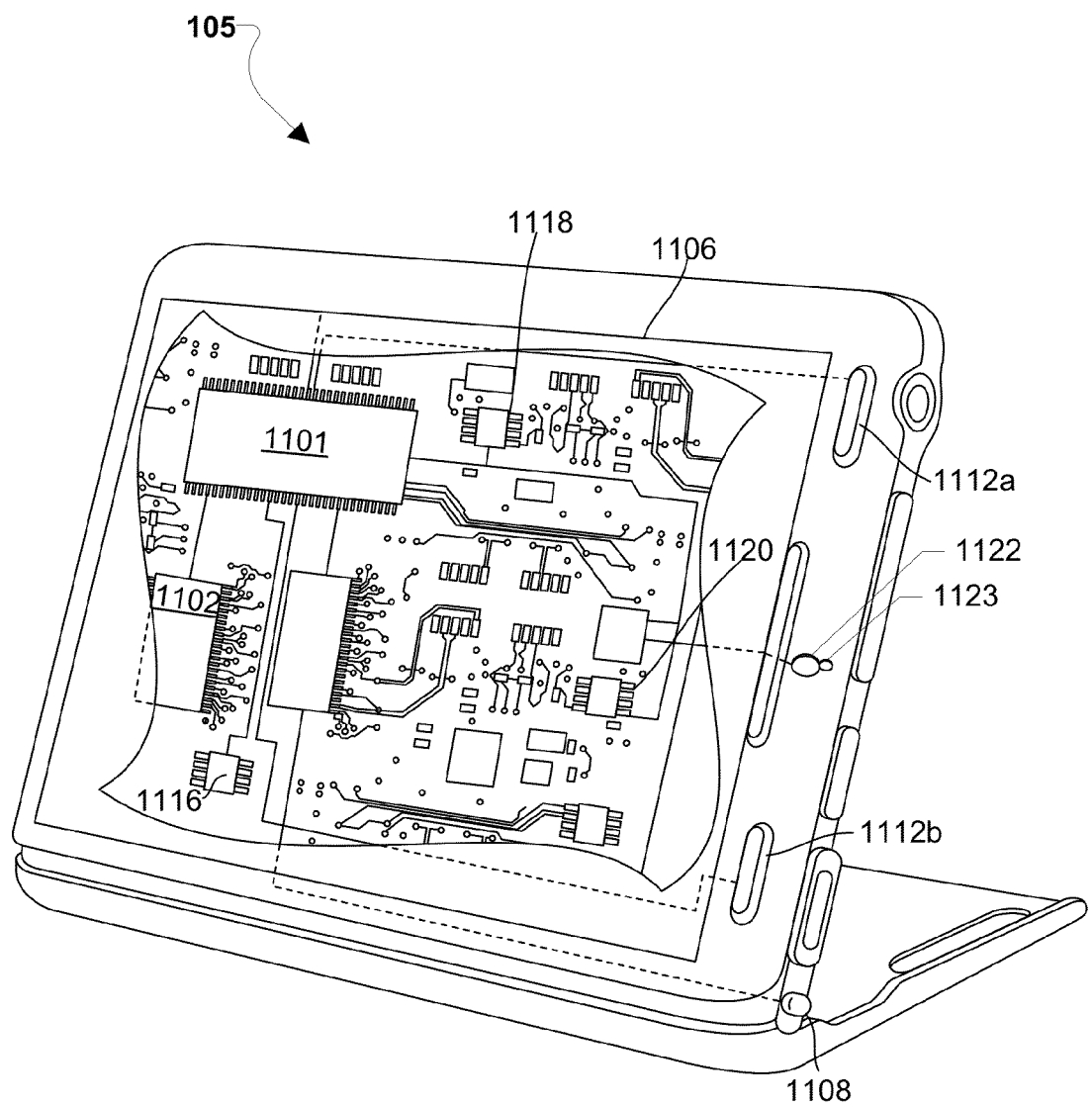
FIG. 11 is a component block diagram of an example smartphone mobile computing device suitable for use with the various embodiments.

FIG. 1 illustrates a communication system 100 suitable for use with the various embodiments. The system may include a user's computing device 102 (e.g., a tablet computing device), a participant computing device 105, a nearby computing device 106, and an unknown third-party computing device 107. Each of the computing devices 102, 105, 106, and 107 may include a cellular network wireless modem chip that enables communication via a cellular network and a global positioning system (GPS) receiver, which may generate GPS coordinates of the device. The computing devices 102, 105, 106, and 107 may contain processing units capable of handling network communications and may access the Internet or any telecommunications network 115 capable of supporting high bandwidth required for real-time video streaming (e.g., LAN, WLAN, 4G, LTE, etc.). In various embodiments, the computing devices 102, 105, 106, and 107 may also contain various transceivers for wireless communications (e.g., WiFi, Bluetooth, etc.). FIGS. 10-11, described below, illustrate other components of embodiment computing devices.

The participant computing device 105 and the user computing device 102 may exchange data and/or messages through messaging across the Internet/telecommunications network 115. For example, the user computing device 102 may exchange video call data over the Internet/telecommunications network 115 via a wired or wireless data link 130 and the participant computing device 105 may exchange video call data over the Internet/telecommunications network 115 via a wired or wireless data link 131. The user computing device 102 and the participant computing device 105 may contain camera units configured to capture and store video data that may be transmitted in a video call (e.g., a video conference call). The camera units may be connected to microphone units capable of capturing audio data with or without connection to captured video data. The camera units may output data as still photographic images, video files, or streaming video data and may utilize various encodings and formats for such data.

The user's computing device 102 may exchange data with a remote server 110 (e.g., a cloud computing server). In particular, the user computing device 102 may exchange messages over the Internet/telecommunications network 115 via a wired or wireless data link 130, and the remote server 110 may exchange messages over the Internet/telecommunications network 115 via a data link 134. The remote server 110 may maintain databases of contact information for particular groups or classifications of persons (e.g., an employer server with information records for each employee), for social media associations (e.g., Facebook®, Twitter®, LinkedIn®, Foursquare® account data, user names, etc.), and for geographical regions (e.g., by city, county, state, country, etc.). The remote server 110 may also contain video/audio data uploaded by various devices via the Internet/telecommunications network 115, such as the user's computing device 102 and/or the participant computing device 105, and may relate such video/audio data with contact information within the database.

The participant computing device 105 may exchange data and/or messages with the nearby computing device 106 and/or the unknown third-party computing device 107 by using peer-to-peer communication techniques or through messaging across the Internet/telecommunications network 115. For example, the participant computing device 105 may exchange messages over the Internet/telecommunications network 115 via a wired or wireless data link 131, the nearby computing device 106 may exchange messages over the Internet/telecommunications network 115 via a wired or wireless data link 132, and the third-party computing device 107 may exchange messages over the Internet/telecommunications network 115 via a wired or wireless data link 133. If the contact information for the various devices is known, the user's computing device 102 may also communicate with the computing devices 106, 107 through Internet/telecommunications network 115 transmissions.

In an embodiment, the participant computing device 105 may exchange wireless transmissions 120 (e.g., WiFi, Bluetooth®, Zigbee®, RF radio, etc.) with other devices equipped with wireless transceivers, such as computing devices 106, 107 located near the participant computing device 105. For example, the participant computing device 105 may transmit ping messages via wireless transmissions 120 that may be received and responded to by the other computing devices 106, 107 employing similar transceivers and communication protocols.

In an embodiment, the participant computing device 105 and other computing devices 106, 107 may exchange transmissions with the remote server 110. For example, the remote server 110 may transmit requests for information from the various computing devices 105, 106, 107 using communications over the Internet/telecommunications network 115, such as email or software-specific transmissions (e.g., client-server software communications).

Figure 2:
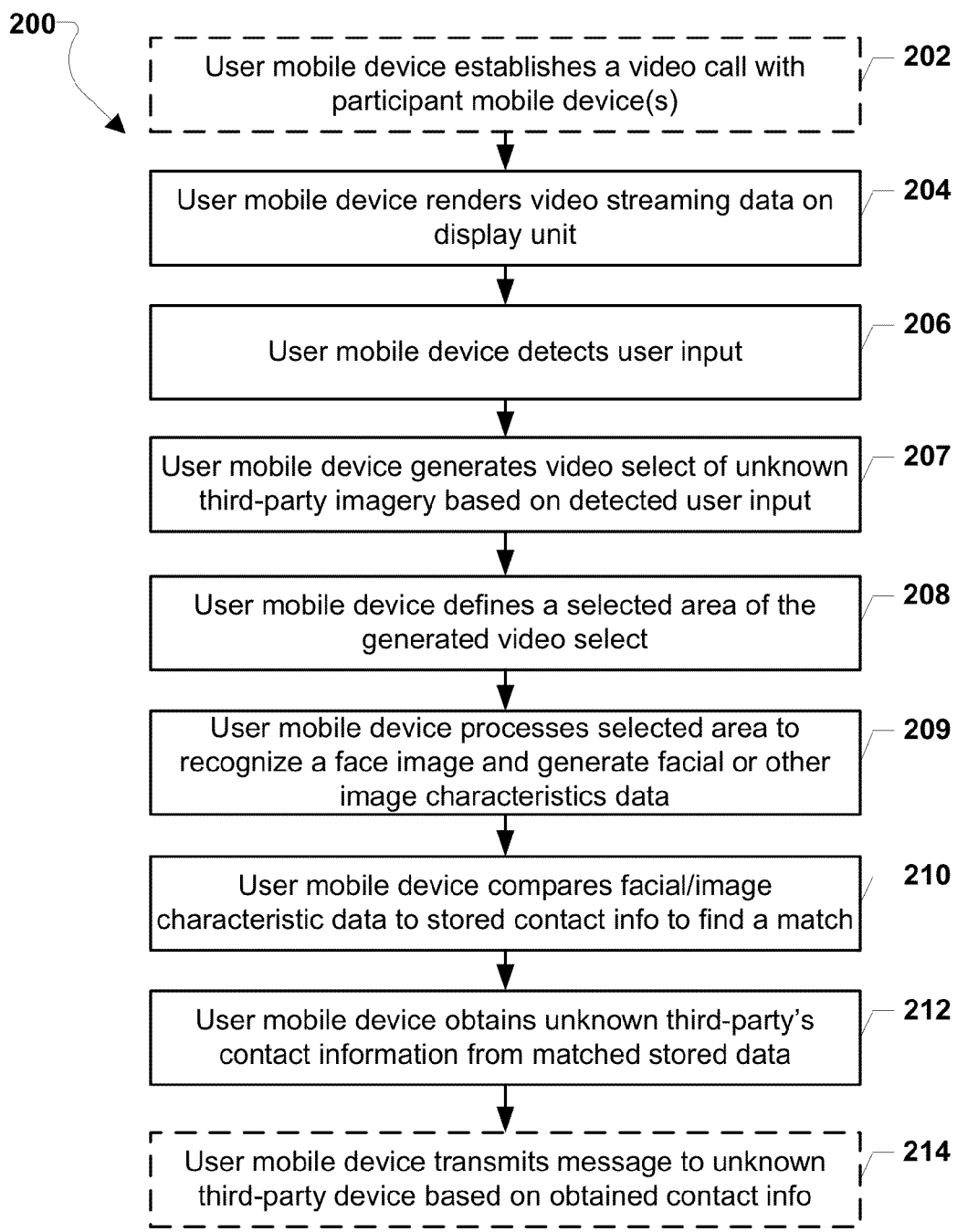
FIG. 2 is a process flow diagram illustrating an embodiment method for obtaining the contact information of an unknown third-party seen in a video feed.

FIG. 2 illustrates an embodiment method 200 for identifying an unknown third-party rendered during an established video call. Using software on computing devices, such as video chatting applications, a user may communicate with multiple other participants in real-time group video calls. The user may view an unknown third-party in the video imagery (or video feed) and desire to identify and possibly contact that unknown third-party. If the user's computing device detects a selection input from the user (e.g., a selection on a touch screen unit), the user's computing device may determine facial/other characteristics data of the unknown third-party and compare that data to numerous databases to find a match.

In optional block 202, the user's computing device may establish a video call (or group video call) with the participant computing devices. The video call may include the user's computing device and numerous participant computing devices that may or may not be in different locations. For example, the user's computing device may be located in one building and the participant computing devices may be located in different buildings. As another example, the user's computing device may be located in a particular office building and the participant computing devices may all be located in the same restaurant. As another example, the user's computing device and the participant computing devices may all be located at different locations within the same area or building (e.g., a cafeteria, a sporting arena, a social club, etc.). In alternative embodiments, the user's mobile device may capture video data or video streaming data using a camera without establishing a video call. For example, the user may simply point his smartphone with an embedded camera towards an unknown third-party in plain sight and capture video imagery of that third-party without executing any video conferencing application.

The various computing devices may execute video call software or applications (e.g., Skype®, FaceTime®, and Google Talk®, etc.) to conduct the video call. The video call may utilize various voice-over-Internet protocols ("VOIP"), services, and media data encodings. For example, the video data transmitted during a video call may be encoded and decoded using a particular video and/or audio codec. In an embodiment, the user computing device and participant computing devices may transmit video call data over the Internet using a WiFi connection (i.e., WLAN). For example, the user's computing device may transmit video data via a connection to a WiFi router configured to relay data to the Internet. The devices may also transmit video call data over a local area network (a "LAN"), a cellular network, or any other telecommunications network that can support high bandwidth video/audio transmissions.

The user's computing device may direct video call data to the participant computing devices based on stored contact information, such as address book databases that relate participant identities to the computing device contact information. For example, the stored contact information may contain data tables which list participant names and computing device IP and/or MAC addresses, phone numbers, email addresses, etc. The stored contact information may be associated with communication software as mentioned above and may contain associated proprietary contact information (e.g., a Skype screen name/user name).

In block 204, the user's computing device may render received video streaming data on a display unit, such as data corresponding to the established video call. For example, the user's computing device may utilize an LCD screen capable of displaying high resolution video data to render video call participant faces.

In block 206, the user's computing device may detect a user input. The user may interact with the user's computing device using his fingers, a stylus, or any other attached input device (e.g., a mouse, a track ball, etc.). For example, the user's computing device may include a touch screen unit configured to receive input data based on touch interactions by the user. The user may provide input data through interaction actions that may include tapping, clicking, sliding, scraping, outlining, and any other way in which a user may indicate selections within video rendered on the user's computing device. For example, the user's computing device may detect a tap of a certain area of the touch screen. Alternatively, the user's computing device may be a laptop computer configured to detect and process user input from a mouse, tablet, or any other means of defining a selection within rendered video data. In an embodiment, the user's computing device may display graphical user interface buttons on the touch screen, which may correspond with particular aspects of the rendered imagery. For example, a GUI button may be rendered above the head of every visible participant of a video call.

In block 207, the user computing device may generate (or output) a video select (e.g., a video select including imagery of an unknown third-party) based on the detected user input. The video select may be stored locally on the user computing device, such as in a buffer or other storage component. The video select may be a single frame of video data or, alternatively, a series of images. The user's computing device may generate the video select such that the select represents the imagery rendered at the time of the detected user input. In other words, the user input data may direct the user's computing device to take a snapshot of the rendered video data.

In block 208, the user's computing device may define a selected area of the generated video select, such as by relating the detected input from the user to a particular segment of the video select. For example, the user's computing device may detect a selection based on the user moving his/her finger on a touch screen unit such that he/she outlines an area of the video imagery. The user's computing device may determine the coordinates of the detected user input, such as 'X' and 'Y' coordinates that define a single point (e.g., from a finger tap) or a sequence of coordinate values (e.g., a prolonged finger drag). The user's computing device may apply the determined input coordinates to the video select and define the selected area. For example, the selected area may be the portion of the video select within a detected circular input data (e.g., the user draws a circle on a touch screen). As another example, the selected area may be a predefined number of display units (e.g., pixels) centered on detected input coordinates.

In an embodiment, the selected area may be defined by a configuration file. For example, the user's computing device may store a configuration file that defines all selected areas to be the upper corner of rendered video. As another example, the user's computing device may employ a "mask" or predefined area of the rendered video that defines the selected area for any video select. In an embodiment, the user's computing device may define the selected area using threshold parameters that include portions of the video data outside a certain boundary of the detected user input. For example, the selected area may be defined as including a number of pixels of imagery extending in a radial manner from the coordinates of a user's tap on the display unit.

In block 209, the user's computing device may perform operations to process the defined selected area of the video imagery to recognize a face image and generate facial/other characteristics data. For example, the computing device may be configured to perform operations to evaluate pixel values, such as color values, in localized sections of the selected area to determine whether the selected area contains the depiction of a face. The computing device may estimate the characteristics of a face within the selected area using facial recognition techniques, operations, and algorithms well known by those skilled in the art. For example, the computing device may perform operations to determine the positions of the eyes of the face within the selected area, estimate the distance between the eyes, extrapolate the size of the facial features (e.g., nose, brow, cheekbones, jaw, etc.), and detect any distinguishing aspects (e.g., moles, skin coloration, scars, etc.). In an embodiment, the facial/other characteristics data may be of a standardized format accessible by numerous devices and software or, alternatively, may define proprietary data structured for use by specialized devices.

In another embodiment, the facial/other characteristics data may include ancillary attributes unrelated to the unknown third-party's face. The user's computing device may recognize peculiar, high-contrast, or otherwise special aspects within the selected imagery during execution of the facial recognition routines. For example, the user's computing device may detect that the unknown third-party is wearing accessories, such as a hat of a certain color or jewelry with certain attributes. As another example, the unknown third-party may be wearing a shirt with a logo. The user's computing device may append the ancillary attributes to the facial/other characteristics data or, alternatively, may add descriptions of the ancillary attributes to metadata within messages transmitting the facial/other characteristics data. In an embodiment, the ancillary attributes may be used to cross reference contact information with social networking affiliations, group associations, or interest group memberships (e.g., sporting groups, fan associations, school alma maters, etc.) that may be related to the ancillary attributes. For example, the user's computing device may search in contact information databases for contacts having similar facial characteristics and who share similar ancillary attributes.

In an embodiment, the user's computing device may create data tags (or metadata) containing facial/other characteristics data and append the tags to image files for subsequent searching. For example, an image file may contain a "pictured individuals" tag that contains facial/other characteristics data and associated contact information for each of the individuals represented.

In another embodiment, the user's computing device may track the imagery of the unknown third-party throughout the duration of the captured video streaming data (e.g., a video call). The user's computing device may continually compare the tracked (or current) video imagery of the unknown third-party to the video selection used to generate the facial/other characteristics data. If the tracked imagery provides a clearer representation of the unknown third-party, the user's computing device may automatically create a new video selection and generate an updated set of facial characterization data. For example, new facial characterization data may be generated by the user's computing device if the current tracked imagery shows the unknown third-party's face with better lighting, such as when the original video selection was made when the third-party was in a shadow. As other examples, if the tracked imagery shows the unknown third-party close up, from a better angle (e.g., straight-ahead angle as opposed to profile angle), or with less distortion (e.g., motion blur, camera bloom/flare, etc.), the user's computing device may generated new facial/other characteristics data from the better imagery. In an embodiment, based on user input data (e.g., the user may touch or point to the display to select a new image of the unknown third-party), the user computing device may perform the processing of a new selected area to generate new facial/other characteristics data. For example, the user computing device may process a new face image when the user notes that a better view of the person is presented in the video.

If during the video streaming (e.g., video call) a new, replacement, or better image of the unknown third-party is obtained by the user's computing device, the generated facial/other characteristics data may be refreshed and the various facial data comparison operations may be restarted. For example, with improved or more accurate generated facial/other characteristics data, the user's computing device may restart comparison operations by sending new messages to video call participant computing devices, etc.

In block 210, the user's computing device may compare the generated facial/other characteristics data to stored contact information until a match is found (or all accessible stored data has been evaluated). The contact information may be stored within databases (e.g., address books) that relate contacts' identification information (e.g., pre-existing facial/other characteristics data, name, age, gender, race, hairstyle, etc.) to various associated contact addresses (e.g., email, phone/SMS text numbers, IP/MAC addresses of known devices, etc.). The user's computing device may compare the generated facial/other characteristics data to data stored within local databases, remote servers, and/or data stored within other computing devices. Detailed descriptions of comparison methods are found below with reference to FIGS. 4A-7B.

If a match is found, in block 212 the user's computing device may obtain the unknown third-party's contact information from matching stored data, such as contact identification information for the unknown third-party stored in a matching contact database record. As described below with reference to FIGS. 4A-4C, the user's computing device may receive report messages (or response messages) from a participant computing device which may contain contact information (e.g., records from contact databases) relevant to the matched data. Based on the matched facial/other characteristics data, the user's computing device may determine the associated devices, contact addresses (e.g., email, cell/SMS text numbers, business/personal websites, etc.), and other relevant information describing the unknown third-party. The user's computing device may find additional contact information for determined identities by searching the web (e.g., use determined contact identity name within an online search engine), social networking sites (e.g., Facebook, LinkedIn, etc.), and/or remote data servers (e.g., employer-maintained contact database). In an embodiment, the user's computing device may store the obtained contact information within a local address book or other data structure.

In optional block 214, the user computing device may transmit a message to the unknown third-party device based on the obtained contact information. For example, based on the obtained contact information, the user may send the unknown third-party an SMS text message to the third-party's smartphone. As another example, the user may transmit an email invitation to the third-party's laptop requesting that the unknown third-party join an active video call. As another example, the user computing device may automatically transmit a message to the unknown third-party via social networking accounts (e.g., the user computing device may send a friend request on Facebook®, a connection request on LinkedIn®, etc.).

In an embodiment, the user's computing device may execute routines that select the most appropriate device on which the third-party may be contacted regarding a video call. For example, the third-party may be associated with (i.e., use and/or own) many computing devices (e.g., a smart phone, a tablet device, and a work desktop computer) through which the individual may be contacted, however the third-party may have access to only a certain computing device at the time of the video call. Accordingly, the user computing device may execute an algorithm that evaluates the likelihood that the third-party may respond to transmissions on each of his/her computing devices at a given time and location. For example, the user's computing device may determine that the third-party seen within video imagery taken at an outdoor park may not likely respond to a communication sent to his work desktop computer. In another embodiment, the user's computing device may perform imagery recognition routines to detect the presence of the third-party's computing devices. For example, using the same imagery from which the facial/other characteristics data was generated the user's computing device may recognize computing devices near the third-party (e.g., a cell phone on the third-party's hip, a tablet in the third-party's hand, etc.)

Figure 3A:
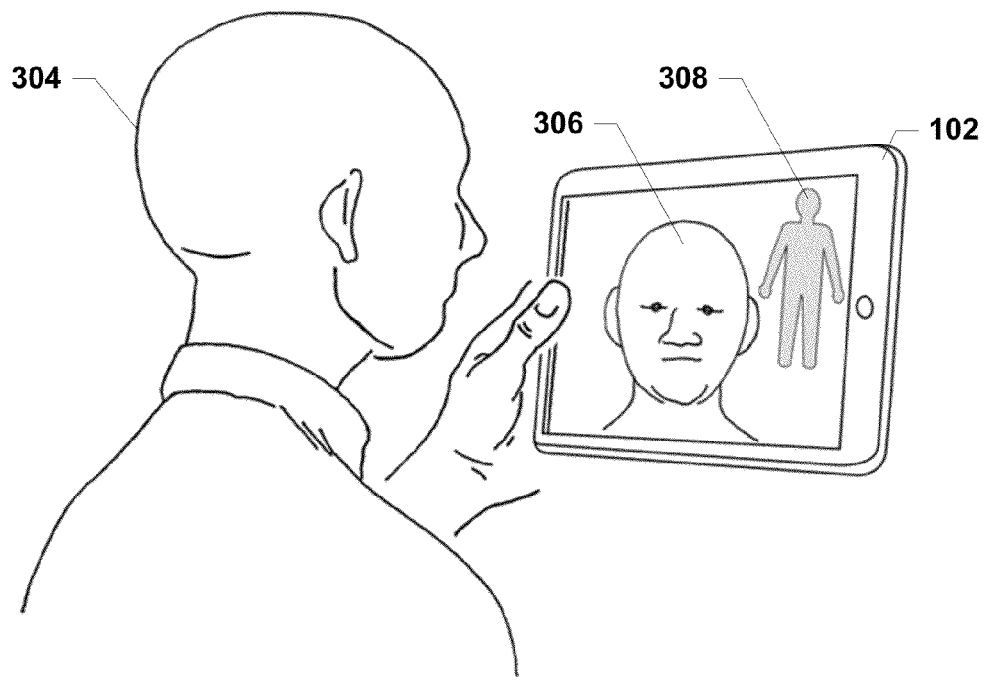
FIGS. 3A and 3B are diagrams illustrating a user communicating with a computing device and selecting an unknown third-party within a video feed.
Figure 3B:
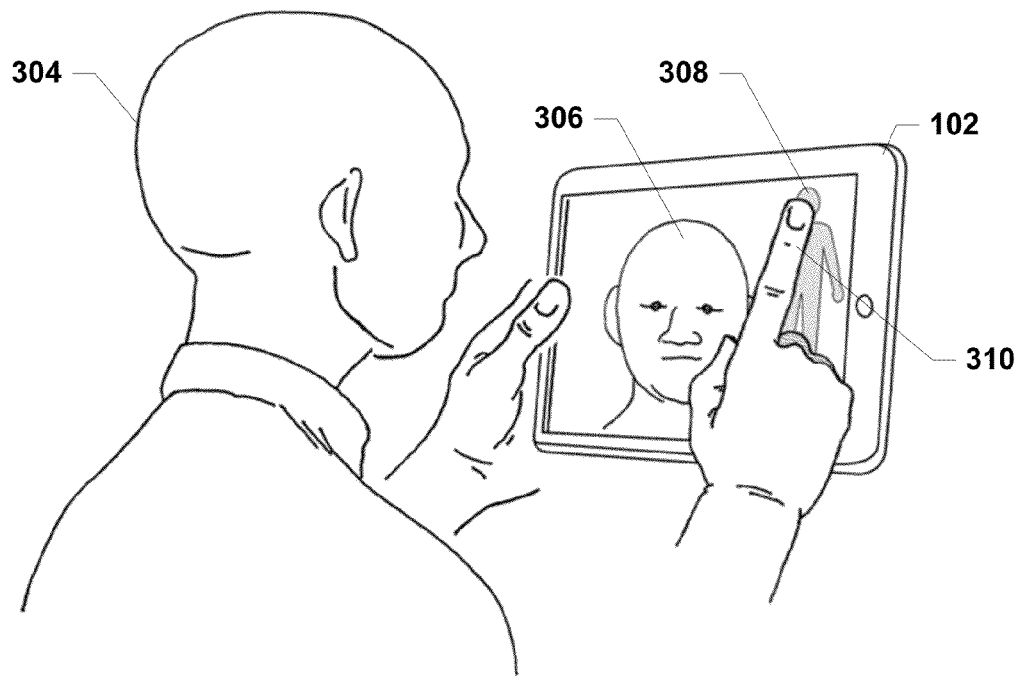

FIGS. 3A-3B illustrate an example input selection action by a user 304 on a user's computing device 102. FIG. 3A shows the user 304 communicating with a participant 306 via a video call. As described above, the video call may be conducted via messaging or video chat/conferencing software (or app) running on the user's computing device 102, such as FaceTime, Skype, or Google Talk. As the video call proceeds and the user's computing device 102 renders video data, the user 304 may see an unknown third-party 308 rendered on the user's computing device 102. The unknown third-party 308 may be walking or standing in the background behind the participant 306, sitting to the side of the participant 306, or in any other position/activity within to the recording area of the participant computing device's camera. In an embodiment, the unknown third-party 308 may or may not interact with the participant 306 and/or user 304.

FIG. 3B shows the user 304 performing a selection action on the user's computing device 102. In response to seeing the unknown third-party 308 rendered in the video call, the user 304 may desire to identify the unknown third-party 308. With his finger 310, the user 304 may tap the portion of the touch screen (or display unit) of the user's computing device 102 that corresponds to the image of the unknown third-party 308. For example, the user 304 may tap the face of the unknown third-party 308. As described above, the user 304 may interact with the user's computing device 102 in multiple ways to indicate a selection of the rendered images on the display unit, such as tapping or drawing a circle. In response to the selection input data, the user's computing device 102 may process the video data and execute the identification operations described above with reference from FIG. 2.

FIGS. 4A, 4B, 6A, 6B, 7A and 7B illustrate embodiment methods for comparing determined facial/other characteristics data to stored information and matching database contacts to an unknown third-party. In FIGS. 4A, 4B, 6A, 6B, 7A and 7B, the methods may begin with the user's computing device having already received user input data defining a selected area of imagery rendered during a video call (e.g., group video chat), evaluated facial imagery, and determined facial/other characteristics data as described above with reference to the operations in blocks 202-209.

Figure 4A:
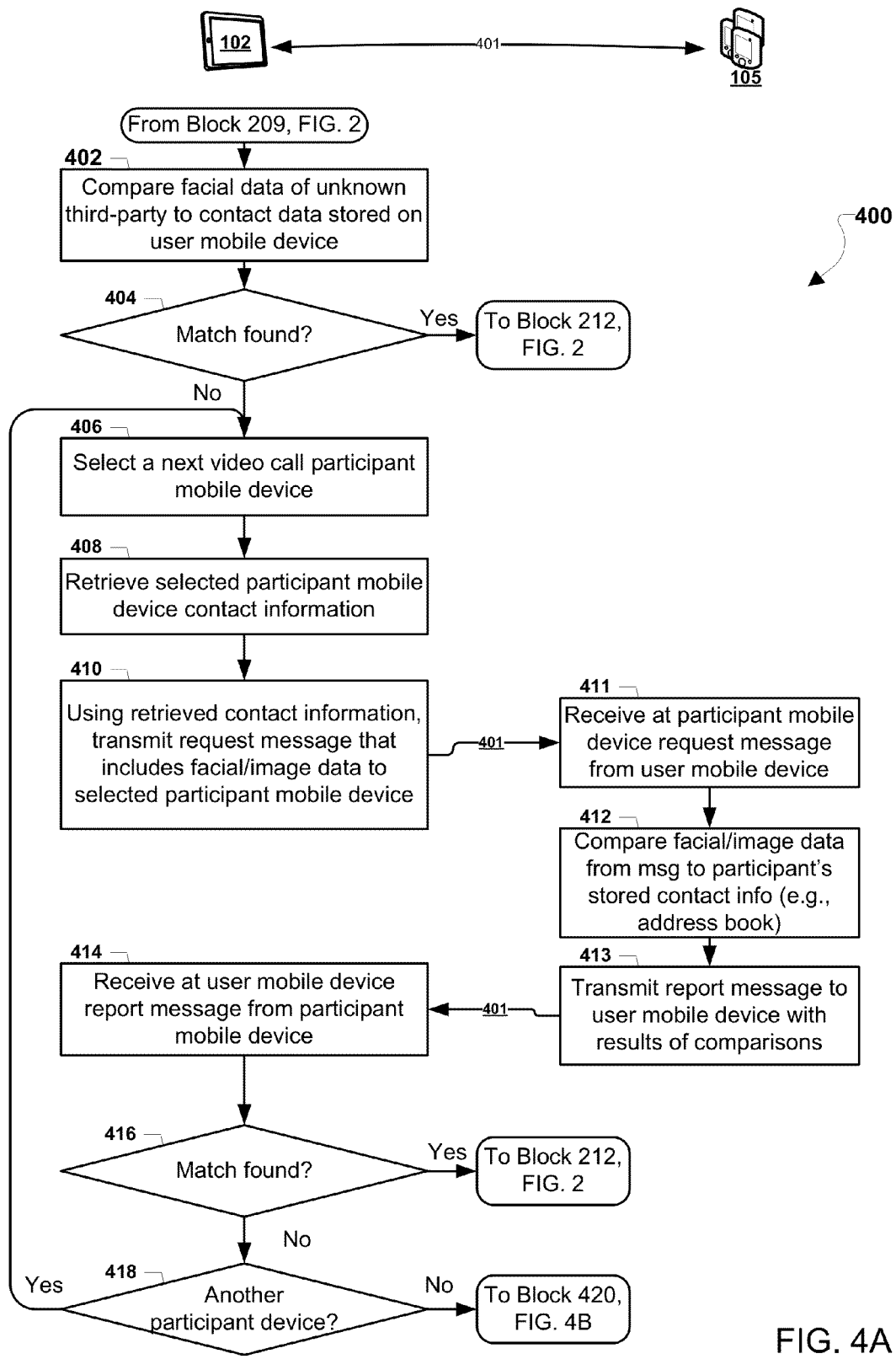
FIGS. 4A and 4B are process a flow diagram illustrating an embodiment method for comparing facial recognition data to contact information stored within user databases.
Figure 4B:
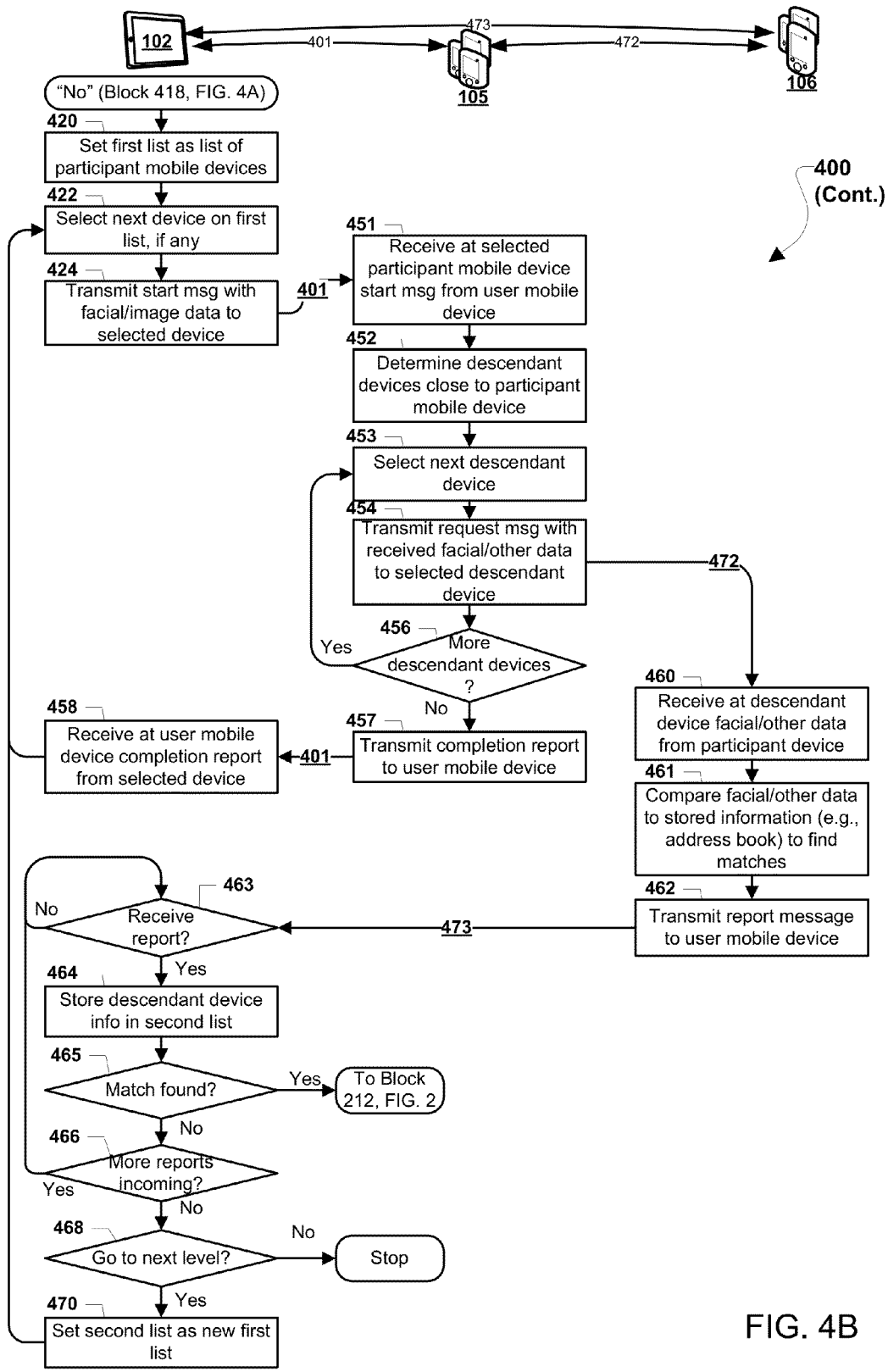

FIGS. 4A and 4B illustrate an embodiment method 400 for identifying an unknown third-party by comparing facial/other characteristics data to data stored within multiple devices. FIG. 4A illustrates embodiment operations that may be performed by a user computing device 102 and a participant computing device 105 in communication with each other over a network (e.g., Internet, local area network, etc.) via wired or wireless data links 401. For example, the user's computing device 102 may exchange various messages over a network with the participant computing device 105 via wireless data links 401 that utilize Internet protocols.

In block 402, the user computing device 102 may compare facial data of an unknown third-party, such as facial/other characteristics data generated with the operations in the block 209, to contact data that is stored on the user computing device 102. For example, the user computing device 102 may compare the facial/other characteristics data to information relating to known contacts, such as contact records within the user's smart phone address book. The stored information may be organized as a local contact database containing contact records that relate identification data to other information related to the particular contacts, and such contact records (or contact data) may include facial data for contacts as well as other information for describing the physical traits of the contacts. The user's computing device 102 may evaluate the stored information on a record-by-record basis, comparing the generated facial/other characteristics data to the information associated with each contact. The stored information may include standardized facial data for each contact or, alternatively, physical measurements (e.g., distance between the eyes, head width, etc.) that the user's computing device 102 may compare to the generated facial/other characteristics data.

In an embodiment, if the stored information does not contain facial/other characteristics data resulting from facial recognition software for a particular contact, or if facial data is in a corrupt or inaccessible format, the user's computing device 102 may generate facial data based on stored digital images (or pictures) of the contact. For example, if a contact record in an address book database does not contain facial data, the user's computing device 102 may generate facial data for the contact using operations similar to as described above with reference to blocks 208-209. Digital images may be stored in relation to a contact information database/address book or within generalized image repositories of the user's computing device 102. For example, the user's computing device 102 may take digital pictures using an embedded camera and store the pictures within on-board flash memory. The user's computing device 102 may evaluate metadata associated with image files, such as tagging information, to detect relevance to contacts without facial data in the stored information. For example, the user's computing device 102 may evaluate images having timestamp and/or geo-tagging information similar to the time and/or location of the video call during which the unknown third-party was seen by the user. In an embodiment, if a contact record within the user's address book does not have any associated picture or facial data, the user's computing device 102 may search for images of the contact within remote (or "online") servers (e.g., social networking servers), download the images, and process to determine facial/other characteristics data.

The stored information may include other information describing personal details of contacts, such as names (e.g., nick name, middle initials, maiden name, etc.), significant dates (e.g., birthday, anniversary, children's birthday, etc.), and communication information (e.g., street address, personal/work email address and phone numbers, etc.). The stored information may also include device information relevant to the various contacts, such as lists of owned/used computing devices, computing device MAC addresses, associated IP addresses, Bluetooth MAC addresses, and supported communication protocols for the various devices. Information describing the services, software, and applications associated with the contacts and their devices, such as social networking membership information (e.g., Facebook user name, Twitter feed information, etc.), favorite websites, and the applications installed on the contacts' devices (e.g., Skype, IM, an email client, etc.) may also be included in the stored information.

In an embodiment, the stored information may include location data about the contacts, such as GPS coordinates. The stored information may represent the location information of the various contacts based on information automatically extracted from a previous transmission with the contacts (e.g., a routine executed by the user computing device 102 may extract location information encoded within an SMS text message), transmissions from a server maintaining location information (e.g., a cell phone carrier server, a social networking server, etc.), or through manual entry by the user. In an embodiment, the stored information may also include schedule or calendar information of the contacts. For example, the user's computing device 102 may receive scheduled activities (e.g., meetings, vacation, class period, etc.) from the contacts' devices.

The user's computing device 102 may continually and automatically update the stored information by accessing relevant websites (or remote servers), receiving updated information from servers (e.g., employer database containing employee contact information), and modifying stored data within the user's computing device 102. Alternatively, the user's computing device 102 may prompt the user to manually update stored data. The user's computing device 102 may automatically evaluate communications, such as emails or SMS text messages, from contacts to determine updated contact information. For example, the user's computing device 102 may process the contents of an SMS text message from a contact and determine that he/she is at work. In an embodiment, the user's computing device 102 may use natural language processing techniques to interpret text information.

In determination block 404, the user's computing device 102 may determine whether any stored information (e.g., stored facial data) matches the generated facial/other characteristics data for the unknown third-party. The user's computing device 102 may employ threshold values when comparing various facial characteristics, and may determine the likelihood that stored data matches the generated facial/other characteristics data. For example, the user's computing device 102 may determine that a particular contact's stored facial data is a high likelihood of being a match to the generated facial/other characteristics data of the unknown third-party.

In an embodiment, the user's computing device 102 may create a list of likely matches to present to the user. If the user's computing device 102 determines multiple contacts with a similar likelihood of matching the unknown third-party, the user's computing device 102 may prompt the user to supply input data to clarify the determinations (i.e., "break a tie," reject likelihood determinations, etc.). For example, the user computing device 102 may render a prompt requesting that the user select the best match between several contacts having similar facial characteristics. The user's computing device 102 may develop and store heuristics based on comparisons of generated facial/other characteristics data to stored information and may adjust the evaluations of stored facial data over time. For example, the user computing device 102 may adjust the parameters (or threshold values) of the comparison algorithms/techniques based on a detected user feedback input related to match determinations.

In an embodiment, the user's computing device 102 may detect multiple potential matches based on similarities of stored contacts' facial data to the generated facial/other characteristics data. For example, the user's computing device 102 may determine that several contacts' stored facial data match the generated facial/other characteristics data within a given tolerance threshold. The potential matches' facial data may all have the same or similar level of similarity (e.g., within a tolerance threshold) to the generated facial/other characteristics data. The user's computing device 102 may present lists of such potential matches to the user, who may in response initiate operations to prompt the various potential matches to confirm the evaluations. Such confirmation operations are described below with reference to FIG. 5A. Alternatively, the user's computing device 102 may present images from the database on the user's computing device 102 display and let the user decide whether there is a match.

If the user's computing device 102 finds a match between the generated facial/other characteristics data and facial data associated with a contact in the stored information (i.e., determination block 404="Yes"), the user's computing device 102 may continue with the operations in block 212 as described above with reference to FIG. 2. For example, the user's computing device 102 may obtain a cell phone number and transmit an invitation message to join the current video call based on the stored contact record containing facial data that matches the generated facial/other characteristics data.

If no match is found within the stored information contained within the user's computing device 102 (i.e., determination block 404="No"), the user's computing device 102 may execute an operational loop in which the user's computing device 102 may contact each of the video call participant computing devices 105 to continue the search for the unknown third-party. The operational loop may continue until the user's computing device 102 has contacted all the participant computing devices and either found a match to the generated facial/other characteristics data or discounted all stored information. Thus, in block 406, the user computing device 102 may select a next video call participant computing device 105. If the video call includes multiple participants, the user computing device 102 may contact each participant computing device 105 in a particular order so that all participants are contacted at most one time. The user computing device 102 may employ a selection algorithm to iteratively choose the next participant computing device based on guidelines stored within a predefined user configuration file, relative proximity of the participant to the unknown third-party (e.g., starting with the participant closest to the third-party and ending with the participant farthest from the third-party), randomness, or any other ordering techniques. In an embodiment, when the method 400 is first performed by the user computing device 102, the next participant computing device 105 may be the first in a list of all devices participating in the video call.

In an embodiment, the selection algorithm may use proximity evaluations to select a participant computing device 105 to contact. The user's computing device 102 may estimate the location of the unknown third-party by estimating the distance between the unknown third-party and known locations of video call participant computing devices 105. The user's computing device 102 may determine the participant computing device 105 locations by requesting and comparing GPS coordinates of participant computing device devices 105, by evaluating manually-entered positional information, location indicators on social networking websites or online services (e.g., Foursquare location information, Google Latitude, etc.) or other methods for determining location information as described above. The user's computing device 102 may estimate the unknown third-party's location by combining participant computing device 105 location information with distance calculations based on the imagery of a video select. For example, the user's computing device 102 may extrapolate the distance between the unknown third-party and the participant computing device 105 from whom the video select imagery originated by interpreting shadow length, comparison of physical proportions to reference objects, and other image analysis techniques. The user's computing device 102 may choose the selected participant computing device 105 based on the shortest distance to the estimated unknown third-party location.

In block 408, the user's computing device 102 may retrieve contact information for communicating with the selected participant computing device 105, such as by accessing a local address book, contact information database, or other technique of retrieving the participant information. For example, the user's computing device 102 may use contact information used to establish the video call. As another example, the participant computing device 105 may have transmitted contact information during the video call instructing the user to contact the participant in particular ways (e.g., email, SMS text, etc.) or at particular addresses.

In block 410, using the retrieved contact information, the user computing device 102 may transmit a request message that includes the facial data (or facial/other characteristics data) to the selected participant computing device 105. For example, the request message may be transmitted to the selected participant computing device 105 via the data link 401. The request message may prompt the participant computing device 105 to execute a comparison routine between stored information within the participant computing device and the generated facial/other characteristics data. For example, the request message may include a code or command that instructs the selected participant computing device 105 to compare the facial data to stored address book information. Request messages may be sent via any type of messaging between the computing devices, such as an SMS message or an email message, with which the user's computing device 102 may deliver facial/other characteristics data. The facial/other characteristics data may be appended as an attachment or alternatively as metadata information within the message. For example, the user's computing device 102 may transmit an email with a facial data file attachment or a proprietary message having header information (metadata) describing the generated facial/other characteristics data. In an embodiment, the user's computing device 102 may transmit a message requesting permission from the selected participant computing device 105 to transmit the facial data. For example, facial data may be sent by the user's computing device 102 in response to a return message approving the transmission sent by the selected participant computing device 105. In an embodiment, the user's computing device 102 may create a unique code or identifier for each unknown third-party that may be added into all request messages (or metadata) regarding the unknown party. Such an identifier may be used by the user computing device 102 and/or participant computing device 105 for tracking and identifying redundant requests.

In an embodiment, the user's computing device 102 may utilize particular software, applications, and messaging formats to transmit facial data. For example, the user's computing device 102 may execute with a processor a facial recognition and identification application that transmits facial data and receives response messages from participant computing devices 105 also running the app. The user's computing device 102 may transmit inquiry messages to participant computing devices 105 to detect whether the devices support particular software, messaging, or facial data formats. For example, the user's computing device 102 may ping the selected participant computing device 105 and in response, the selected participant computing device 105 may respond with a message indicating its software/app and facial data processing capabilities. If the selected participant computing device 105 does not support particular facial data or messaging types, the user's computing device 102 may reformat the facial data for transmission to the selected participant computing device 105 or ignore the selected participant and proceed to the next participant.

The operations in blocks 411-413 may be performed by participant computing devices 105, such as any device selected by the user computing device 102 with the operations described with reference to block 406. In block 411, the selected participant computing device 105 may receive the request message from the user computing device 102. In block 412, the selected participant computing device 105 may compare the facial data (or facial/other characteristics data) from the received message to stored information on the selected participant computing device 105. The comparison procedure may be similar to the operations described above with reference to blocks 402-404. For example, the selected participant computing device 105 may compare the received facial data to data stored as contact records within an address book to identify any matching information. In block 413, the selected participant computing device 105 may transmit a report message (or response message) to the user computing device 102 that indicates the results of the comparison operations, such as a message indicating whether any matches were found. The report message may be transmitted via the data link 401.

In block 414, the user computing device 102 may receive the report message (or response message) from the selected participant computing device 105, such as a report message that describes the results of the comparison operations performed by the participant computing device 105. For example, the report message may contain indicators of whether a match was found and, if so, the identity and contact information (e.g., contact record) corresponding to the matching facial data. The report message may also include comparison parameters (e.g., threshold values for facial characteristic evaluations), certainty or likelihood of any match, and alternative matches (e.g., contacts also having similar facial characteristics to the received facial data). In an embodiment, the report message may contain metadata that simply describes the success of the comparison operations performed by the selected participant computing device 105. In an embodiment, the report message may also include suggestions for the user's computing device 102 for continuing the search, such as the next person to whom the user's computing device 102 may transmit the facial data, settings for various algorithms, and other contextual clues that may be used by the user's computing device 102 to further conduct the search for the unknown third-party. For example, the user's computing device 102 may change configurations and re-execute the facial recognition routines in response to the suggestions within the received report message.

In determination block 416, the user computing device 102 may determine whether a match was found by the selected participant computing device 105 based on the received report message. If the report message indicates a match was found between the received facial data and the stored information on the selected participant computing device 105 (i.e., determination block 416="Yes"), the user's computing device 102 may proceed with the operations in block 212 as described above with reference to FIG. 2. However, if the report message indicates that no match was found within the stored information of the selected participant (i.e., determination block 416="No"), in determination block 418, the user's computing device 102 may determine whether there is another video call participant computing device 105 that has not performed facial data comparisons with its stored information. If there are more participant computing devices 105 (i.e., determination block 418="Yes"), the user's computing device 102 may loop back and continue with the operations in block 406 where a next participant computing device 105 may be selected.

FIG. 4B illustrates additional operations of the method 400 that may be performed if all participant computing devices 105 have compared the generated facial/other characteristics data to their stored information and transmitted report messages to the user computing device 102 indicating no matches were found. In the situation in which no matches are found and the user computing device 102 has iterated through all video call participants (i.e., determination block 416 in FIG. 4A="No" and determination block 418 in FIG. 4A="No"), the user computing device 102 may perform the operations in block 420 shown in FIG. 4B, and may set a first list as the list of participant computing devices 105. In other words, the user computing device 102 may initialize a data structure (e.g., an array) to include a list of the participant computing devices 105 that are participating in the current video call (or video conversation). The first list may be changed to include other device identities and/or contact information in a recursive fashion based on the operations described below. For example, the user computing device 102 may be configured to recursively transmit additional messages requesting contact information of the unknown third-party.

In block 422, the user computing device 102 may select a next device on the first list, such as by selecting a next participant computing device 105 using similar operations as described above with reference to block 406 in FIG. 4A. In block 424, the user computing device 102 may transmit a start message with the facial data to the selected device, such as by using the data links 401 to communicate with a participant computing device 105. The start message may include a command, code, metadata, instructions, or other information that may instruct recipient computing devices to begin sending the facial data to descendant computing devices 106 known to those recipient computing devices (e.g., descendant computing devices 106 included within address books stored on participant computing devices 105).

The following descriptions of blocks 451-457 describe the associated operations as being performed by a selected participant computing device 105, and the descriptions of blocks 460-462 are described as being performed by descendant computing devices 106 that are known to the selected participant computing device 105 (e.g., stored within a contacts database of the selected participant computing device 105). However, as the method 400 may utilize recursive techniques to transmit facial data to devices when no matches are found, the blocks 451-457 may be performed by various descendant computing devices 106 as well. In this manner, the search for a match of the unknown third-party may be extended out to computing devices of individuals known to video call participants who are not themselves part of the video call. For example, when no facial data matches are found in the address books of the participant computing devices 105 engaged in the video call, and there are no matches found in information stored in the descendant computing devices 106 listed in the address books of the participant computing devices 105, then those descendant computing devices 106 may receive start messages from the user computing device 102 and may perform the operations in blocks 451-457.

In block 451, the selected participant computing device 105 may receive the start message from the user computing device 102, such as via transmissions using the data links 401.

In block 452, the selected participant computing device 105 may determine descendant contacts (and their respective descendant computing devices 106) close to the selected participant computing device 105. Descendant computing devices 106 (or descendant contacts) may be contacts within the selected participant computing device 105 address book or contact information database. For example, the participant computing device 105 may evaluate stored contact information (e.g., address book on the selected participant computing device 105) and identify descendant computing devices 106 near the estimated location of the unknown third-party. The selected participant computing device 105 may determine descendant computing devices 106 that are located close/near to the selected participant by using GPS coordinates, stored location information previously reported by the descendant computing device 106, and other methods of determining and storing location data of contacts as described above.

In an embodiment, the selected participant computing device 105 may contain radio transceivers (e.g., Bluetooth, Zigbee, Peanut, RF, etc.) configured to exchange radio signals with transceivers within other nearby devices. In this case, the selected participant computing device 105 may determine nearby devices based on return signals by other devices in response to pinging transmissions by the selected participant computing device 105. For example, the selected participant computing device 105 may detect discoverable nearby devices based on Bluetooth transmissions. The selected participant computing device 105 may cross-reference information within returned transmissions (e.g., Bluetooth MAC addresses, device identity information, etc.) with stored information within the selected participant computing device 105 and identity contacts nearby.

Similar to the selection operations performed by the user computing device 102 described above with reference to block 406, in block 453 the selected participant computing device 105 may iteratively select a next descendant computing device 106 for transmitting the received facial characteristic data and request for help in identifying the unknown third-party. For example, the selected participant computing device 105 may choose the descendant computing device 106 determined to be located nearest to the selected participant computing device 105 or the estimated location of the unknown third-party. Similar to how the user's computing device 102 iterates through the participant computing devices 105 in the operations in blocks 406-418, the selected participant computing device 105 may sequentially select and send request messages to descendant computing devices 106 in blocks 451-456.

In block 454, the selected participant computing device 105 may transmit a request message with the received facial/other characteristics data to the selected descendant computing device 106, such as by transmitting messages via wired or wireless data links 472 (e.g., peer-to-peer, Bluetooth, over a LAN, cellular network, etc.). In determination block 456, the selected participant computing device 105 may determine whether there are more descendant computing devices 106 to which request messages may be transmitted. In other words, the selected participant computing device 105 may determine whether there is another descendant computing device 106 that may receive facial data for comparison with stored information. If it is determined that there are other descendant computing devices 106 (i.e., determination block 456="Yes"), the participant computing device may continue performing the operations in block 453 with the next descendant computing device. For example, the selected participant computing device 105 may select the next descendant computing device 106 from a list of nearby devices.

If participant computing device 105 determines that there are no other descendant computing devices 106 (i.e., determination block 456="No"), in block 457 the selected participant computing device 105 may transmit a completion report message to the user computing device 102, such as a transmission via the data link 401. The completion report may be any communication that indicates the selected participant computing device 105 has transmitted the received facial/other characteristics data to all of its descendant computing devices 106 (e.g., all computing devices 106 listed in the address book of the selected participant computing device 105), and may include the identifiers, count, and/or other information about the descendant computing devices 106 so that the user computing device 102 may detect when messages are received from all such descendant computing devices 106.

In an embodiment, the selected participant computing device 105 may be configured to continue with the operations in block 453 based on messages transmitted to the participant computing device 105 by descendant computing devices 106 via the data link 472 (e.g., a confirmation message that a match exists, a denial message that no match exists, etc.). For example, the selected participant computing device may detect that no match was found and proceed to the operations of block 453 based on a selected descendant computing device 106 report message. Alternatively, the selected participant computing device 105 may continue with the operations in block 453 based on additional messages from the user computing device 102 (e.g., periodic prompts when no matching information is detected).

In block 458, the user computing device 102 may receive the completion report from the selected participant computing device 105, such as via the data link 401, and then may continue with the operations in block 422 by selecting a next device. For example, the user computing device 102 may select the next participant computing device 105 from a list of all the participant computing devices 105 currently participating in the video call. In an embodiment, the user computing device 102 may be configured to wait for the completion report before re-executing the operations in block 422, or alternatively may monitor for completion reports to be received from a plurality of participant computing devices 105. For example, the user computing device 102 may transmit start messages to all participant computing devices 105 related to a current video call and then may monitor for completion report messages to be received from each participant computing device 105, in any order.

In block 460, the selected descendant computing device 106 may receive the facial data within the request message from the selected participant computing device 105, such as via the data link 472. In block 461, the selected descendant computing device 106 may compare the received facial data to stored information, such as contact records stored within the address book of the descendant computing device 106, to find possible matches. The comparison procedure may be similar to the operations described above with reference to block 402. In block 462, the selected descendant computing device 106 may transmit a report message (or response message) to the user's computing device 102 describing the results of the comparison operations. In an embodiment, the selected descendant computing device 106 may also transmit a report message to the selected participant computing device 105.

In determination block 463, the user computing device 102 may determine whether the report message (or response message) from the selected descendant computing device 106 is received, such as over a network via wired or wireless data links 473 (e.g., over a LAN, cellular network, etc.). In an embodiment, the user computing device 102 may continually or periodically monitor for received messages (or additional response messages), such as by evaluating a receiving circuit or buffer. If the user computing device 102 determines that no report of contact information and facial data comparisons is received (i.e., determination block 463="No"), the user computing device 102 may continue to perform the operations in determination block 463. For example, the user computing device 102 may continually and/or periodically check for incoming messages to determine whether such reports are received from descendant computing devices 106.

If the user computing device 102 determines that a report is received (i.e., determination block 463="Yes"), in block 464, the user computing device 102 may store information about the descendant computing device 106 in a second list, such as the descendant computing device 106 contact information and/or identifier. The second list may be used to enable recursive operations for selecting devices and transmitting start message as described above with reference to blocks 422-424. In determination block 465, the user computing device 102 may determine whether a match was found based on the received report message. If a match is determined to have been found (i.e., determination block 465="Yes"), the user computing device 102 may proceed with the operations in block 212 as described above with reference to FIG. 2.

If no match is determined to be found (i.e., determination block 465="No"), the user computing device 102 may determine whether more report messages are incoming in determination block 466. In other words, using information within the received completion report from the selected participant computing device 105 as described above, the user computing device 102 may identify whether there are any outstanding report messages left to be received from descendant computing devices 106. For example, the user computing device 102 may compare the second list to information within the completion report to determine whether an expected number of report messages have been received (e.g., one report message per each descendant computing device 106 related to the selected participant computing device 105). If it is determined that more reports are incoming (i.e., determination block 466="Yes"), the user computing device 102 may continue with the operations in determination block 463.

If it is determined that no more reports are incoming from descendant computing devices 106 related to the selected participant computing device 105 (i.e., determination block 466="No"), in determination block 468, the user computing device 102 may determine whether to go to a next level, such as the next level in the operational loop of the method 400. In other words, the user computing device 102 may determine whether to transmit start messages to the descendant computing devices 106 so that the generated facial/other characteristics data may be compared to devices close to the descendant computing devices 106. The determination in determination block 468 may be made based on a stored variable, bit, or other data within the user computing device 102 that indicates how many iterations should be performed searching for a match with the facial data. In some embodiments, the user computing device 102 may be configured to only seek (or request) matches for a predefined number of levels (e.g., descendants) in order to prevent the method 400 from being performed indefinitely. In an embodiment, the determination in determination block 468 may be based on a timer. For example, based on an elapsed timer, a counter value that exceeds a threshold value, or the expiration of a predefined time period, the user computing device 102 may not try a next level of the search. In another embodiment, the determination in determination block 468 may be based on the number of devices from which the user computing device 102 has received report messages (or the number of received response messages). For example, once a certain number of devices have not been able to find a match between the generated facial/other characteristics data and their stored contact information, the user computing device 102 may be configured to end the method 400. If the user computing device 102 determines not to go to a next level (i.e., determination block 468="No"), the method 400 may stop.

If the user computing device 102 determines to go to a next level (i.e., determination block 468="Yes"), in block 470 the user computing device 102 may set the second list as the new first list and may repeat the process beginning with the operations in block 422 as described above. For example, the user computing device 102 may select and transmit a start message to a first descendant computing device 106 from the second list. In this way, the user computing device 102 may continue performing the method 400 in a recursive manner such that the generated facial/other characteristics data is transmitted by descendant computing devices 106 to the contacts listed within the descendants' contact information databases (e.g., address books) until a match to the generated facial/other characteristics data is reported to the user's computing device 102.

In an embodiment, a device may receive redundant request messages regarding the same generated facial/other characteristics data. For example, if a descendant is stored within the address book of multiple participant computing devices 105, the associated descendant computing device 106 may receive many request messages regarding the same unknown third-party. To avoid overburdening devices by processing and responding to redundant request messages, each device that receives transmissions regarding the generated facial/other characteristics data may record (or log) the receipt of such transmissions and reject redundant subsequent messages. A device may determine redundancy by evaluating unique codes within the metadata of the request messages, the facial data details within transmissions (e.g., the transmitted facial data represents a contact with certain characteristics), the sending device (e.g., the user's computing device 102, selected participant computing device 105, etc.), and/or the message timestamp information. For example, a device may determine a message redundant if the device receives that message within a certain time period after receiving a previous message describing similar facial/other characteristics data. If a message regards a previously addressed facial data and is therefore redundant, the particular contact device may ignore the message and/or transmit a message indicating the redundancy.

In an embodiment, the user's computing device 102 may maintain a list of all devices that have received the generated facial/other characteristics data. If a match is found within the stored information of any device (i.e., determination block 404="Yes" or determination block 416="Yes"), whether it be a participant computing device 105 or a contact of a participant computing device (e.g., a descendant computing device 106), the user's computing device 102 may transmit messages to all the devices indicating that the search is completed. In an embodiment, the user's computing device 102 may provide the identity and contact information of the unknown third-party to all devices that received the generated facial/other characteristics data.

In another embodiment, the user may identify the unknown third-party by directly transmitting identification request messages to specific recipients who may or may not be participants of the video call. For example, the user's computing device 102 may transmit identification request messages to the device of the user's friend on vacation and not engaged in the video call. As another example, an identification request message may be transmitted to the computing device of a participant of the video call. Identification request messages may be distinct transmissions from video call communications, and may be transmitted in various electronic message data formats, such as emails, application-specific messaging (e.g., chat program communications), and SMS text messages. Identification request messages may include generated facial/other characteristics data and/or video imagery associated with the video call, and may be handled automatically by the specific recipient's device. For example, the specific recipient's device may receive the identification request message and immediately compare contact information and pictures stored on the specific recipient's device to the information within the request transmission. Alternatively, the identification request may be an explicit prompt requiring the specific recipient to view the transmitted imagery and respond to the user's request. For example, the user's computing device 102 may transmit an identification request message to a friend who may see the unknown third-party image and respond with the identity. Identification request messages sent to video call participants may prompt the participant to make audible identifications that may be represented within the video call. For example, the participant may receive an identification request message and verbally respond "The unknown third-party is Mr. Smith." In an embodiment, the user's computing device 102 may share photos of the unknown third-party with the specific recipients or the video call data (e.g., streaming video imagery) if the specific recipients are not participants of the video call. In another embodiment, identification request messages may also include audio data, such as audio samples of the unknown third-party speaking, which specific recipient devices may render separately or in combination with related imagery (e.g., "still shot" photographs taken from video call video data).

FIG. 4C illustrates pseudocode 480 that may be suitable for implementing embodiment method 400. The pseudocode 480 may be implemented as a recursive function using any conventional programming or scripting language and may be executed by a user's computing device, a participant computing device, or any other computing device.

Figure 5A:
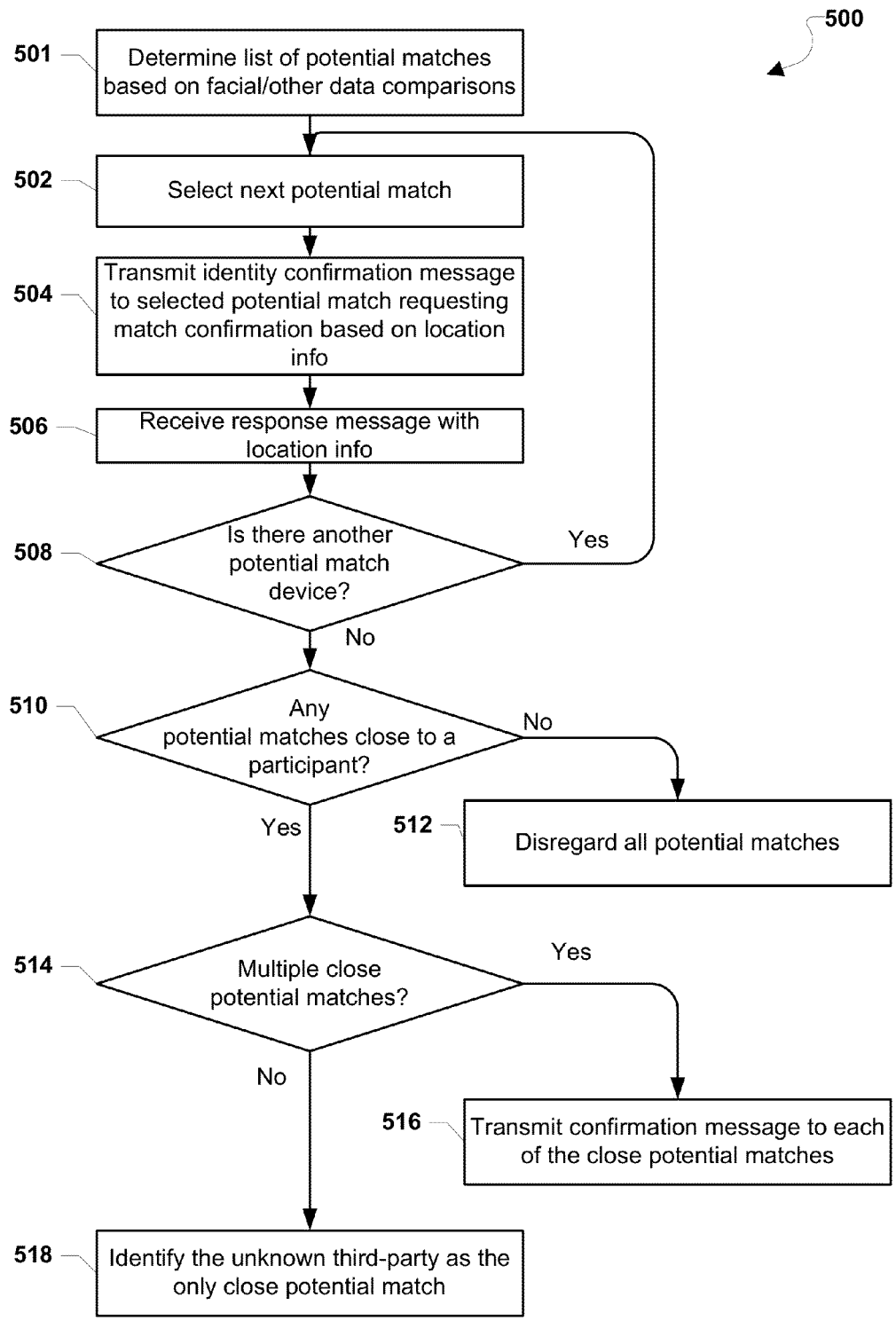
FIGS. 5A and 5B are process flow diagrams illustrating embodiment methods for transmitting identity confirmation messages to potential match computing devices capable of being used with the various embodiments.

FIG. 5A illustrates an embodiment method 500 of a user's computing device transmitting identity confirmation messages to other devices to confirm potential matches of an unknown third-party based on location information. The method 500 may utilize a list of potential matches and confirm the identity of the unknown third-party based on transmitting messages (i.e., identity confirmation messages) that elicit (or request) additional proximity assessments by the potential matches' computing devices. As described above, potential matches may be contacts found within the contact information (e.g., stored address book, contact database, etc.) of the various computing devices associated with the various embodiments. Potential matches may have corresponding facial data within a certain tolerance threshold of similarity to the generated facial/other characteristics data, voice confirmation data, and/or any other information used to determine identities of unknown third-parties.

The method 500 for confirming potential matches may be conducted in tandem with the operations within embodiment methods 400, 600, 700, or alternatively, as a separate activity in response to computing devices determining the existence of multiple potential matching contacts. For example, the method 500 may be executed by the user's computing device during the operations in determination block 416 described above. As another example, participant computing devices and descendant computing devices may perform identity confirming operations of method 500 prior to transmitting report messages to the user's computing device. Although the following description illustrates actions initiated by the user's computing device, the method 500 may be executed by any computing device associated with operations for identifying an unknown third-party seen within a video call, including the user's computing device, participant computing devices, and descendant computing devices.

In block 501, the user's computing device may determine a list of potential matches based on the evaluations described above with reference to the operations in determination blocks 404 and 416. The list may include more than one potential match, and may be a data table that includes device contact information associated with the potential match (e.g., smartphone numbers, emails, etc.), as well as the identity of the device (e.g., video call participant computing device, descendant computing device, etc.) that provided the potential match information. For example, the data table may contain the identity of the descendant computing device that transmitted a report message containing the potential match information to the user's computing device. Additionally, the data table may contain location information, such as GPS coordinates, for the device that provided the potential match information.

In blocks 502-508, the user's computing device may execute an operational loop for iteratively transmitting messages to each of the potential matches' computing devices. In block 502, the user's computing device may select the next potential match and identify the corresponding contact information (e.g., smartphone contact number) from the data table. In block 504, the user's computing device may automatically transmit an identity confirmation message to the selected potential match's computing device requesting match confirmation based on location information of the potential match device. For example, the identity confirmation message may direct the selected potential match's computing device to respond with GPS coordinates of the potential match's computing device. In an embodiment, the user's computing device may transmit location information of video call participants (e.g., GPS coordinates) to the potential match, and request that the potential match's computing device calculate distance values to the participants. For example, the identity confirmation message may direct the selected potential match computing device to determine the distance to the participant computing device that generated the video imagery showing the unknown third-party. In block 506, the user's computing device may receive a response message from the potential match's computing device and may record the location information therein.

In determination block 508, the user's computing device may determine whether there is another potential match computing device to contact. If so (i.e., determination block 508="Yes"), the user's computing device may continue the operational loop with the operations in block 502 and may continue the loop until the user's computing device has transmitted identity confirmation messages to all potential matches' computing devices. In an embodiment, if the identity confirmation messages are not responded to by the potential matches' computing devices, the user's computing device may continue the operational loop after a predefined waiting period, may re-transmit the identity confirmation messages, and/or may determine alternative computing device contact addresses to transmit identity confirmation messages.

If there are no more potential matches' computing devices to contact (i.e., determination block 508="No"), in determination block 510 the user's computing device may determine whether any of the potential matches are confirmed to be close to a participant based on the received response messages (i.e., match confirmation). As described above, the response messages may confirm (or deny) matches based on included location information (i.e., location information of potential matches indicates proximity to video participants). For example, the user's computing device may determine proximities of potential matches and identify whether any potential matches' computing devices reported to be within a close distance of any of the video call participants match. In an embodiment, a close distance may be defined by a predefined threshold value supplied by default or by user configuration files. If the response messages contained GPS coordinates of the potential matches instead of distances, the user's computing device may calculate the distance between the various potential matches' computing devices and the various video call participants' computing devices based on location information stored within the data table. Alternatively, the user's computing device may request the location information of the video call's participants if not previously acquired.

If none of the potential matches' computing devices are determined to be close to any video call participant (i.e., determination block 510="No"), in block 512 the user's computing device may disregard all the potential matches (e.g., mark as not matching the generated facial/other characteristics data), and the method 500 may end. In an embodiment, before disregarding all potential matches when none are determined to be within proximity of video call participants, the user's computing device may transmit additional confirmation messages to each of the potential matches as described below with reference to the operations in block 516.

However, if at least one potential match is determined to be close to a video call participant (i.e., determination block 510="Yes"), the user's computing device may determine whether multiple potential matches' computing devices are close to a video call participant in determination block 514. If there are not multiple close potential matches (i.e., determination block 514="No"), the user's computing device may identify the unknown third-party as the sole potential match reported to be close to a video call participant in block 518.

If multiple potential matches' computing devices are close to video call participants (i.e., determination block 514="Yes"), in block 516 the user's computing device may transmit additional confirmation messages to the various potential matches' computing devices. The additional confirmation messages may prompt the potential matches to respond regarding whether they are shown within the video call imagery. For example, the additional confirmation message may prompt a potential match's computing device to display a dialog box, text message, or email that requests that the potential match provide a response message. As another example, a potential match receiving an additional confirmation message may be prompted to audibly or visibly confirm (e.g., speak or make a physical motion) his/her proximity to video call participants such that the audible/visible confirmation may be detected within the video call data. In an embodiment, in the event of multiple potential matches close to video call participants, the user' computing device may re-examine the facial data of each of the potential matches, and may focus (i.e., decrease) the tolerance of the facial recognition algorithm to disregard potential matches having less similar facial data to the generated facial/other characteristics data. In another method, the user's computing device may evaluate the multiple potential matches located close to video call participants using additional criteria other than facial data, such as distinctive markings (e.g., tattoos, moles, logos/trademarks displayed on a T-shirt or hat, etc.), voice/audio data associated with contact records, and/or lip movement information from the video call imagery. In an embodiment, if there are multiple close potential matches, the user's computing device may determine the identity of the unknown third-party as the closest (e.g., the shortest distance) to the participant computing device that generated the video imagery showing the unknown third-party.

In an embodiment, the user's computing device may transmit confirmation messages to video call participants' computing devices reported to be close to the various potential matches. For example, the video call participant computing devices may receive confirmation messages including video imagery of the unknown third-party and requesting the respective video call participants to confirm that the potential match contact is the unknown third-party.

In an embodiment, the user's computing device may alternatively prompt the user to select potential match contacts from a list and, in response, may transmit identity confirmation messages to the selected potential match computing device. In another embodiment, the user's computing device may continually display the results of the identity confirmation messages, or alternatively, may conduct all of the operations within method 500 automatically, only prompting the user when a match is confirmed. In another embodiment, the user's computing device may display the images of all potential matches so that the user may quickly invalidate certain potential matches by sight. For example, the user's computing device may render the pictures of all potential matches and in response, the user may provide confirmation or rejection input data.

Figure 5B:
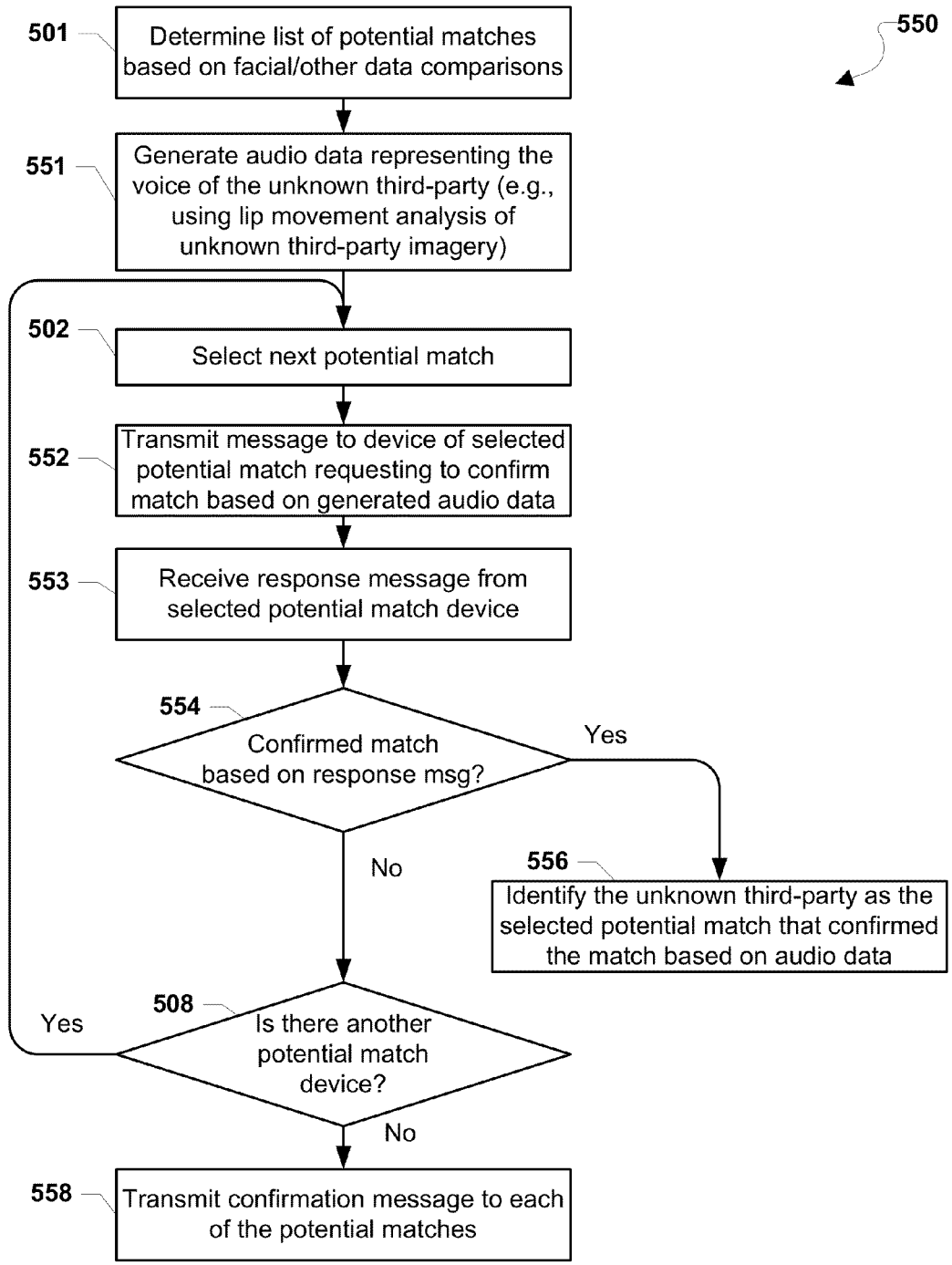

FIG. 5B illustrates an embodiment method 550 of a user's computing device transmitting identity confirmation messages to computing devices to confirm potential matches of an unknown third-party based on audio data within various contact databases. The method 550 is similar to the method 500 described above, with the exception that the user's computing device may transmit identity confirmation messages that include audio data configured for voice confirmation operations within potential matches' computing devices. In block 501, the user's computing device may determine a list of potential matches based on facial data comparisons. In block 551, the user's computing device may generate audio data representing the voice of the unknown third-party. As described above, the audio data may be generated by, at the least, analyzing lip movement within the imagery of the video call data and isolating related audio information of the unknown third-party.

In block 502, the user's computing device may select a next potential match, such as the next potential match in a list as determined with the operations in block 501. In block 552, the user computing device may transmit an identity confirmation message that includes the generated audio data to a device associated with the selected potential match (or a selected potential match device), requesting match confirmation based on the generated audio data. Based on receiving the identity confirmation message, the selected potential match device may compare the identity confirmation message audio data to locally-stored audio data (e.g., audio data within a locally-stored contacts database) and determine whether to confirm a match based on the audio data. In an embodiment, the identity confirmation message may prompt the user of the selected potential match device to generate audio data by speaking into the selected potential match device. For example, the identity confirmation message may request the user of the selected potential match device to say a certain phrase that is the same as represented by the identity confirmation message audio data.

In block 553, the user's computing device may receive a response message from the selected potential match device. In determination block 554, the user's computing device may determine whether a match is confirmed based on the received response message. The response message may include a code or other information that indicates whether a match was found. In an embodiment, the response message may contain audio data from the selected potential match device that the user's computing device may evaluate to determine whether there is a match. If no match is confirmed based on the received response message (i.e., determination block 554="No"), in determination block 508 the user's computing device may determine whether there are more potential matches to evaluate. If so (i.e., determination block 508="Yes"), the user's computing device may continue to iteratively select potential matches in block 502. If there are no more potential matches (i.e., determination block 508="No"), in block 558 the user's computing device may transmit additional confirmation messages to all of the potential match devices. These additional confirmation messages are similar to as described above with reference to the operations in block 516.

If a match is confirmed based on the received response message from the potential match device (i.e., determination block 554="Yes"), in block 556 the user's computing device may identify the unknown third-party as the selected potential match that confirmed the match based on the audio data.

In an embodiment, the user's computing device may transmit identity confirmation messages to all potential match devices regardless of information contained within response messages. For example, the user's computing device may request confirmation information from all potential match devices for subsequent storage and evaluation. As another example, the user's computing device may receive and rank confirmation data from all potential match devices based on the level of similarity between of audio data within received response messages and the transmitted identity confirmation message.

In various embodiments, identity confirmation messages as described above may prompt recipient computing devices to confirm potential matches using any combination of evaluating location information (and proximity evaluations), facial data (e.g., generated facial/other characteristics data, photographs, still imagery taken from video call data, etc.), audio data (e.g., voice audio samples, voice confirmation data describing contacts, etc.), and/or prompts for audible/visual actions by the potential matches. For example, a potential match computing device receiving a identity confirmation message from the user's computing device may confirm a match by comparing audio data within the identity confirmation message to locally stored audio data and prompting the potential match user to wave his/her hands.

Figure 6A:
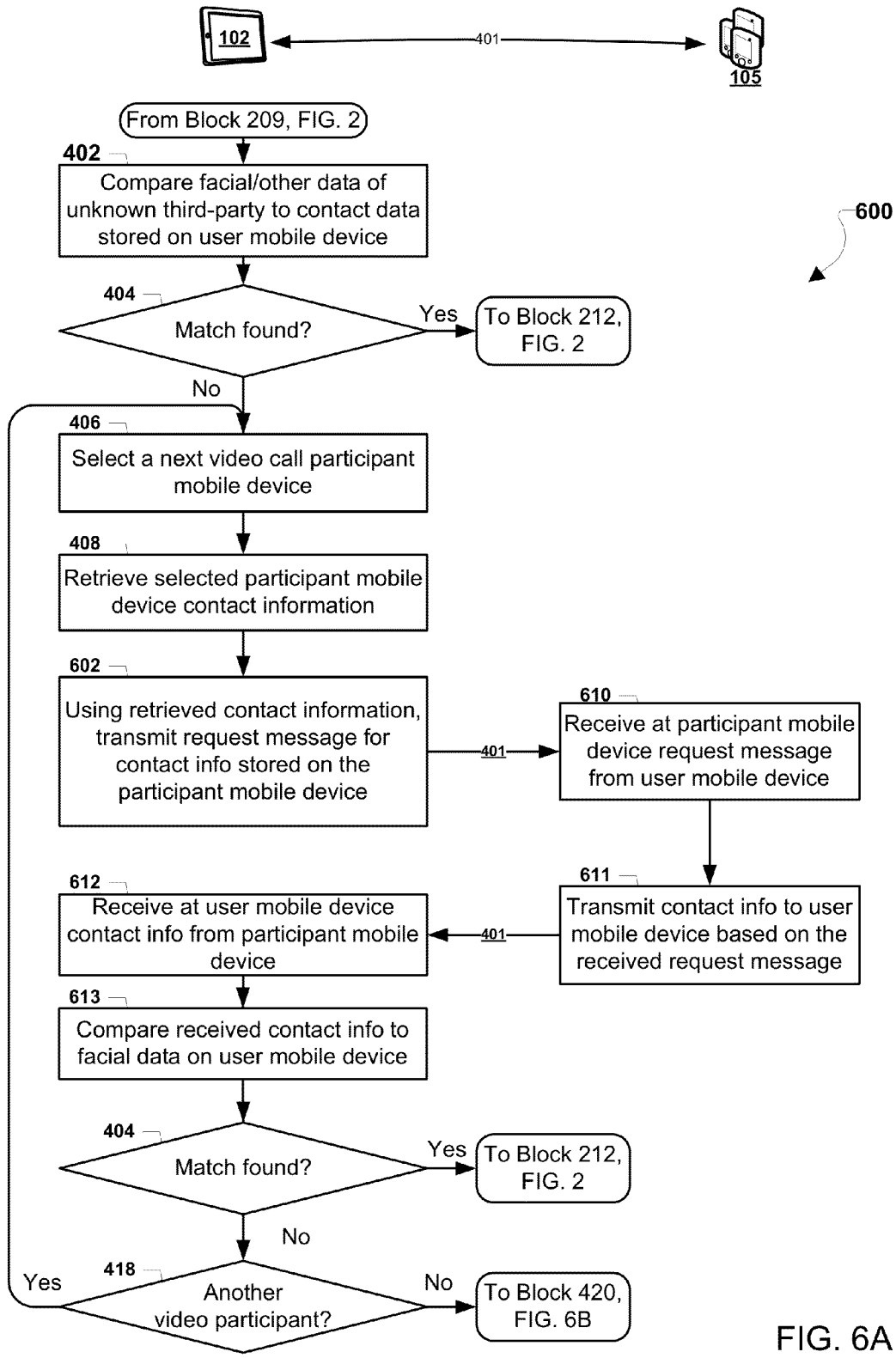
FIGS. 6A, 6B, 7A and 7B are process flow diagrams illustrating further embodiment methods for comparing facial recognition data to contact information stored within user databases.
Figure 6B:
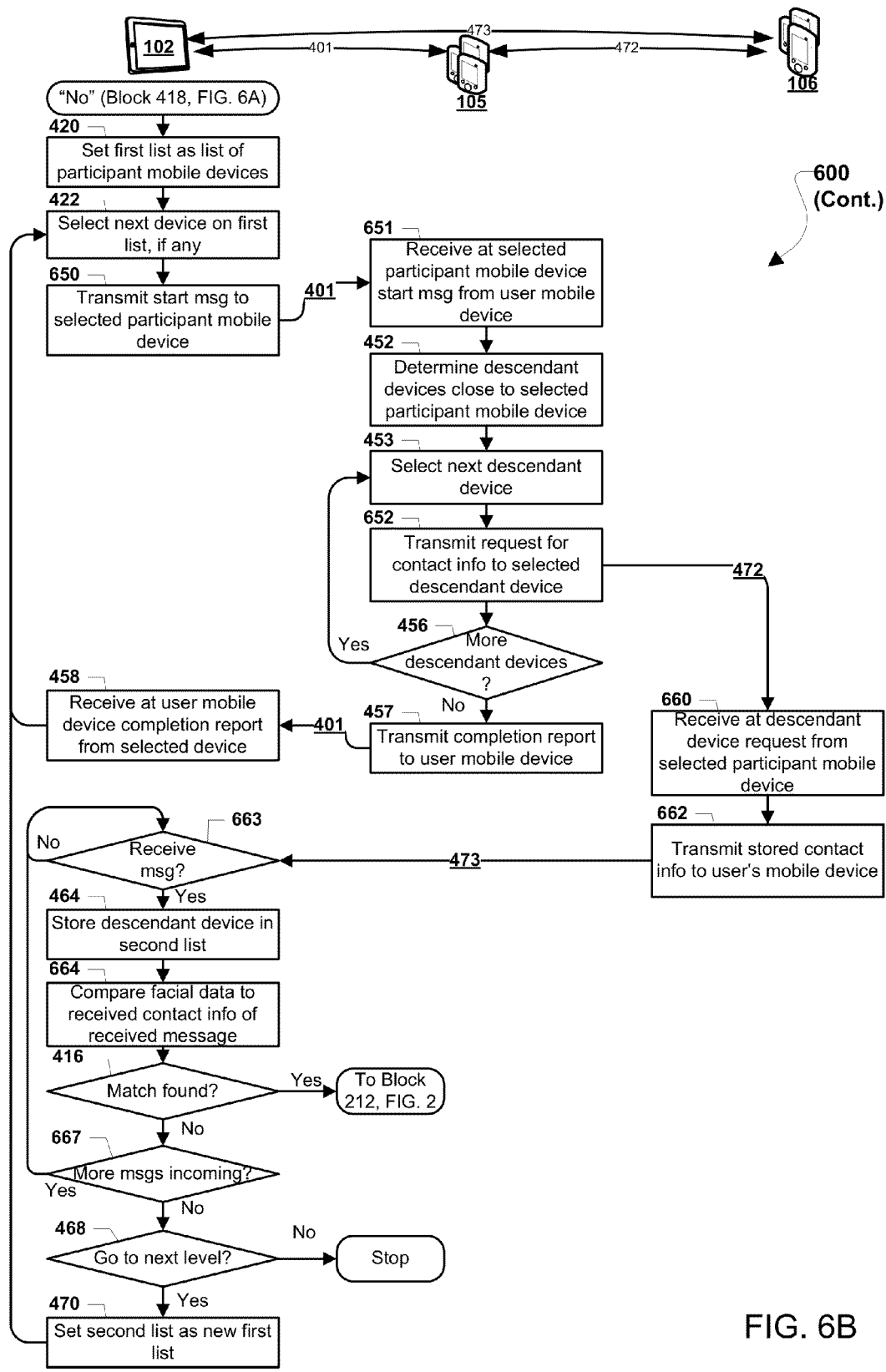

FIGS. 6A and 6B illustrate an embodiment method 600 that searches for an unknown third-party by receiving contact information from various devices within a user's computing device. In FIG. 6A, embodiment method 600 is similar the method 400 described above, except instead of transmitting generated facial/other characteristics data to participant computing devices 105 (and descendant computing devices 106), the user's computing device 102 may iteratively request and receive contact information for local evaluation against the generated facial/other characteristics data within the user's computing device 102.

As described above, in block 402, the user's computing device 102 may compare generated facial/other characteristics data of an unknown third-party, such as facial data generated with the operations in the block 209, to contact data that is stored on the user computing device 102. In determination block 404, the user computing device 102 may determine whether any data within the stored information matches the generated facial/other characteristics data for the unknown third-party. If the user computing device 102 finds a match between the generated facial/other characteristics data and facial data associated with a contact in the stored information (i.e., determination block 404="Yes"), the user computing device 102 may continue with the operations in block 212 as described above with reference to FIG. 2.

If no match is found within the stored information contained within the user computing device 102 (i.e., determination block 404="No"), the user computing device 102 may execute an operational loop in which the user computing device 102 may contact each of the video call participant computing devices 105 to continue the search for the unknown third-party. Accordingly, in block 406, the user computing device 102 may select a next video call participant computing device 105. If the video call includes multiple participants, the user computing device 102 may contact each participant in a particular order so that all participants are contacted at most one time. In block 408, the user computing device 102 may retrieve (or look-up) contact information for communicating with the selected participant computing device 105, such as by accessing a local address book, contact information database, or other technique of retrieving the participant information.

In block 602, using the retrieved contact information, the user computing device 102 may transmit a message to the participant computing device 105 that requests contact information stored on that participant computing device 105. For example, the request message may be transmitted to the selected participant computing device 105 via the data link 401. The request message may prompt the participant computing device 105 to gather and return contact information for various contacts known to the participant computing device 105. For example, the request message may include a code or command that instructs the selected participant computing device 105 to transmit messages via the data links 401 that includes address book information. Request messages may be sent via any type of messaging between the computing devices, such as an SMS message or an email message, with which the user computing device 102 may deliver facial/other characteristics data. The request message may include codes or other secret information that indicates the user computing device 102 may be authorized to receive the contact information from the selected participant computing device 105.

In block 610, the selected participant computing device 105 may receive the request message from the user's computing device 102. In block 611, the selected participant computing device 105 may transmit contact information to the user's computing device 102 based on the received request message. For example, the selected participant computing device 105 may package contact data, such as address book records (e.g., email addresses, names, addresses, facial/other characteristics data, images, etc.), and transmit the packaged data in messages (or response messages) via the data link 401.

In block 612, the user computing device 102 may receive the contact information from the selected participant computing device 105, such as a message that includes facial data information of persons known to the selected participant computing device 105.

In block 613, the user computing device 102 may compare contact information received from the selected participant computing device 105 with the generated facial/other characteristics data. The user's computing device may merge the contact information transmitted by the participant computing device 105 with the locally stored information within the user computing device 102. For example, upon receiving the delivery of information from the selected participant computing device 105, the user computing device 102 may add all of the information transmitted by the selected participant computing device 105 into the contact information database stored on the user computing device 102. The user's computing device 102 may search for matches between the generated facial/other characteristics data and either the combined stored contact information or only the information received from the participant computing device 105. In an embodiment, the user's computing device 102 may use the received contact information from the participant computing device 150 to supplement or correct pre-existing contact information within the user address book. For example, the user's computing device 102 may add an additional email address to the contact record for an individual based on received participant information.

Similar to as described above with reference to FIG. 4A, in determination block 404 the user's computing device 102 may determine whether a match is found, such as a match between the facial/other characteristics data of the unknown third-party and the stored contact information. If a match is found (i.e., determination block 404="Yes"), the user computing device 102 may continue with the operations described above with reference to block 212 in FIG. 2. However, if no match is found (i.e., determination block 404="No"), the user computing device 102 may determine whether there is another video participant (i.e., the next participant computing device 105) to select in determination block 418. If it is determined that there are additional participant computing devices 105 to select and contact (i.e., determination block 418="Yes"), the user computing device may continue with the operations in block 406 and may iterate through the participant computing devices in the manner described above by requesting contact information from the other participant computing devices 105.

FIG. 6B illustrates additional operations of the method 600 that may be performed if the contact information from all participant computing devices 105 has been compared by the user computing device 102 to generated facial/other characteristics data and no matches were found. In this situation when no match is found and the user's computing device 102 has iterated through all video call participants (i.e., determination block 404 in FIG. 6A="No" and determination block 418 in FIG. 6A="No"), the user computing device 102 may return to block 420 in FIG. 6B to perform another pass through the loop to prompt each participant computing device 105 to transmit request messages to close (or nearby) descendant computing devices 106.

As described above, in block 420, the user computing device 102 may set a first list as the list of participant computing devices 105. In block 422, the user computing device 102 may select a next device on the first list, such as by selecting a participant computing device 105 using similar operations as described in block 406. In block 650, the user computing device 102 may transmit a start message the selected device, such as by using the data links 401 to communicate with a selected participant computing device 105. The start message may include a command, code, metadata, instructions, or other information that may instruct recipient devices to begin transmitting messages to descendant computing devices 106 requesting that contact information be transmitted to the user computing device 102 for further processing.

The following descriptions of blocks 651-652 and 452-457 describe the associated operations as being performed by a selected participant computing device 105, and the descriptions of blocks 660-662 are described as being performed by descendant computing devices 106 that are known to the selected participant computing device 105. However, as the method 600 may utilize recursive techniques to transmit requests for contact information to be delivered to the user's computing device 102, the blocks 651-652 and 452-457 may be performed by various descendant computing devices 106 as well in a similar manner. For example, based on operating parameters (e.g., threshold values for the number of times to recursively perform operations of the method 600), descendant computing devices 106 may also receive start messages from the user computing device 102 and may perform the operations in blocks 651-652 and 452-457.

In block 651, the selected participant computing device 105 may receive the start message from the user computing device 102, such as via transmissions using the data links 401. In block 452, the selected participant computing device 105 may determine descendant contacts (and their respective descendant computing devices 106) close to the selected participant computing device 105. Similar to the selection operations performed by the user computing device 102 as described above with reference to block 406, in block 453 the selected participant computing device 105 may iteratively select a next descendant computing device 106 for transmitting the requests for contact information to be sent to the user computing device 102 to enable identifying the unknown third-party.

In block 652, the selected participant computing device 105 may transmit a request message to the selected descendant computing device 106, such as a message requesting that contact information stored on the descendant computing device 106 be transmitted to the user computing device 102. The request message may be transmitted using the wired or wireless data link 472, and may include return address information for the user computing device 102 (e.g., a return IP address, an email address, etc.) so that the selected descendant computing device 106 may transmit messages to the user computing device 102. In an embodiment, the return address information may or may not identify the identity of the user of the user computing device 102 (e.g., only anonymous contact information may be given). In determination block 456, the selected participant computing device 105 may determine whether there are more descendant computing devices 106 to which request messages may be transmitted. If it is determined that there are other descendant computing devices 106 (i.e., determination block 456="Yes"), then the operational loop may continue with the operations in block 453. If there are no other descendant computing devices 106 for the selected participant computing device 105 to select (i.e., determination block 456="No"), in block 457 the selected participant computing device 105 may transmit a completion report message to the user computing device 102, such as a transmission via the data link 401 as described above.

In block 458, the user computing device 102 may receive the completion report from the selected participant computing device 105, such as via the data link 401, and then may continue with the operations in block 422 by selected a next device.

In block 660, the selected descendant computing device 106 may receive the request message from the selected participant computing device 105, such as via the data link 472.

In block 662, the selected descendant computing device 106 may transmit stored contact information to the user computing device 102 in response to receiving the request message. For example, the descendant computing device 106 may package and transmit a response message that includes data records from a contacts database stored in the descendant computing device 106. In an embodiment, the selected descendant computing device 106 may also transmit a message to the selected participant computing device 105 indicating the stored contact information.

In determination block 663, the user computing device 102 may determine whether a message (or response message) from the selected descendant computing device 106 is received, such as via wired or wireless data links 473 (e.g., over a LAN, cellular network, etc.). In an embodiment, the user computing device 102 may continually or periodically monitor for received messages (or additional response messages), such as by evaluating a receiving circuit or buffer. Additionally, the user computing device 102 may evaluate any received messages to determine whether such received messages are from descendant computing devices 106 and/or in response to requests for contact information. For example, the user computing device 102 may parse, analyze, and otherwise process data within received messages to determine whether the messages contain contact data. If the user computing device 102 determines that no message with contact information has been received (i.e., determination block 663="No"), the user computing device 102 may continue to perform the operations in determination block 663. For example, the user computing device 102 may continually and/or periodically check for incoming messages to determine whether contact information is received. When the user computing device 102 determines that a message with contact information is received (i.e., determination block 663="Yes"), in block 464, the user computing device 102 may store information about the descendant computing device 106 in a second list, such as the descendant computing device 106 contact information and/or identifier.

In block 664, the user computing device 102 may compare the facial data (or facial/other characteristics data) to the contact information in the received message from the descendant computing device 106. The operations in block 664 may be similar to the operations described above with reference to block 613. In determination block 416, the user computing device 102 may determine whether a match was found based on the comparisons. If a match is determined to have been found (i.e., determination block 416="Yes"), the user computing device 102 may proceed with the operations in block 212 as described above with reference to FIG. 2. If no match is determined to be found (i.e., determination block 416="No"), in determination block 667, the user computing device 102 may determine whether more messages from descendant computing devices 106 are incoming. In other words, using information within the received completion report from the selected participant computing device 105 as described above, the user computing device 102 may identify whether there are any outstanding messages with contact information left to be received from descendant computing devices 106. For example, the user computing device 102 may compare the second list to information within the completion report to determine whether an expected number of messages have been received (e.g., one message with contact information per each descendant computing device 106 related to the selected participant computing device 105). If it is determined that more messages are incoming (i.e., determination block 667="Yes"), the user computing device 102 may continue with the operations in determination block 463.

If it is determined that no more messages are incoming from descendant computing devices 106 related to the selected participant computing device 105 (i.e., determination block 667="No"), in determination block 468, the user computing device 102 may determine whether to go to a next level, such as the next level in the operational loop of the method 600. In other words, the user computing device 102 may determine whether to transmit start messages to the descendant computing devices 106 so that requests for more contact information may be transmitted to computing devices close to the descendant computing devices 106 (i.e., descendants of the descendants). If the user computing device 102 determines not to go to a next level (i.e., determination block 468="No"), the method 600 may stop.

If the user computing device 102 determines to go to a next level (i.e., determination block 468="Yes"), the user computing device 102 may set the second list as the new first list and may continue with the operations in block 422 in block 470. For example, the user computing device 102 may select and transmit a start message to a first descendant computing device 106 from the second list. In this way, the user computing device 102 may continue performing the method 600 in a recursive manner such that contact information is transmitted to the user computing device 102 by contacts listed within the descendant computing device 106 contact information databases (e.g., address books) until the user computing device 102 identifies a match to the generated facial/other characteristics data.

In an embodiment, the user's computing device 102 may transmit all request messages regarding the method 600. For example, recipients of request messages may only respond to the user's computing device 102 with their contact information and may not in turn transmit request messages to the contacts. In this manner, the user's computing device may incur a greater toll on its resources, but may more easily control the duration and expanse of the search for the unknown third-party identification and contact information.

Figure 7A:
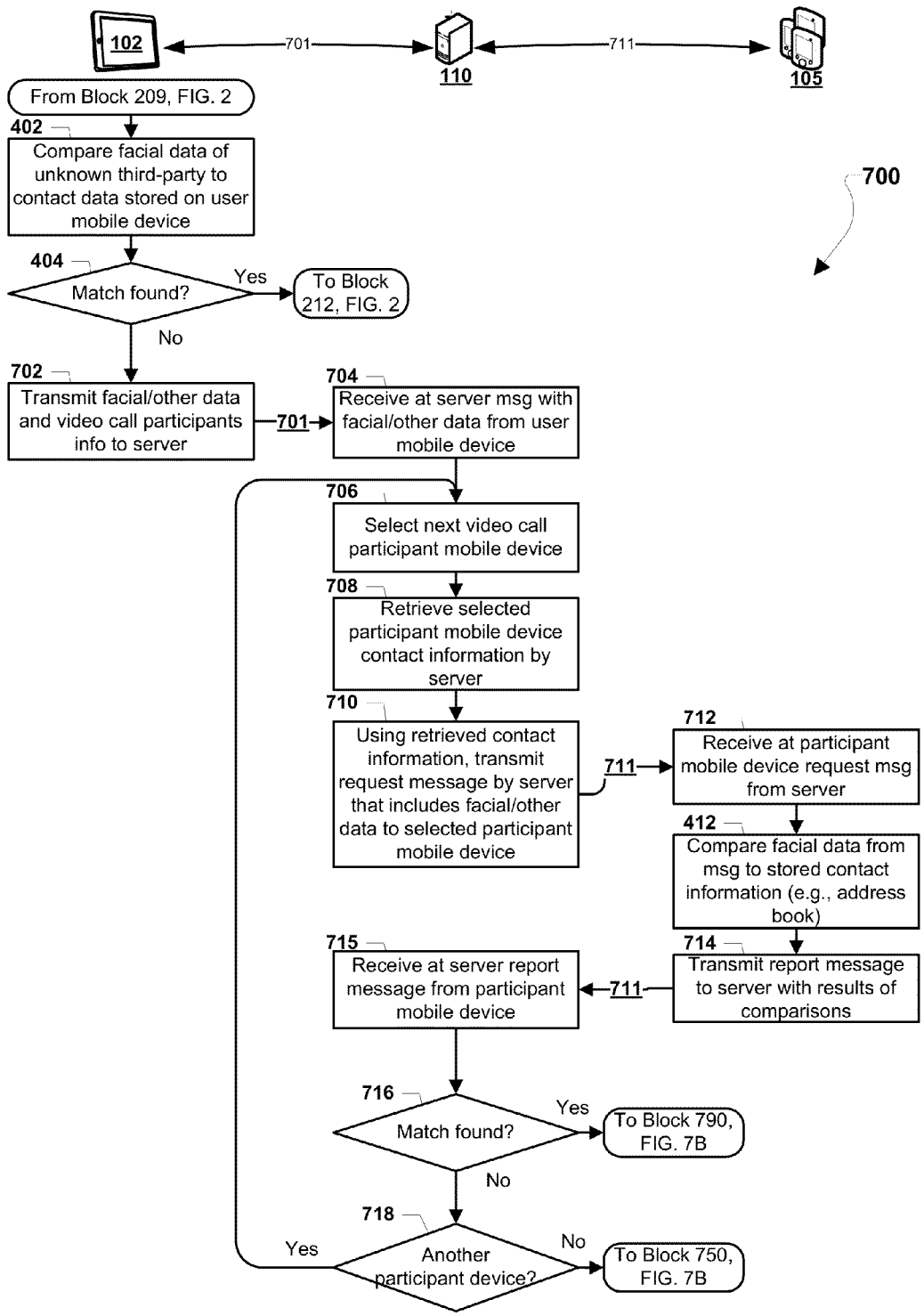
Figure 7B:
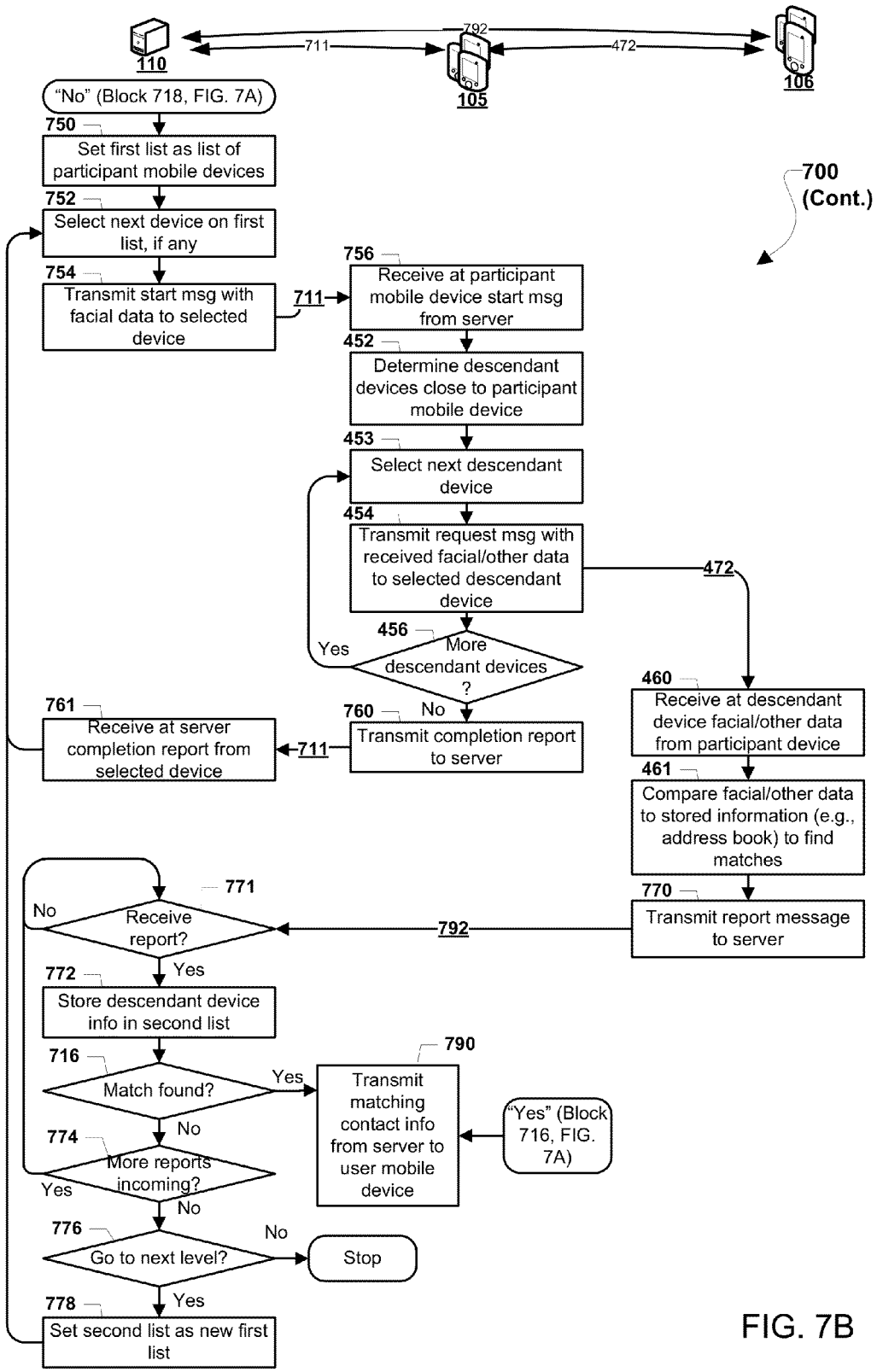

FIGS. 7A and 7B illustrate another embodiment method 700 for identifying an unknown third-party by comparing facial/other characteristics data in multiple devices. The method 700 is similar to the method 400 described above with reference to FIGS. 4A and 4B, except instead of the user's computing device 102 transmitting generated facial/other characteristics data to participant computing devices 105 (and descendant computing devices 106), the user's computing device 102 may transmit the facial data to a server 110 which may communicate with participant computing devices 105 (and descendant computing devices 106).

In block 402, the user's computing device 102 may compare facial data (i.e., the generated facial/other characteristics data) of the unknown third-party (e.g., an image) to contact data stored on the user's computing device 102. In determination block 404, the user computing device 102 may determine whether a match is found between the generated facial/other characteristics data and the stored data on the user mobile device 102. If a match is found (i.e., determination block 404="Yes"), the user's computing device 102 may perform the operations in block 212 described above with reference to FIG. 2.

If no match is found (i.e., determination block 404="No"), in block 702, the user's computing device 102 may transmit the generated facial/other characteristics data and video call participant information to the server 110 for furtherance. The user computing device 102 may utilize a wired or wireless data link 701 to transmit the message to the server 110 via a network (e.g., the Internet, LAN, cellular network, etc.). The information describing the video call participants may be a list of contact records from a database and may include names and contact information for the participant computing devices 105, such as email addresses, IP addresses, Skype user names, or any other destination information for sending electronic messages. In an embodiment, the server 110 may already possess the participant information used to establish the video call. For example, the server 110 may store and route video data associated with the user of a particular video conferencing/calling service or software. As another example, the server 110 may maintain the local area network upon which the video call is transmitted by the various devices.

In block 704, the server 110 may receive the message with the facial data and video call participants information from the user computing device 102, such as via the data link 701. The operations in blocks 706-718 are similar to operations performed by the user computing device 102 as described above with reference to FIG. 4A. In block 706, the server 110 may iteratively select a next participant computing device 105, such as the next in a list of participants received in the message from the user computing device 102. In block 708, the server 110 may retrieve (e.g., look-up or otherwise determine) the contact information for the selected participant computing device 105. In block 710, using the retrieved contact information, the server 110 may transmit a request message that includes the facial/other characteristics data the selected participant computing device 105. For example, the request message may include a request command for the selected participant computing device 105 to compare the included facial data to contact information stored on the selected participant computing device 105 (e.g., stored address book information). The server 110 may transmit the request message to the participant computing device 105 over a network via data links 711, such as Internet protocol transmissions over a wide area network (e.g., Internet).

In block 712, the selected participant computing device 105 may receive the request message from the server 110. As described above, in block 412, the selected participant computing device 105 may compare the received facial data to stored contact information within the participant computing device 105. In block 714, the participant computing device 105 may transmit a report message (or response message) to the server 110, such as via transmissions over the Internet using the data link 711, that indicates any findings or matches based on the comparison operations.

In block 715, the server 110 may receive the report message (or response message) from the participant computing device 105, such as a report message indicating the results of comparison operations of the facial/other characteristics data to contact information stored in the participant computing device 105. Similar to operations performed by the user computing device 102 and described above reference to in the operations in determination block 416 of FIG. 4A, in determination block 716 the server 110 may determine whether a match was found based on the received report message from the selected participant computing device 105. If there was a match (i.e., determination block 716="Yes"), the server 110 may continue with the operations in block 790 described below with reference to FIG. 7B. If no match was found as indicated in the received report message (i.e., determination block 716="No"), in determination block 718, the server 110 may determine whether there is another participant computing device 105. If there is another participant computing device 105 (i.e., determination block 718="Yes"), the server 110 may continue with the operational loop by executing the operations in block 706.

FIG. 7B illustrates additional operations of the method 700 that may be performed if all participant computing devices 105 have compared the facial/other characteristics data to their stored information and transmitted report messages to the server 110 indicating no matches were found. In particular, if no matches are found and the server 110 has iterated through all video call participants (i.e., determination block 716 in FIG. 7A="No" and determination block 718 in FIG. 7A="No"), the server 110 may start another operational loop by selecting a participant computing device 105, similar to the operations performed by the user computing device 102 described above with reference to FIG. 4B. In block 750, the server 110 may set a first list as the list of participant computing devices 105. In other words, the server 110 may initialize a data structure (e.g., an array) to include a list of the devices that are participating in the current video call (or video call). In block 752, the server 110 may select a next device on the first list, such as by selecting a participant computing device 105. In block 754, the server 110 may transmit a start message with the facial data to the selected device, such as by using the data links 711 to communicate with a participant computing device 105. As described above, the start message may include a command, code, metadata, instructions, or other information that may instruct recipient devices to begin sending the facial data to descendant computing devices 106 known to the recipient devices (e.g., descendant computing devices 106 included within address books stored on participant computing devices 105).

In block 756, the selected participant computing device 105 may receive the start message from the server 110, such as via transmissions using the data links 711. In block 452, the selected participant computing device 105 may determine descendant contacts (and their respective descendant computing devices 106) close to the selected participant computing device 105. For example, the participant computing device 105 may evaluate stored contact information (e.g., address book on the selected participant computing device 105) and identify descendant computing devices 106 near the estimated location of the unknown third-party. In block 453 the selected participant computing device 105 may iteratively select a next descendant computing device 106 for transmitting the facial characteristic data and request for help in identifying the unknown third-party. For example, the selected participant computing device 105 may choose the descendant computing device 106 determined to be located nearest to the selected participant computing device 105 or the estimated location of the unknown third-party. Similar to how the user computing device 102 iterates through the participant computing devices 105 in the operations in blocks 406-418, the selected participant computing device 105 may sequentially select and send request messages to descendant computing devices 106 in blocks 453-456.

In block 454, the selected participant computing device 105 may transmit a request message with the received facial/other characteristics data to the selected descendant computing device 106, such as by transmitting messages via wired or wireless data links 472 (e.g., peer-to-peer, Bluetooth, over a LAN, cellular network, etc.). The request message may include return address information for the user computing device 102 (e.g., a return IP address, an email address, etc.) so that the selected descendant computing device 106 may transmit messages to the user computing device 102.

In an embodiment, the return address information may or may not identify the identity of the user of the user computing device 102 (e.g., only anonymous contact information may be given). In determination block 456, the selected participant computing device 105 may determine whether there are more descendant computing devices 106 to which request messages may be transmitted. If it is determined that there are other descendant computing devices 106 (i.e., determination block 456="Yes"), then the operational loop may continue with the operations in block 453. If there are no other descendant computing devices 106 for the selected participant computing device 105 (i.e., determination block 456="No"), in block 760 the selected participant computing device 105 may transmit a completion report message to the server 110, such as a transmission via the data link 711. The completion report may be any communication that indicates the selected participant computing device 105 has transmitted the facial/other characteristics data to all of its descendant computing devices 106 (e.g., all devices listed in the address book of the selected participant computing device 105), and may include the identifiers, count, and/or other information about the descendant computing devices 106 so that the server 110 may detect when messages are received from all such descendant computing devices 106.

In an embodiment, the selected participant computing device 105 may be configured to continue with the operations in block 453 based on messages transmitted to the participant computing device 105 by descendant computing devices 106 via the data link 472 (e.g., a confirmation message that a match exists, a denial message that no match exists, etc.). For example, the selected participant computing device 105 may detect that no match was found and proceed to the operations of block 453 based on a selected descendant's report message. Alternatively, the selected participant computing device 105 may continue with the operations in block 453 based on additional messages from the server 110 (e.g., periodic prompts when no matching information is detected).

In block 761, the server 110 may receive the completion report from the selected participant computing device 105, such as via the data link 711, and then may continue with the operations in block 752 by selecting a next device. For example, the server 110 may select the next participant computing device 105 from a list of all the participant computing devices 105 currently participating in the video call with the user computing device 102. In an embodiment, the server 110 may be configured to wait for the completion report before performing the operations in block 752, or alternatively may monitor for completion reports to be received from a plurality of participant computing devices 105. For example, start messages may be transmitted to all participant computing devices 105 related to a current video call and then the server 110 may monitor for completion report messages from each participant computing device 105.

In block 460, the selected descendant computing device 106 may receive the facial data within the request message from the selected participant computing device 105, such as via the data link 472. In block 461, the selected descendant computing device 106 may compare the received facial data to stored information, such as contact records stored within the address book of the descendant computing device 106, to find possible matches. The comparison procedure may be similar to the operations described above with reference to block 402. In block 770, the selected descendant computing device 106 may transmit a report message (or response message) to the server 110, such as a message including information describing the results of the comparison operations that is transmitted over a network (e.g., Internet, LAN, cellular network, etc.) via a data link 792. In an embodiment, the selected descendant computing device 106 may also transmit a report message to the selected participant computing device 105.

In determination block 771, the server 110 may determine whether the report message (or response message) from the selected descendant computing device 106 is received, such as via the data link 792 (e.g., over a LAN, cellular network, etc.). In an embodiment, the server 110 may continually or periodically monitor for received messages (or additional response messages), such as by evaluating a receiving circuit or buffer.

If the server 110 determines no report of contact information and facial data comparisons is received (i.e., determination block 771="No"), the server 110 may continue to perform the operations in determination block 771. For example, the server 110 may continually and/or periodically check for incoming messages to determine whether such reports are received from descendant computing devices 106.

If the server 110 determines that a report is received (i.e., determination block 771="Yes"), in block 772, the server 110 may store information about the descendant computing device 106 in a second list, such as the descendant computing device 106 contact information and/or identifier. The second list may be used to enable recursive operations for selecting devices and transmitting start message as described above.

In determination block 716, the server 110 may determine whether a match was found based on the received report message. If a match is determined to have been found (i.e., determination block 716="Yes"), in block 790 the server 110 may transmit the matching contact information to the user computing device 102, such as via the data link 701. In an embodiment, in response to receiving the message with the matching contact information from the server 110, the user computing device 102 may be configured to proceed with the operations in block 212 as described above with reference to FIG. 2.

If no match is determined to be found (i.e., determination block 716="No"), in determination block 774, the server 110 may determine whether more report messages are incoming. In other words, using information within the received completion report from the selected participant computing device 105 as described above, the server 110 may identify whether there are any outstanding report messages left to be received from descendant computing devices 106. For example, the server 110 may compare the second list to information within the completion report to determine whether an expected number of report messages have been received (e.g., one report message per each descendant computing device 106 related to the selected participant computing device 105). If it is determined that more reports are incoming (i.e., determination block 774="Yes"), the server 110 may continue with the operations in determination block 771.

If it is determined that no more reports are incoming from descendant computing devices 106 (i.e., determination block 774="No"), in determination block 776, the server 110 may determine whether to go to a next level, such as the next level in the operational loop of the method 700. In other words, the server 110 may determine whether to transmit start messages to the descendant computing devices 106 so that the facial data may be compared to devices close to the descendant computing devices 106. The determination in determination block 776 may be made based on a stored variable, bit, or other data within the server 110 that indicates how many iterations should be performed searching for a match with the facial data.

In some embodiments, the server 110 may be configured to only seek matches for a predefined number of levels (e.g., descendants) in order to prevent the method 700 from being performed indefinitely. In an embodiment, the determination in determination block 776 may be based on a timer, such that the server 110 may not try a next level of the search if the timer has exceeded a predefined time-out value. In another embodiment, the determination in determination block 776 may be based on the number of devices from which the server 110 has received report messages. For example, once a certain number of devices have not been able to find a match between the facial data and their stored contact information, the server 110 may be configured to end the method 700. If the server 110 determines not to go to a next level (i.e., determination block 776="No"), the method 700 may stop.

If the server 110 determines to go to a next level (i.e., determination block 776="Yes"), in block 778 the server 110 may set the second list as the new first list and may continue with the operations in block 752. For example, the server 110 may select and transmit a start message to a first descendant computing device 106 from the second list. In this way, the server 110 may continue performing the method 700 in a recursive manner such that the generated facial/other characteristics data is transmitted by descendant computing devices 106 to the contacts listed within the descendants' contact information databases (e.g., address books) until a match to the generated facial/other characteristics data is reported to the server 110.

The embodiment methods 200, 400, 600, and 700 are described above as performed by computing devices such that messages may be sent to participants and descendant contacts in a sequential fashion (i.e., "one-by-one"). However, the transmissions to the various participants' computing devices and any descendant contacts' computing devices may be initiated contemporaneously by the user device, a server, or any other device transmitting facial data for the purposes of identifying the unknown third-party. For example, the generated facial/other characteristics data may be sent to all video call participants' computing devices at the same time or in direct sequence. As a result, the various participants' computing devices, descendant contact devices, or any other devices conducting facial data evaluations may concurrently compare their stored information to received facial data from the user's computing device.

In the various embodiment methods 200, 400, 600, and 700, the user's computing device may generate lifespan or expiration time metadata for insertion into messages sent to participant computing devices, descendant computing devices, and any other computing device in the various embodiments. Using the lifespan or expiration metadata, the user's computing device may control the extent of the search for the unknown third-party and may avoid an infinite search (and corresponding messaging). The lifespan or expiration metadata may define a temporal period (or deadline) during which messaging regarding the identification of the unknown third-party (or associated facial data) may be transmitted. For example, the metadata may instruct recipients of messages to only act or respond to the message if the time of message receipt is before an expiration time of the request. Alternatively, the lifespan or expiration metadata may describe the number of levels of contacts that may be contacted before the search must end. For example, the metadata may include a counter that decrements each time a computing device receives a message requesting identification of the unknown third-party. When the counter is zero, the recipient computing device may ignore the received message, at which point the search will terminate.

Figure 8A:
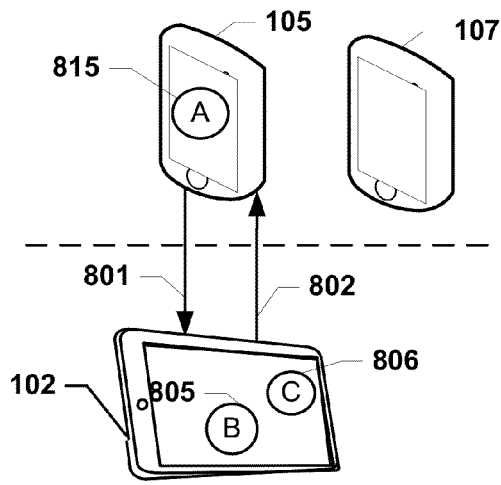
FIGS. 8A-8C are message flow diagrams illustrating various scenarios for exchanging video call data between users at various locations.
Figure 8B:
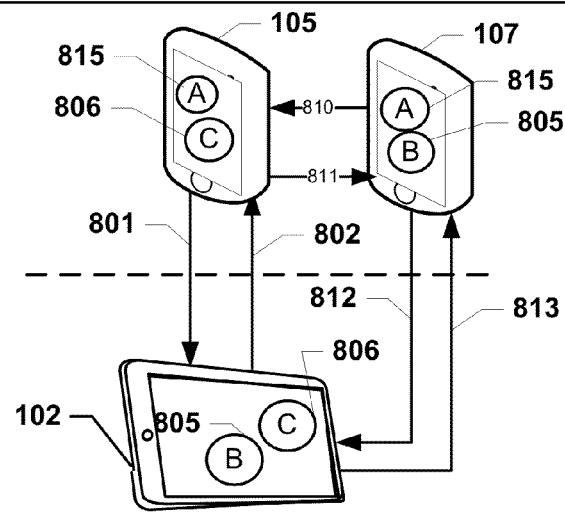
Figure 8C:
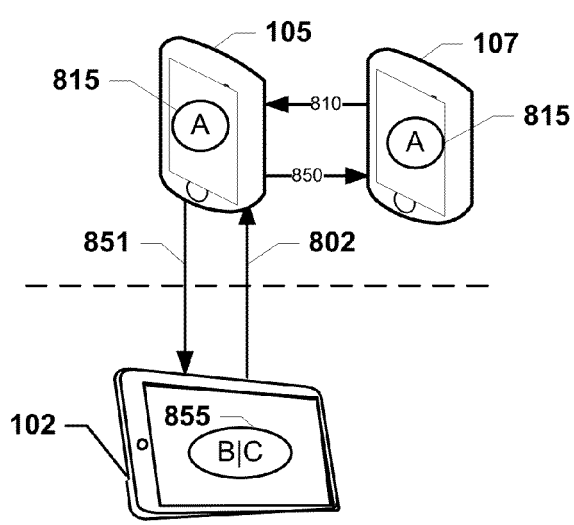

As discussed above, participants of a group video call may decide to admit an identified third-party located near a pre-existing participant of the video call. However, it may be burdensome for the participant to fix the video recording device (e.g., smart phone camera, web cam, etc.) on both the participant and the third-party. Additionally, it may be resource prohibitive to stream separate video data between all participants. FIGS. 8A-8C illustrate scenarios in which a near-proximity unknown third-party is identified and brought into a video call.

FIG. 8A illustrates an established video call between a user's computing device 102 and a participant computing device 105 at a remote location. The user's computing device 102 and the participant computing device 105 may each have video/audio data capturing and transmission capabilities, such as a video camera (with microphone) and a wireless signal transceiver connected to a processor. An unknown third-party computing device 107 of similar capabilities may be located at the same location and be in close physical proximity to the participant computing device 105, but not engaged in the data communication and/or video call with the user's computing device 102 or the participant computing device 105. The user's computing device 102 may capture and transmit video (and audio) data via signals 802 to the participant computing device 105, and likewise the participant computing device 105 may transmit data via signals 801. The user's computing device 102 may display/emit received video/audio data representing the user of the participant computing device (i.e., the participant likeness 805) and the participant computing device 105 may display/emit received video/audio data representing the user of the user's computing device (i.e., the user likeness 815). Additionally, the user computing device 102 may display the image of the user of the unknown third-party computing device (i.e., the third-party likeness 806), as the camera of the participant computing device 105 may have captured imagery of the unknown third-party. In an embodiment, the computing devices 102, 105, and 107 may be computing devices (e.g., smart phones or tablet devices), laptop computers, or desktop computers and any may utilize wired or wireless transmissions.

FIG. 8B illustrates a communication scenario that may occur in combination with the operations for discovering the identity of an unknown third-party as described above with reference to FIGS. 2-7B. For example, the user's computing device 102 may have displayed the unknown third-party likeness 806 (i.e., the image of the user of the unknown third-party computing device), and in response to the user's selection of the unknown third-party likeness 806 on a display unit, the user's computing device 102 may have performed operations to generate facial/other characteristics data, identify the unknown third-party, and obtain contact information for the third-party computing device 107.

Using the obtained contact information, the user's computing device 102 may transmit messages (e.g., emails, SMS text message, etc.) via signals 813 (e.g., communications using Internet protocols over a wide area network) to the third-party computing device 107 and may invite the third-party to participate in the video call. For example, the user's computing device 102 may transmit an email message to the third-party computing device 107 that provides a functional link, code, or instructions that enable the third-party computing device 107 to establish a video call link with the user's computing device 102. In response to receiving messages from the user computing device 102, the third-party computing device 107 may transmit data, such as video feed data, back to the user computing device 102 via signals 812, such as data packets over the Internet. Additionally, in an embodiment, the user computing device 102 may transmit the third-party computing device 107 contact information to the participant computing device 105 via signals 802 to enable the participant computing device 105 to contact the third-party computing device 107, such as via signals 811. For example, the participant computing device 105 may transmit its own contact information (e.g., video call contact information, user name, access code, etc.) to the third-party computing device 107 so that the third-party computing device 107 may transmit data directly to the participant computing device 105 via the signals 810.

Based on exchanged messages between the user's computing device 102, the participant computing device 105, and the third-party computing device 107, a three-way video call may be established in which all devices transmit video/audio data representing the various user likenesses 805, 806, 815 to the other devices. The computing devices 102, 105, 107 may exchange video/audio data through peer-to-peer data connections, local area networks, or any Internet protocol capable of transmitting real-time video calls. For example, the participant computing device 105 may transmit video feed data to the third-party computing device 107 via wireless signals 811 and the third-party computing device 107 may transmit video feed data to the participant computing device 105 via wireless signals 810. In an embodiment, all computing devices 102, 105, 107 may execute a communications software package or application for the delivery, receipt, and rendering of such video data.

In an embodiment, video call data originating from the participant computing device 105 and the third-party computing device 107 may be routed through the user's computing device 102 to the various parties. In other words, the participant computing device 105 and third-party computing device 107 may participate in the video call without transmitting data to each other directly.

FIG. 8C illustrates an alternative video call scenario that optimizes resources and reduces network impact by utilizing the proximity between the participant and the third-party. Having already established the video call with the participant computing device 105 and detected the contact information of the third-party computing device 107 as described above, the user's computing device 102 may estimate the distance between the participant computing device 105 and the third-party computing device 107 using gathered GPS coordinates, WiFi access information, short-range radio signal reports, manual indicators, or any other means as described above. Based on a determination that the computing devices 105, 107 are near each other (e.g., having a distance within a tolerance level), the user's computing device 102 may transmit messages instructing the participant computing device 105 (e.g., via the signals 802) and the third-party computing device 107 (e.g., via the signals 813 described above) to establish a local peer-to-peer data connection for exchanging video/audio streaming data. The user's computing device 102 may exchange video/audio data related to the video call exclusively with the participant computing device 105 via the signals 802, 851.

The participant computing device 105 may relay video/audio streaming data received from the user computing device 102 to the third-party computing device 107 via the signals 850. In response, the third-party computing device 107 may receive and display/emit the video/audio of the user likeness 815. The third-party computing device 107 may transmit video/audio data representing the third-party likeness 806 to the participant computing device 105 via the signals 810. The participant computing device 105 may not render the video/audio streaming data representing the third-party likeness 806 as the participant and third-party are in close physical proximity and may likely see one another. The participant computing device 105 may perform operations to merge the video/audio data representing the third-party likeness 806 with video/audio data representing the participant likeness 805 and send combined video data to the user's computing device 102 via the signals 851. The user's computing device 102 may display/emit the received video/audio of both the participant and third-party in one combined presentation 855.

In various embodiments, the various signals 801, 802, 810-813, 850-851 between the various devices 102, 105, 107 described above may be transmissions over a network, such as communications using Internet protocols over a telecommunications network. In other embodiments, the signals, 810, 811, and 850 may be wireless short-range transmissions and/or peer-to-peer transmissions.

Figure 9A:
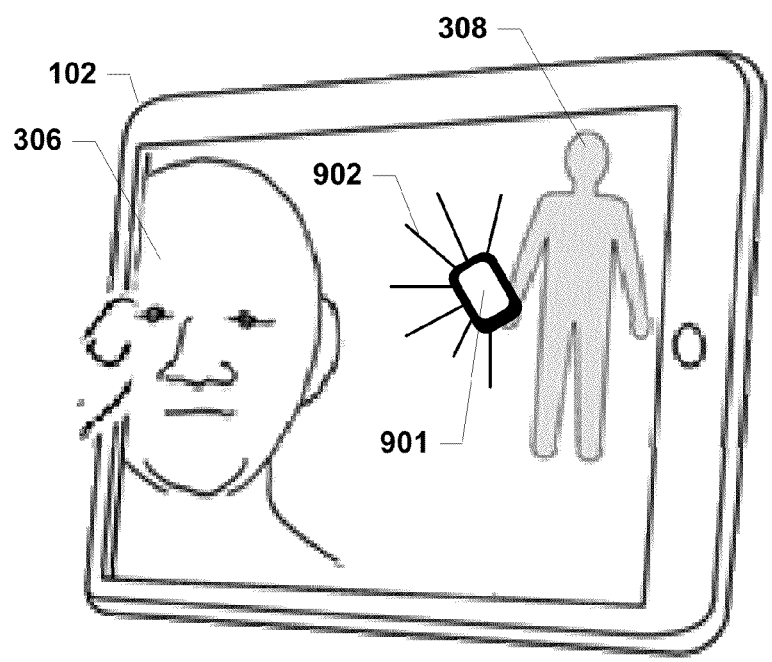
FIGS. 9A and 9B are perspective views of a tablet computer showing displays illustrating a video feed that includes signaling information related to an unknown third-party.
Figure 9B:
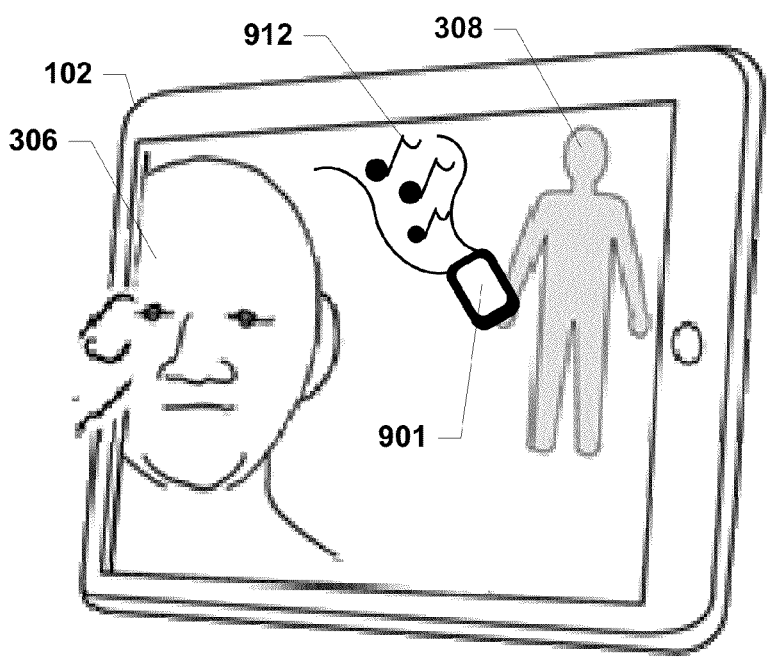

FIGS. 9A-9B illustrate an embodiment user computing device 102 displaying a video feed that includes signaling information related to an unknown third-party 308. As described above, the user computing device 102, such as a tablet mobile computing device, may be configured to detect signaling information within video feeds. For example, during an ongoing video call session (e.g., a Skype or FaceTime session) with a remote participant 306 utilizing a participant computing device (not shown), the user computing device 102 may analyze video/audio data of the video call to detect signaling information. In particular, the user computing device 102 may perform operations to analyze video call data to detect flashing/strobe lights, colored lights, symbols, and/or other visual signaling information. For example, in FIG. 9A, the user computing device 102 may detect flashing lights 902 rendered on a display of a computing device 901 carried by the unknown third-party (e.g., a smartphone). In another embodiment, the user computing device 102 may be configured to perform operations to analyze video call data to detect tweets, chirps, music, inaudible sounds, and other audio signaling information. For example, in FIG. 9B, the user computing device 102 may detect a musical pattern 912 emitted by a speaker of the computing device 901 carried by the unknown third-party.

In various embodiments, the user computing device 102 may be configured to continually analyze video call data to detect signaling information, or alternatively may perform operations to analyze video call data in response to detecting user input data. For example, the user computing device 102 may perform analysis of received video call data in response to detecting the user of the user computing device 102 tapped a section of a touchscreen that corresponds with visual signaling information. As another example, the user computing device 102 may perform analysis of received video call data in response to detecting the user of the user computing device 102 tapped a soft button configured to trigger an audio analysis routine executed by the processor of the user computing device 102.

Figure 9C:
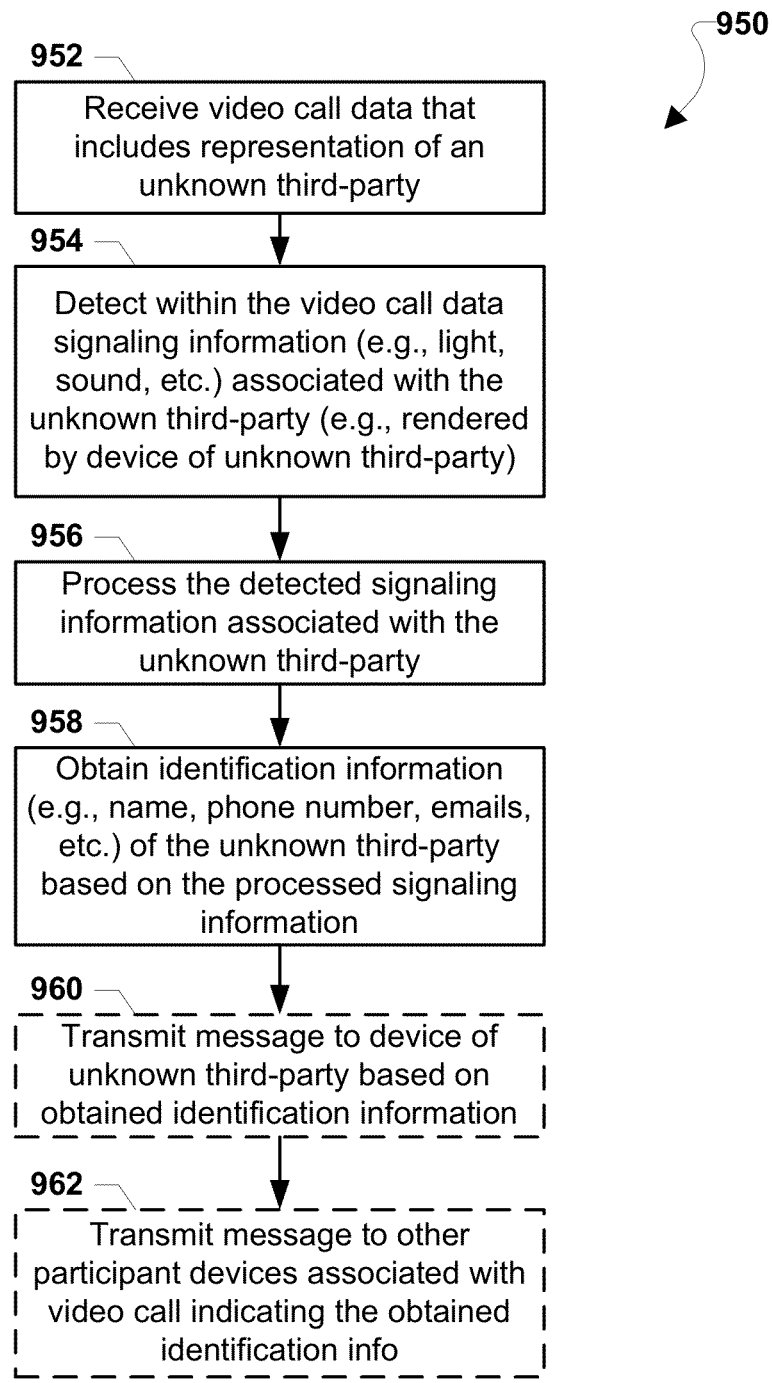
FIG. 9C is a process flow diagram illustrating an embodiment method for a computing device to identify an unknown third-party based on signaling information represented within video call data.

FIG. 9C illustrates an embodiment method 950 for a computing device to identify an unknown third-party based on signaling information represented within video call data. In various embodiments, operations of the method 950 may be performed by the computing device in place of or in combination with the various facial recognition operations and techniques for identifying unknown third-parties represented within video call data as described above. For example, the computing device may be configured to perform operations of the methods 200, 400, 600, or 700 described above in combination with the operations of the method 950, and may identify an unknown third-party based on facial imagery and/or signaling information associated with the third-party. As another example, while performing operations of the method 200, the computing device may identify an unknown third-party based on flashing light signaling information represented within the imagery of the video call data.

In block 952, the computing device may receive video call data that includes a representation of an unknown third-party, such as video imagery of an unknown person standing behind a video call participant. In block 954, the computing device may detect within the video call data signaling information, such as a sequence of flashing light or an audio sample, that is associated with the unknown third-party. Such signaling information may be originally produced by a device used by the unknown third-party, such as a smartphone rendering a sequence of lights or using its speakers to play a sound file. In an embodiment, the computing device may be configured to automatically and continually analyze rendered video data throughout the video call to detect special signaling information. For example, the computing device may perform routines as video data is rendered that identify areas in the imagery that have concentrated or otherwise visible lighting artifacts that may be related to known signaling techniques (e.g., Morse code, etc.). As another example, the computing device may continually perform audio analysis routines to any audio data related to the video call to determine whether any predefined audio samples (such as patterns of ultrasonic sounds) are present within the video call data. In an alternative embodiment, the received video data may or may not be associated with a video call. For example, the video data may be recorded as the user simply holds up the computing device to record imagery/sounds of individuals in plain sight.

In another embodiment, the computing device may be configured to detect signaling information in response to user inputs. For example, the computing device may detect a tapping user input on a touchscreen that coincides with a flashing light within the video call imagery. Such user inputs may indicate the presence, scope, type, and/or area of signaling information that may be detected within the video call data. For example, the computing device may detect that the user has pressed on a soft key that activates or deactivates routines that are performed by the computing device to detect only audio signaling (e.g., chirps, sound waves, etc.) or alternatively to detect visible signaling within a certain selected area within the video call imagery. In an embodiment, the computing device may be configured to be in a mode or operational state that causes the computing device to detect signaling information within video call data.

In block 956, the computing device may process the detected signaling information associated with the unknown third-party. The computing device may perform pattern-matching operations using a select portion of a video sequence, an image, and/or a sound sample to determine the meaning, message, or other information corresponding to the detected signaling information. For example, the computing device may analyze a select area of a certain number of video frames to identify a repeating message based on blinking lights rendered by an unknown third-party's smartphone screen in the background of the video call data. In an embodiment, the computing device may utilize a cipher to decode or otherwise convert the signaling information into useable information.

In block 958, the computing device may obtain identification information of the unknown third-party based on the processed signaling information. For example, based on a Morse code pattern identified in video call imagery, the computing device may obtain an IP address, a URI, a name, a phone number, an email address, and/or other information associated with the third-party holding the smartphone rendering the Morse code pattern. In various embodiments, the computing device may perform decoding, decryption, and other operations to remove obfuscations, such as scrambling filters on the detecting signaling information. For example, the processed signaling information may be translated into an encoded message that may only be decoded with a secret key. This may be valuable for ensuring that only devices of certain types of users, such as members of groups (e.g., clubs, schools, etc.), may be capable of obtaining identification information from signaling information.

In optional block 960, the computing device may transmit a message to the device of the unknown third-party based on the obtained identification information. For example, the computing device may use an email address obtained from a flashing light signaling to transmit an introduction message (e.g., "Hello!"), an invitation message to join a social group (e.g., LinkedIn invitation, etc.), and/or an invitation message to join the video call, such as a code, a link, or other information enabling the third-party to call-in.

In optional block 962, the computing device may transmit a message to other participant computing devices associated with the video call indicating the obtained identification information. For example, the contact information of the third-party may be shared with other members of the current video call so that the other participant computing devices may transmit invitation messages, greetings, digital business cards, or any other information or data to the device of the third-party. In an embodiment, the message to other participant computing devices may include codes, data, or information that indicates that a search for the identity of the third-party may be closed. In other words, when the computing device has performed operations of the methods 400, 600, or 700 described above but has subsequently obtained the identification information using the operations of the method 950, the computing device may transmit a stop message to the participant computing devices so that they may avoid expending unnecessary resources to identify the third-party.

The various embodiments may be implemented in any of a variety of tablet mobile computing devices, an example of which is illustrated in FIG. 10. For example, the tablet computing device 102 may include a processor 1001 coupled to internal memory 1002. The internal memory 1002 may be volatile or non-volatile memory, and may also be secure and/or encrypted memory, or unsecure and/or unencrypted memory, or any combination thereof. The processor 1001 may also be coupled to a touch screen display 1010, such as a resistive-sensing touch screen, capacitive-sensing touch screen infrared sensing touch screen, etc. The tablet computing device 102 may have one or more radio signal transceivers 1004 (e.g., Peanut, Bluetooth®, Zigbee®, WiFi, RF radio, etc.) and antennas 1008 for sending and receiving wireless signals as described herein. The transceivers 1004 and antennas 1008 may be used with the above-mentioned circuitry to implement the various wireless transmission protocol stacks and interfaces. The tablet computing device 102 may include a cellular network wireless modem chip 1020 that enables communication via a cellular network. The tablet computing device 102 may also include a physical button 1006 for receiving user inputs. The tablet computing device 102 may include a camera 1022 and a connected microphone 1023 configured to capture and store still images and video data with corresponding audio data.

The various embodiments may be implemented in any of a variety of mobile computing devices (e.g., smartphones, feature phones, etc.), a smartphone example of which is illustrated in FIG. 11. For example, a smartphone 105 may include a processor 1101 coupled to internal memory 1102. The internal memory 1102 may be volatile or non-volatile memory, and may also be secure and/or encrypted memory, or unsecure and/or unencrypted memory, or any combination thereof. The processor 1101 may also be coupled to a touch screen display 1106, such as a resistive-sensing touch screen, capacitive-sensing touch screen infrared sensing touch screen, etc. In an embodiment, the display 1106 of a smartphone computing device 105 need not have touch screen capability. A smartphone computing device 105 may have one or more radio signal transceivers 1118 (e.g., Peanut, Bluetooth®, Zigbee®, WiFi, RF radio, etc.) and antennas 1108 for sending and receiving wireless signals as described herein. The transceivers 1118 and antennas 1108 may be used with the above-mentioned circuitry to implement the various wireless transmission protocol stacks/interfaces. A smartphone computing device 105 may include a cellular network wireless modem chip 1120 that enables communication via a cellular network. A smartphone computing device 105 may also include physical buttons 1112a and 1112b for receiving user inputs. A smartphone computing device 105 may include a camera 1122 and a connected microphone 1123 configured to capture and store still images and video data with corresponding audio data.

Figure 12:
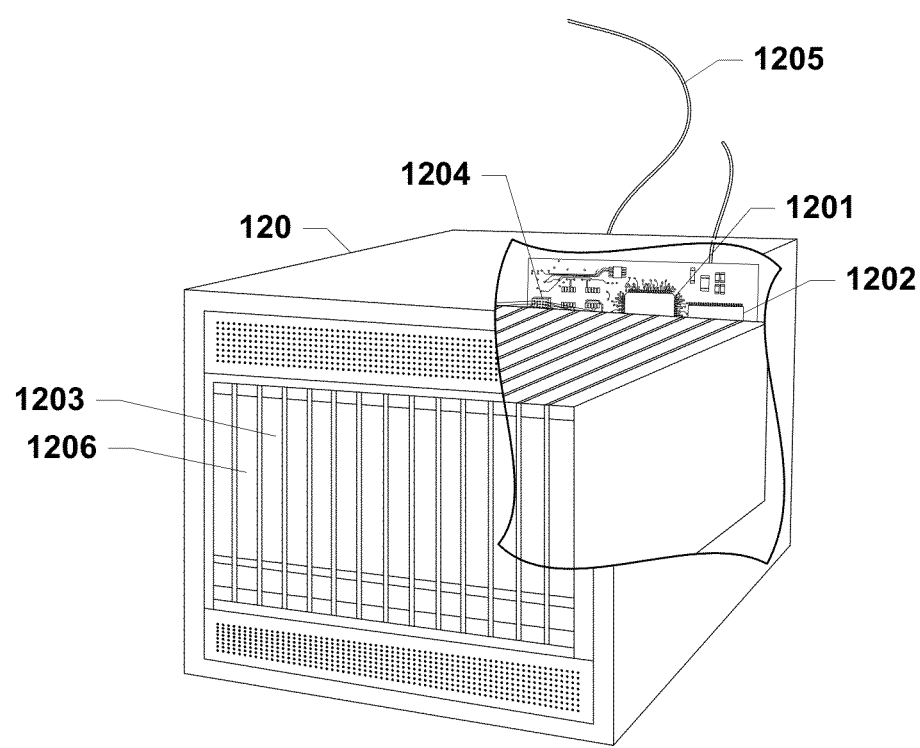
FIG. 12 is a component block diagram of an example server computing device suitable for use with the various embodiments.

The various embodiments may also be implemented on any of a variety of commercially available server devices, such as the server 110 illustrated in FIG. 12. Such a server 110 typically includes a processor 1201. In an embodiment, the server 110 may include multiple processor systems (not shown), one or more of which may be or include multi-core processors. The processor 1201 may be coupled to volatile internal memory 1202 and a large capacity nonvolatile memory, such as a disk drive 1203. The server 110 may also include a floppy disc drive, compact disc (CD) or DVD disc drive 1204 coupled to the processor 1201. The server 110 may also include network access ports 1206 (or network interfaces) coupled to the processor 1201 for establishing network interface connections with a network, such as a local area network coupled to other broadcast system computers and servers.

The processors 1001, 1101, and 1201 may be any programmable microprocessor, microcomputer or multiple processor chip or chips that can be configured by software instructions (applications) to perform a variety of functions, including the functions of the various embodiments described above. In the various devices, multiple processors may be provided, such as one processor dedicated to wireless communication functions and one processor dedicated to running other applications. Typically, software applications may be stored in the internal memory 1002, 1102, and 1202 before they are accessed and loaded into the processors 1001, 1101, and 1201. The processors 1001, 1101, and 1201 may include internal memory sufficient to store the application software instructions. In many devices the internal memory may be a volatile or nonvolatile memory, such as flash memory, or a mixture of both. For the purposes of this description, a general reference to memory refers to memory accessible by the processors 1001, 1101, and 1201 including internal memory or removable memory plugged into the various devices and memory within the processors 1001, 1101, and 1201.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory computer-readable or server-readable medium or a non-transitory processor-readable storage medium. The steps of a method or algorithm disclosed herein may be embodied in a processor-executable software module which may reside on a tangible, non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a non-transitory processor-readable storage medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for a user computing device participating in a video call to identify an unknown third-party imaged within the video call, comprising:
    applying image recognition techniques to an image of the unknown third-party within the video call to generate image characteristics data within the user computing device;
    determining whether the generated image characteristics data matches data within a first contacts database within the user computing device, wherein the data within the first contacts database includes at least a first image;
    transmitting a message that requests information regarding the unknown third-party in response to determining that the generated image characteristics data does not match the data within the first contacts database of the user computing device;
    receiving a response message corresponding to data within a second contacts database of another device, wherein the data within the second contacts database includes at least a second image;
    determining whether the generated image characteristics data matches the data within the second contacts database of the another device based on the received response message;
    obtaining contact information corresponding to the unknown third-party in response to determining that the generated image characteristics data matches data from at least one of the first contacts database or the second contacts database;
    transmitting, to a computing device associated with the obtained contact information, an identity confirmation message requesting location information of the computing device associated with the obtained contact information;
    receiving, in the user computing device, a message indicating location information of the computing device associated with the obtained contact information in response to transmitting the identity confirmation message;
    determining whether the computing device associated with the obtained contact information is close to a device participating in the video call based on the location information; and
    using the obtained contact information corresponding to the unknown third-party in response to determining that the computing device associated with the obtained contact information is close to the device participating in the video call.

2. The method of claim 1, wherein the message is transmitted to at least one of a computing device participating in the video call, a descendant computing device, and a server.

3. The method of claim 1, wherein the generated image characteristics data includes metadata information describing at least one of facial features, physical measurements, gender, race, weight, clothing attributes, location, body dimensions, hair color, tattoos, and group associations.

4. The method of claim 1, further comprising:
    detecting a user input to the user computing device indicating a selection within imagery of the video call, and wherein applying image recognition techniques to an image of the unknown third-party within the video call comprises applying facial recognition techniques to a face represented in the indicated selection within the imagery of the video call.

5. The method of claim 1, wherein:
    transmitting a message that requests the information regarding the unknown third-party in response to determining that the generated image characteristics data does not match the data within the first contacts database of the user computing device comprises transmitting a request message that includes the generated image characteristics data and that requests the another device to determine whether the generated image characteristics data matches data within the second contacts database of the another device;
    determining whether the generated image characteristics data matches the data within the second contacts database of the another device comprises determining whether the generated image characteristics data matches the data within the second contacts database of the another device based on information within the received response message that indicates whether a match was found in the second contacts database; and
    obtaining contact information corresponding to the unknown third-party in response to determining that the generated image characteristics data matches the data from the second contacts database comprises obtaining the contact information from the response message.

6. The method of claim 1, wherein:
    transmitting a message that requests the information regarding the unknown third-party in response to determining that the generated image characteristics data does not match the data within the first contacts database of the user computing device comprises transmitting a message that requests contact information data from the second contacts database of the another device;
    determining whether the generated image characteristics data matches the data within the second contacts database of the another device comprises determining whether the generated image characteristics data matches the data received in the response message; and
    obtaining contact information corresponding to the unknown third-party in response to determining that the generated image characteristics data matches the data from the second contacts database comprises obtaining the contact information from the response message.

7. The method of claim 1, wherein using the obtained contact information corresponding to the unknown third-party comprises:
    transmitting an invitation message to a computing device of the unknown third-party using the obtained contact information; and
    admitting the unknown third-party to the video call as a participant.

8. The method of claim 1, further comprising:
    detecting lip movement information associated with imagery of the unknown third-party appearing within the video call; and
    generating identifying audio data related to the unknown third-party based on the detected lip movement information and audio data of the video call, and
    wherein transmitting a message that requests the information regarding the unknown third-party comprises transmitting a request message that includes the generated identifying audio data and that requests the another device to determine whether the generated identifying audio data matches data within the second contacts database of the another device, and wherein the received response message indicates whether the generated identifying audio data matches audio data within the second contacts database.

9. The method of claim 1, wherein the obtained contact information for the unknown third-party includes contact information for a plurality of potential matches, the method further comprising:
transmitting, from the user computing device to a computing device associated with each of the plurality of potential matches, the identity confirmation message requesting location information of each potential match;
receiving, in the user computing device, messages indicating location information for each in the plurality of potential matches;
determining a proximity of each in the plurality of potential matches to devices participating in the video call based on the location information in the received messages indicating the location information for each in the plurality of potential matches;
in response to determining that multiple potential matches of the plurality of potential matches are close to the devices participating in the video call based on the determined proximities, transmitting a confirmation message to a computing device associated with each of the multiple potential matches; and
identifying the unknown third-party as a certain potential match of the plurality of potential matches in response to determining that only the certain potential match is close to one of the devices participating in the video call based on the determined proximities.

10. The method of claim 1, further comprising:
obtaining a second face image of the unknown third-party within the video call;
applying facial recognition techniques to the second face image of the unknown third-party within the video call to generate new image characteristics data within the user computing device in response to obtaining the second face image;
determining whether the new image characteristics data matches the data within the first contacts database within the user computing device; and
transmitting a second message that includes the new image characteristics data and that requests the information regarding the unknown third-party in response to determining that the new image characteristics data does not match the data within the first contacts database of the user computing device.

11. The method of claim 1, further comprising:
transmitting a message, to a computing device of an individual not participating in the video call, that includes the generated image characteristics data and requests the information regarding the unknown third-party in response to determining that the generated image characteristics data does not match the data within the first contacts database within the user computing device.

12. The method of claim 1, further comprising:
detecting, within the video call, signaling information associated with the unknown third-party; and
obtaining identification information of the unknown third-party based on processing of the detected signaling information, and
wherein the detected signaling information is at least one of a sound, an image, sequences of images, sequences of sound, a symbol, and any form of Morse code signaling.

13. The method of claim 1, wherein the another device is a first participant computing device in a plurality of devices participating in the video call, the method further comprising:
transmitting the message that requests the information regarding the unknown third-party to other computing devices in the plurality of devices participating in the video call in response to determining that the generated image characteristics data does not match the data from the second contacts database associated with the first participant computing device in the plurality of devices participating in the video call;
receiving response messages corresponding to data within contacts databases of the other computing devices in the plurality of devices participating in the video call;
determining whether the generated image characteristics data matches the data within the contacts databases of the other computing devices in the plurality of devices participating in the video call based on the received response messages; and
obtaining the contact information corresponding to the unknown third-party in response to determining that the generated image characteristics data matches data from at least one contacts database of the other computing devices in the plurality of devices participating in the video call.

14. The method of claim 13, further comprising:
transmitting, to all computing devices in the plurality of devices participating in the video call, messages that request the information regarding the unknown third-party from descendant computing devices indicated within contact databases of the computing devices in the plurality of devices participating in the video call in response to determining that the generated image characteristics data does not match data from any contacts database of the other computing devices in the plurality of devices participating in the video call, wherein the descendant computing devices are contacted by the computing devices in the plurality of devices participating in the video call in order of proximity to the computing devices in the plurality of devices participating in the video call;
receiving additional response messages corresponding to data within contacts databases of the descendant computing devices;
determining whether the generated image characteristics data matches the data within the contacts databases of the descendant computing devices based on the received additional response messages; and
obtaining the contact information corresponding to the unknown third-party in response to determining that the generated image characteristics data matches data from at least one contacts database of the descendant computing devices.

15. The method of claim 14, further comprising:
recursively transmitting additional messages that request the information regarding the unknown third-party from devices indicated within contacts databases of devices that have transmitted response messages received by the user computing device in response to determining that the generated image characteristics data does not match data from any of the contacts databases of the descendant computing devices, wherein the devices that have transmitted the response messages includes at least the descendant computing devices; and
determining whether to continue recursively transmitting the additional messages based on one of whether the user computing device has identified the unknown third-party based on received response messages, an elapsed timer, and a number of received response messages.

16. The method of claim 1, wherein determining whether the generated image characteristics data matches data within a first contacts database within the user computing device comprises comparing the generated image characteristics data to images within the first contacts database on the user computing device.

17. A user computing device, comprising:
means for applying image recognition techniques to an image of an unknown third-party within a video call to generate image characteristics data within the user computing device;
means for determining whether the generated image characteristics data matches data within a first contacts database within the user computing device, wherein the data within the first contacts database includes at least a first image;
means for transmitting a message that requests information regarding the unknown third-party in response to determining that the generated image characteristics data does not match the data within the first contacts database of the user computing device;
means for receiving a response message corresponding to data within a second contacts database of another device, wherein the data within the second contacts database includes at least a second image;
means for determining whether the generated image characteristics data matches the data within the second contacts database of the another device based on the received response message;
means for obtaining contact information corresponding to the unknown third-party in response to determining that the generated image characteristics data matches data from at least one of the first contacts database or the second contacts database;
means for transmitting, to a computing device associated with the obtained contact information, an identity confirmation message requesting location information of the computing device associated with the obtained contact information;
means for receiving a message indicating location information of the computing device associated with the obtained contact information in response to transmitting the identity confirmation message;
means for determining whether the computing device associated with the obtained contact information is close to a device participating in the video call based on the location information; and
means for using the obtained contact information corresponding to the unknown third-party in response to determining that the computing device associated with the obtained contact information is close to the device participating in the video call.

18. The user computing device of claim 17, wherein the message is transmitted to at least one of another computing device participating in the video call, a descendant computing device, and a server.

19. The user computing device of claim 17, wherein the generated image characteristics data includes metadata information describing at least one of facial features, physical measurements, gender, race, weight, clothing attributes, location, body dimensions, hair color, tattoos, and group associations.

20. The user computing device of claim 17, further comprising:
means for detecting a user input to the user computing device indicating a selection within imagery of the video call,
wherein means for applying image recognition techniques to an image of the unknown third-party within the video call comprises means for applying facial recognition techniques to a face represented in the indicated selection within the imagery of the video call.

21. The user computing device of claim 17, wherein:
means for transmitting a message that requests the information regarding the unknown third-party in response to determining that the generated image characteristics data does not match the data within the first contacts database of the user computing device comprises means for transmitting a request message that includes the generated image characteristics data and that requests the another device to determine whether the generated image characteristics data matches data within the second contacts database of the another device;
means for determining whether the generated image characteristics data matches the data within the second contacts database of the another device comprises means for determining whether the generated image characteristics data matches the data within the second contacts database of the another device based on information within the received response message that indicates whether a match was found in the second contacts database; and
means for obtaining contact information corresponding to the unknown third-party in response to determining that the generated image characteristics data matches the data from the second contacts database comprises means for obtaining the contact information from the response message.

22. The user computing device of claim 17, wherein:
means for transmitting a message that requests the information regarding the unknown third-party in response to determining that the generated image characteristics data does not match the data within the first contacts database of the user computing device comprises means for transmitting a message that requests contact information data from the second contacts database of the another device;
means for determining whether the generated image characteristics data matches the data within the second contacts database of the another device comprises means for determining whether the generated image characteristics data matches the data received in the response message, and
means for obtaining contact information corresponding to the unknown third-party in response to determining that the generated image characteristics data matches the data from the second contacts database comprises means for obtaining the contact information from the response message.

23. The user computing device of claim 17, wherein means for using the obtained contact information corresponding to the unknown third-party comprises:
means for transmitting an invitation message to a computing device of the unknown third-party using the obtained contact information; and
means for admitting the unknown third-party to the video call as a participant.

24. The user computing device of claim 17, further comprising:

means for detecting lip movement information associated with imagery of the unknown third-party appearing within the video call; and means for generating identifying audio data related to the unknown third-party based on the detected lip movement information and audio data of the video call, wherein means for transmitting a message that requests the information regarding the unknown third-party comprises means for transmitting a request message that includes the generated identifying audio data and that requests the another device to determine whether the generated identifying audio data matches data within the second contacts database of the another device, and wherein the received response message indicates whether the generated identifying audio data matches audio data within the second contacts database.

25. The user computing device of claim 17, wherein the obtained contact information for the unknown third-party includes contact information for a plurality of potential matches, the user computing device further comprising:

means for transmitting, from the user computing device to a computing device associated with each of the plurality of potential matches, the identity confirmation message requesting location information of each potential match;

means for receiving in the user computing device messages indicating location information for each in the plurality of potential matches;

means for determining a proximity of each in the plurality of potential matches to devices participating in the video call based on the location information in the received response messages indicating the location information for each in the plurality of potential matches;

means for transmitting a confirmation message to a computing device associated with each potential match of the plurality of potential matches determined to be close to the devices participating in the video call based on the determined proximities; and means for identifying the unknown third-party as a certain potential match of the plurality of potential matches in response to determining that only the certain potential match is close to one of the devices participating in the video call based on the determined proximities.

26. The user computing device of claim 17, further comprising:

means for obtaining a second face image of the unknown third-party within the video call;

means for applying facial recognition techniques to the second face image of the unknown third-party within the video call to generate new image characteristics data within the user computing device in response to obtaining the second face image;

means for determining whether the new image characteristics data matches the data within the first contacts database within the user computing device; and means for transmitting a second message that includes the new image characteristics data and that requests the information regarding the unknown third-party in response to determining that the new image characteristics data does not match the data within the first contacts database of the user computing device.

27. The user computing device of claim 17, further comprising means for transmitting a message, to a computing device of an individual not participating in the video call, that includes the generated image characteristics data and requests the information regarding the unknown third-party in response to determining that the generated image characteristics data does not match the data within the first contacts database within the user computing device.

28. The user computing device of claim 17, further comprising:

means for detecting, within the video call, signaling information associated with the unknown third-party; and means for obtaining identification information of the unknown third-party based on processing of the detected signaling information, and wherein the detected signaling information is at least one of a sound, an image, sequences of images, sequences of sound, a symbol, and any form of Morse code signaling.

29. The user computing device of claim 17, wherein the another device is a first participant computing device in a plurality of devices participating in the video call, the user computing device further comprising:

means for transmitting the message that requests the information regarding the unknown third-party to other computing devices in the plurality of devices participating in the video call in response to determining that the generated image characteristics data does not match the data from the second contacts database associated with the first participant computing device in the plurality of devices participating in the video call;

means for receiving response messages corresponding to data within contacts databases of the other computing devices in the plurality of devices participating in the video call;

means for determining whether the generated image characteristics data matches the data within the contacts databases of the other computing devices in the plurality of devices participating in the video call based on the received response messages; and means for obtaining the contact information corresponding to the unknown third-party in response to determining that the generated image characteristics data matches data from at least one contacts database of the other computing devices in the plurality of devices participating in the video call.

30. The user computing device of claim 29, further comprising:

means for transmitting, to all computing devices in the plurality of devices participating in the video call, messages that request the information regarding the unknown third-party from descendant computing devices indicated within contact databases of the computing devices in the plurality of devices participating in the video call in response to determining that the generated image characteristics data does not match data from any contacts database of the other computing devices in the plurality of devices participating in the video call, wherein the descendant computing devices are contacted by the computing devices in the plurality of devices participating in the video call in order of proximity to the computing devices in the plurality of devices participating in the video call;

means for receiving additional response messages corresponding to data within contacts databases of the descendant computing devices;

means for determining whether the generated image characteristics data matches the data within the contacts databases of the descendant computing devices based on the received additional response messages; and means for obtaining the contact information corresponding to the unknown third-party in response to determining that the generated image characteristics data matches data from at least one contacts database of the descendant computing devices.

31. The user computing device of claim 30, further comprising:
means for recursively transmitting additional messages that request the information regarding the unknown third-party from devices indicated within contacts databases of devices that have transmitted response messages received by the user computing device in response to determining that the generated image characteristics data does not match data from any of the contacts databases of the descendant computing devices, wherein the devices that have transmitted the response messages includes at least the descendant computing devices; and
means for determining whether to continue recursively transmitting the additional messages based on one of whether the user computing device has identified the unknown third-party based on received response messages, an elapsed timer, and a number of received response messages.

32. The user computing device of claim 17, wherein means for determining whether the generated image characteristics data matches data within a first contacts database within the user computing device comprises means for comparing the generated image characteristics data to images within the first contacts database on the user computing device.

33. A user computing device, comprising:
a memory; and
a processor coupled to the memory, wherein the processor is configured with processor-executable instructions to perform operations comprising:
applying image recognition techniques to an image of an unknown third-party within a video call to generate image characteristics data;
determining whether the generated image characteristics data matches data within a first contacts database stored in the memory, wherein the data within the first contacts database includes at least a first image;
transmitting a message that requests information regarding the unknown third-party in response to determining that the generated image characteristics data does not match the data within the first contacts database stored in the memory;
receiving a response message corresponding to data within a second contacts database of another device, wherein the data within the second contacts database includes at least a second image;
determining whether the generated image characteristics data matches the data within the second contacts database of the another device based on the received response message;
obtaining contact information corresponding to the unknown third-party in response to determining that the generated image characteristics data matches data from at least one of the first contacts database or the second contacts database;
transmitting, to a computing device associated with the obtained contact information, an identity confirmation message requesting location information of the computing device associated with the obtained contact information;
receiving a message indicating location information of the computing device associated with the obtained contact information in response to transmitting the identity confirmation message;
determining whether the computing device associated with the obtained contact information is close to a device participating in the video call based on the location information; and
using the obtained contact information corresponding to the unknown third-party in response to determining that the computing device associated with the obtained contact information is close to the device participating in the video call.

34. The user computing device of claim 33, wherein the processor is configured with processor-executable instructions to perform operations such that the message is transmitted to at least one of another computing device participating in the video call, a descendant computing device, and a server.

35. The user computing device of claim 33, wherein the processor is configured with processor-executable instructions to perform operations such that the generated image characteristics data includes metadata information describing at least one of facial features, physical measurements, gender, race, weight, clothing attributes, location, body dimensions, hair color, tattoos, and group associations.

36. The user computing device of claim 33, wherein the processor is configured with processor-executable instructions to perform operations further comprising:
detecting a user input to the user computing device indicating a selection within imagery of the video call, and
wherein the processor is configured with processor-executable instructions to perform operations such that applying image recognition techniques to an image of the unknown third-party within the video call comprises applying facial recognition techniques to a face represented in the indicated selection within the imagery of the video call.

37. The user computing device of claim 33, wherein the processor is configured with processor-executable instructions to perform operations such that:
transmitting a message that requests the information regarding the unknown third-party in response to determining that the generated image characteristics data does not match the data within the first contacts database stored in the memory comprises transmitting a request message that includes the generated image characteristics data and that requests the another device to determine whether the generated image characteristics data matches data within the second contacts database of the another device;
determining whether the generated image characteristics data matches the data within the second contacts database of the another device comprises determining whether the generated image characteristics data matches the data within the second contacts database of the another device based on information within the received response message that indicates whether a match was found in the second contacts database; and
obtaining contact information corresponding to the unknown third-party in response to determining that the generated image characteristics data matches the data from the second contacts database comprises obtaining the contact information from the response message.

38. The user computing device of claim 33, wherein the processor is configured with processor-executable instructions to perform operations such that:
transmitting a message that requests the information regarding the unknown third-party in response to determining that the generated image characteristics data does not match the data within the first contacts database stored in the memory comprises transmitting a message that requests contact information data from the second contacts database of the another device;

determining whether the generated image characteristics data matches the data within the second contacts database of the another device comprises determining whether the generated image characteristics data matches the data received in the response message; and obtaining contact information corresponding to the unknown third-party in response to determining that the generated image characteristics data matches the data from the second contacts database comprises obtaining the contact information from the response message.

39. The user computing device of claim 33, wherein the processor is configured with processor-executable instructions to perform operations such that using the obtained contact information corresponding to the unknown third-party comprises:

transmitting an invitation message to a computing device of the unknown third-party using the obtained contact information; and admitting the unknown third-party to the video call as a participant.

40. The user computing device of claim 33, wherein the processor is configured with processor-executable instructions to perform operations further comprising:

detecting lip movement information associated with imagery of the unknown third-party appearing within the video call; and generating identifying audio data related to the unknown third-party based on the detected lip movement information and audio data of the video call, wherein the processor is configured with processor-executable instructions to perform operations such that transmitting a message that requests the information regarding the unknown third-party comprises transmitting a request message that includes the generated identifying audio data and that requests the another device to determine whether the generated identifying audio data matches data within the second contacts database of the another device, and wherein the received response message indicates whether the generated identifying audio data matches audio data within the second contacts database.

41. The user computing device of claim 33, wherein the obtained contact information for the unknown third-party includes contact information for a plurality of potential matches and the processor is configured with processor-executable instructions to perform operations further comprising:

transmitting, from the user computing device to a computing device associated with each of the plurality of potential matches, the identity confirmation message requesting location information of each potential match;

receiving, in the user computing device, messages indicating location information for each in the plurality of potential matches;

determining a proximity of each in the plurality of potential matches to devices participating in the video call based on the location information in the received messages indicating the location information for each in the plurality of potential matches;

transmitting a confirmation message to a computing device associated with each potential match of the plurality of potential matches determined to be close to the devices participating in the video call based on the determined proximities; and identifying the unknown third-party as a certain potential match of the plurality of potential matches in response to determining that only the certain potential match is close to one of the devices participating in the video call based on the determined proximities.

42. The user computing device of claim 33, wherein the processor is configured with processor-executable instructions to perform operations further comprising:

obtaining a second face image of the unknown third-party within the video call;

applying facial recognition techniques to the second face image of the unknown third-party within the video call to generate new image characteristics data within the user computing device in response to obtaining the second face image;

determining whether the new image characteristics data matches the data within the first contacts database stored in the memory; and transmitting a second message that includes the new image characteristics data and that requests the information regarding the unknown third-party in response to determining that the new image characteristics data does not match the data within the first contacts database stored in the memory.

43. The user computing device of claim 33, wherein the processor is configured with processor-executable instructions to perform operations further comprising transmitting a message, to a computing device of an individual not participating in the video call, that includes the generated image characteristics data and requests the information regarding the unknown third-party in response to determining that the generated image characteristics data does not match the data within the first contacts database stored in the memory.

44. The user computing device of claim 33, wherein the processor is configured with processor-executable instructions to perform operations further comprising:

detecting, within the video call, signaling information associated with the unknown third-party; and obtaining identification information of the unknown third-party based on processing of the detected signaling information, and wherein the detected signaling information is at least one of a sound, an image, sequences of images, sequences of sound, a symbol, and any form of Morse code signaling.

45. The user computing device of claim 33, wherein the another device is a first participant computing device in a plurality of devices participating in the video call and the processor is configured with processor-executable instructions to perform operations further comprising:

transmitting the message that requests the information regarding the unknown third-party to other computing devices in the plurality of devices participating in the video call in response to determining that the generated image characteristics data does not match the data from the second contacts database associated with the first participant computing device in the plurality of devices participating in the video call;

receiving response messages corresponding to data within contacts databases of the other computing devices in the plurality of devices participating in the video call;

determining whether the generated image characteristics data matches the data within the contacts databases of the other computing devices in the plurality of devices participating in the video call based on the received response messages; and obtaining the contact information corresponding to the unknown third-party in response to determining that the generated image characteristics data matches data from at least one contacts database of the other computing devices in the plurality of devices participating in the video call.

46. The user computing device of claim 45, wherein the processor is configured with processor-executable instructions to perform operations further comprising:

transmitting, to all computing devices in the plurality of devices participating in the video call, messages that request the information regarding the unknown third-party from descendant computing devices indicated within contact databases of the computing devices in the plurality of devices participating in the video call in response to determining that the generated image characteristics data does not match data from any contacts database of the other computing devices in the plurality of devices participating in the video call, wherein the descendant computing devices are contacted by the computing devices in the plurality of devices participating in the video call in order of proximity to the computing devices in the plurality of devices participating in the video call;

receiving additional response messages corresponding to data within contacts databases of the descendant computing devices;

determining whether the generated image characteristics data matches the data within the contacts databases of the descendant computing devices based on the received additional response messages; and obtaining the contact information corresponding to the unknown third-party in response to determining that the generated image characteristics data matches data from at least one contacts database of the descendant computing devices.

47. The user computing device of claim 46, wherein the processor is configured with processor-executable instructions to perform operations further comprising:

recursively transmitting additional messages that request the information regarding the unknown third-party from devices indicated within contacts databases of devices that have transmitted response messages received by the user computing device in response to determining that the generated image characteristics data does not match data from any of the contacts databases of the descendant computing devices, wherein the devices that have transmitted the response messages includes at least the descendant computing devices; and determining whether to continue recursively transmitting the additional messages based on one of whether the user computing device has identified the unknown third-party based on received response messages, an elapsed timer, and a number of received response messages.

48. The user computing device of claim 33, wherein the processor is configured with processor-executable instructions to perform operations such that determining whether the generated image characteristics data matches data within a first contacts database stored in the memory comprises comparing the generated image characteristics data to images within the first contacts database stored in the memory.

49. A non-transitory processor-readable storage medium having stored thereon processor-executable instructions configured to cause a processor of a user computing device to perform operations comprising:

applying image recognition techniques to an image of an unknown third-party within a video call to generate image characteristics data within the user computing device;

determining whether the generated image characteristics data matches data within a first contacts database within the user computing device, wherein the data within the first contacts database includes at least a first image;

transmitting a message that requests information regarding the unknown third-party in response to determining that the generated image characteristics data does not match the data within the first contacts database of the user computing device;

receiving a response message corresponding to data within a second contacts database of another device, wherein the data within the second contacts database includes at least a second image;

determining whether the generated image characteristics data matches the data within the second contacts database of the another device based on the received response message;

obtaining contact information corresponding to the unknown third-party in response to determining that the generated image characteristics data matches data from at least one of the first contacts database or the second contacts database;

transmitting, to a computing device associated with the obtained contact information, an identity confirmation message requesting location information of the computing device associated with the obtained contact information;

receiving, in the user computing device, a message indicating location information of the computing device associated with the obtained contact information in response to transmitting the identity confirmation message;

determining whether the computing device associated with the obtained contact information is close to a device participating in the video call based on the location information; and using the obtained contact information corresponding to the unknown third-party in response to determining that the computing device associated with the obtained contact information is close to the device participating in the video call.

50. The non-transitory processor-readable storage medium of claim 49, wherein the message is transmitted to at least one of another computing device participating in the video call, a descendant computing device, and a server.

51. The non-transitory processor-readable storage medium of claim 49, wherein the generated image characteristics data includes metadata information describing at least one of facial features, physical measurements, gender, race, weight, clothing attributes, location, body dimensions, hair color, tattoos, and group associations.

52. The non-transitory processor-readable storage medium of claim 49, wherein the stored processor-executable instructions are configured to cause the processor to perform operations further comprising:

detecting a user input to the user computing device indicating a selection within imagery of the video call, and wherein the stored processor-executable instructions are configured to cause the processor to perform operations such that applying image recognition techniques to an image of the unknown third-party within the video call comprises applying facial recognition techniques to a face represented in the indicated selection within the imagery of the video call.

53. The non-transitory processor-readable storage medium of claim 49, wherein the stored processor-executable instructions are configured to cause the processor to perform operations such that:
- transmitting a message that requests the information regarding the unknown third-party in response to determining that the generated image characteristics data does not match the data within the first contacts database of the user computing device comprises transmitting a request message that includes the generated image characteristics data and that requests the another device to determine whether the generated image characteristics data matches data within the second contacts database of the another device;
- determining whether the generated image characteristics data matches the data within the second contacts database of the another device comprises determining whether the generated image characteristics data matches the data within the second contacts database of the another device based on information within the received response message that indicates whether a match was found in the second contacts database; and
- obtaining contact information corresponding to the unknown third-party in response to determining that the generated image characteristics data matches the data from the second contacts database comprises obtaining the contact information from the response message.

54. The non-transitory processor-readable storage medium of claim 49, wherein the stored processor-executable instructions are configured to cause the processor to perform operations such that:
- transmitting a message that requests the information regarding the unknown third-party in response to determining that the generated image characteristics data does not match the data within the first contacts database of the user computing device comprises transmitting a message that requests contact information data from the second contacts database of the another device;
- determining whether the generated image characteristics data matches the data within the second contacts database of the another device comprises determining whether the generated image characteristics data matches the data received in the response message; and
- obtaining contact information corresponding to the unknown third-party in response to determining that the generated image characteristics data matches the data from the second contacts database comprises obtaining the contact information from the response message.

55. The non-transitory processor-readable storage medium of claim 49, wherein the stored processor-executable instructions are configured to cause the processor to perform operations such that using the obtained contact information corresponding to the unknown third-party comprises:
- transmitting an invitation message to a computing device of the unknown third-party using the obtained contact information; and
- admitting the unknown third-party to the video call as a participant.

56. The non-transitory processor-readable storage medium of claim 49, wherein the stored processor-executable instructions are configured to cause the processor to perform operations further comprising:
- detecting lip movement information associated with imagery of the unknown third-party appearing within the video call; and
- generating identifying audio data related to the unknown third-party based on the detected lip movement information and audio data of the video call, and
- wherein the stored processor-executable instructions are configured to cause the processor to perform operations such that transmitting a message that requests the information regarding the unknown third-party comprises transmitting a request message that includes the generated identifying audio data and that requests the another device to determine whether the generated identifying audio data matches data within the second contacts database of the another device, and
- wherein the received response message indicates whether the generated identifying audio data matches audio data within the second contacts database.

57. The non-transitory processor-readable storage medium of claim 49, wherein the obtained contact information for the unknown third-party includes contact information for a plurality of potential matches and the stored processor-executable instructions are configured to cause the processor to perform operations further comprising:
- transmitting, from the user computing device to a computing device associated with each of the plurality of potential matches, the identity confirmation message requesting location information of each potential match;
- receiving, in the user computing device, messages indicating location information for each in the plurality of potential matches;
- determining a proximity of each in the plurality of potential matches to devices participating in the video call based on the location information in the received messages indicating the location information for each in the plurality of potential matches;
- transmitting a confirmation message to a computing device associated with each potential match of the plurality of potential matches determined to be close to the devices participating in the video call based on the determined proximities; and
- identifying the unknown third-party as a certain potential match of the plurality of potential matches in response to determining that only the certain potential match is close to one of the devices participating in the video call based on the determined proximities.

58. The non-transitory processor-readable storage medium of claim 49, wherein the stored processor-executable instructions are configured to cause the processor to perform operations further comprising:
- obtaining a second face image of the unknown third-party within the video call;
- applying facial recognition techniques to the second face image of the unknown third-party within the video call to generate new image characteristics data within the user computing device in response to obtaining the second face image;
- determining whether the new image characteristics data matches the data within the first contacts database within the user computing device; and
- transmitting a second message that includes the new image characteristics data and that requests the information regarding the unknown third-party in response to determining that the new image characteristics data does not match the data within the first contacts database of the user computing device.

59. The non-transitory processor-readable storage medium of claim 49, wherein the stored processor-executable instructions are configured to cause the processor to perform operations further comprising transmitting a message, to a computing device of an individual not participating in the video call, that includes the generated image characteristics data and requests the information regarding the unknown third-party in response to determining that the generated image characteristics data does not match the data within the first contacts database within the user computing device.

60. The non-transitory processor-readable storage medium of claim 49, wherein the stored processor-executable instructions are configured to cause the processor to perform operations further comprising:
  detecting, within the video call, signaling information associated with the unknown third-party; and
  obtaining identification information of the unknown third-party based on processing of the detected signaling information, and
  wherein the detected signaling information is at least one of a sound, an image, sequences of images, sequences of sound, a symbol, and any form of Morse code signaling.

61. The non-transitory processor-readable storage medium of claim 49, wherein the another device is a first participant computing device in a plurality of devices participating in the video call and the stored processor-executable instructions are configured to cause the processor to perform operations further comprising:
  transmitting the message that requests the information regarding the unknown third-party to other computing devices in the plurality of devices participating in the video call in response to determining that the generated image characteristics data does not match the data from the second contacts database associated with the first participant computing device in the plurality of devices participating in the video call;
  receiving response messages corresponding to data within contacts databases of the other computing devices in the plurality of devices participating in the video call;
  determining whether the generated image characteristics data matches the data within the contacts databases of the other computing devices in the plurality of devices participating in the video call based on the received response messages; and
  obtaining the contact information corresponding to the unknown third-party in response to determining that the generated image characteristics data matches data from at least one contacts database of the other computing devices in the plurality of devices participating in the video call.

62. The non-transitory processor-readable storage medium of claim 61, wherein the stored processor-executable instructions are configured to cause the processor to perform operations further comprising:
  transmitting, to all computing devices in the plurality of devices participating in the video call, messages that request the information regarding the unknown third-party from descendant computing devices indicated within contact databases of the computing devices in the plurality of devices participating in the video call in response to determining that the generated image characteristics data does not match data from any contacts database of the other computing devices in the plurality of devices participating in the video call, wherein the descendant computing devices are contacted by the computing devices in the plurality of devices participating in the video call in order of proximity to the computing devices in the plurality of devices participating in the video call;
  receiving additional response messages corresponding to data within contacts databases of the descendant computing devices;
  determining whether the generated image characteristics data matches the data within the contacts databases of the descendant computing devices based on the received additional response messages; and
  obtaining the contact information corresponding to the unknown third-party in response to determining that the generated image characteristics data matches data from at least one contacts database of the descendant computing devices.

63. The non-transitory processor-readable storage medium of claim 62, wherein the stored processor-executable instructions are configured to cause the processor to perform operations further comprising:
  recursively transmitting additional messages that request the information regarding the unknown third-party from devices indicated within contacts databases of devices that have transmitted response messages received by the user computing device in response to determining that the generated image characteristics data does not match data from any of the contacts databases of the descendant computing devices, wherein the devices that have transmitted the response messages includes at least the descendant computing devices; and
  determining whether to continue recursively transmitting the additional messages based on one of whether the user computing device has identified the unknown third-party based on received response messages, an elapsed timer, and a number of received response messages.

64. The non-transitory processor-readable storage medium of claim 49, wherein the stored processor-executable instructions are configured to cause the processor to perform operations such that determining whether the generated image characteristics data matches data within a first contacts database within the user computing device comprises comparing the generated image characteristics data to images within the first contacts database on the user computing device.

65. A system, comprising a plurality of computing devices including a first computing device, and a second computing device,
  wherein the first computing device comprises:
    a first memory;
    a first transceiver configured to communicate with a network; and
    a first processor coupled to the first memory and the first transceiver, and configured with processor-executable instructions to perform operations comprising:
      applying image recognition techniques to an image of an unknown third-party within a video call to generate image characteristics data within the first computing device;
      determining whether the generated image characteristics data matches data within a first contacts database within the first computing device, wherein the data within the first contacts database includes at least a first image;
      transmitting, via the first transceiver, a message to the second computing device that requests information regarding the unknown third-party in response to determining that the generated image characteristics data does not match the data within the first contacts database of the first computing device;
      receiving, via the first transceiver, a response message from the second computing device corresponding to data within a second contacts database of the second computing device;

determining whether the generated image characteristics data matches the data within the second contacts database of the second computing device based on the received response message;

obtaining contact information corresponding to the unknown third-party in response to determining that the generated image characteristics data matches data from at least one of the first contacts database or the second contacts database;

transmitting, via the first transceiver to a computing device associated with the obtained contact information, an identity confirmation message requesting location information of the computing device associated with the obtained contact information;

receiving, via the first transceiver, a message indicating location information of the computing device associated with the obtained contact information in response to transmitting the identity confirmation message;

determining whether the computing device associated with the obtained contact information is close to a device participating in the video call based on the location information; and using the obtained contact information corresponding to the unknown third-party in response to determining that the computing device associated with the obtained contact information is close to the device participating in the video call, and wherein the second computing device comprises:
a second memory;
a second transceiver configured to communicate with the network; and
a second processor coupled to the second memory and the second transceiver, and configured with processor-executable instructions to perform operations comprising:
receiving, via the second transceiver, the message from the first computing device that requests the information regarding the unknown third-party; and
transmitting, to the first computing device via the second transceiver, the response message corresponding to the data within the second contacts database.

66. The system of claim 65, wherein the second computing device is participating in the video call.

67. The system of claim 65, wherein the generated image characteristics data includes metadata information describing at least one of facial features, physical measurements, gender, race, weight, clothing attributes, location, body dimensions, hair color, tattoos, and group associations.

68. The system of claim 65, wherein the first processor is configured with processor-executable instructions to perform operations further comprising:
detecting a user input to the first computing device indicating a selection within imagery of the video call, and
wherein the first processor is configured with processor-executable instructions to perform operations such that applying image recognition techniques to an image of the unknown third-party within the video call comprises applying facial recognition techniques to a face represented in the indicated selection within the imagery of the video call.

69. The system of claim 65, wherein the first processor is configured with processor-executable instructions to perform operations such that transmitting, via the first transceiver, a message to the second computing device that requests the information regarding the unknown third-party in response to determining that the generated image characteristics data does not match the data within the first contacts database of the first computing device comprises:
transmitting, to the second computing device via the first transceiver, a request message that includes the generated image characteristics data and that requests the second computing device to determine whether the generated image characteristics data matches the data within the second contacts database, and wherein the first processor is configured with processor-executable instructions to perform operations such that determining whether the generated image characteristics data matches the data within the second contacts database of the second computing device based on the received response message comprises determining whether the generated image characteristics data matches the data within the second contacts database of the second computing device based on information within the received response message that indicates whether a match was found in the second contacts database, and wherein the first processor is configured with processor-executable instructions to perform operations such that obtaining contact information corresponding to the unknown third-party in response to determining that the generated image characteristics data matches data from at least one of the first contacts database or the second contacts database comprises obtaining the contact information from the response message, and wherein the second processor is configured with processor-executable instructions to perform operations such that receiving, via the second transceiver, the message from the first computing device that requests the information regarding the unknown third-party comprises:
receiving, via the second transceiver, the message that requests the information regarding the unknown third-party, wherein the message includes the image characteristics data; and
determining whether the received image characteristics data matches the data within the second contacts database, and wherein the second processor is configured with processor-executable instructions to perform operations such that transmitting, to the first computing device via the second transceiver, the response message corresponding to the data within the second contacts database comprises transmitting, to the first computing device via the second transceiver, the response message that indicates whether the received image characteristics data matches the data within the second contacts database.

70. The system of claim 69, wherein the second processor is configured with processor-executable instructions to perform operations such that determining whether the received image characteristics data matches the data within the second contacts database comprises comparing the received image characteristics data to images within the second contacts database.

71. The system of claim 69, wherein the second processor is configured with processor-executable instructions to perform operations such that determining whether the received image characteristics data matches the data within the second contacts database comprises determining whether audio data within the received message matches audio data within the second contacts database.

72. The system of claim 69, wherein the second processor is configured with processor-executable instructions to perform operations further comprising:
- identifying devices that are indicated in the data of the second contacts database and that are close to the second computing device; and
- transmitting, to the identified devices, messages including the received image characteristics data and requesting the information regarding the unknown third-party in response to determining that the image characteristics data does not match any data within the second contacts database stored on the second computing device.

73. The system of claim 65, wherein the first processor is configured with processor-executable instructions to perform operations such that transmitting, via the first transceiver, a message to the second computing device that requests the information regarding the unknown third-party in response to determining that the generated image characteristics data does not match the data within the first contacts database of the first computing device comprises:
- transmitting, via the first transceiver, the message to the second computing device that requests contact information data from the second contacts database of the second computing device, and
- wherein the first processor is configured with processor-executable instructions to perform operations such that determining whether the generated image characteristics data matches the data within the second contacts database of the second computing device based on the received response message comprises determining whether the generated image characteristics data matches the data received in the response message, and
- wherein the first processor is configured with processor-executable instructions to perform operations such that obtaining contact information corresponding to the unknown third-party in response to determining that the generated image characteristics data matches data from at least one of the first contacts database or the second contacts database comprises obtaining the contact information from the response message, and
- wherein the second processor is configured with processor-executable instructions to perform operations such that transmitting, to the first computing device via the second transceiver, the response message corresponding to the data within the second contacts database comprises transmitting, to the first computing device via the second transceiver, the response message including the data of the second contacts database.

74. The system of claim 65, wherein the first processor is configured with processor-executable instructions to perform operations such that using the obtained contact information corresponding to the unknown third-party comprises:
- admitting the unknown third-party to the video call as a participant based on the obtained contact information.

75. The system of claim 65, wherein the first processor is configured with processor-executable instructions to perform operations further comprising:
- detecting lip movement information associated with imagery of the unknown third-party appearing within the video call; and
- generating identifying audio data related to the unknown third-party based on the detected lip movement information and audio data of the video call, and
- wherein the first processor is configured with processor-executable instructions to perform operations such that transmitting, via the first transceiver, a message to the second computing device that requests the information regarding the unknown third-party in response to determining that the generated image characteristics data does not match the data within the first contacts database of the first computing device comprises transmitting, via the first transceiver, a request message that includes the generated identifying audio data and that requests the second computing device to determine whether the generated identifying audio data matches data within the second contacts database.

76. The system of claim 65, wherein the obtained contact information for the unknown third-party includes contact information for a plurality of potential matches, the system further comprising a plurality of devices associated with the plurality of potential matches,
- wherein the first processor is configured with processor-executable instructions to perform operations further comprising:
  - transmitting, via the first transceiver to each of the plurality of devices associated with the plurality of potential matches, the identity confirmation message requesting location information of each potential match;
  - receiving, via the first transceiver from the plurality of devices associated with the plurality of potential matches, messages indicating location information for each in the plurality of potential matches;
  - determining a proximity of each in the plurality of potential matches to devices participating in the video call based on the location information in the received messages indicating the location information for each in the plurality of potential matches;
  - transmitting, via the first transceiver, confirmation messages to devices associated with potential matches of the plurality of potential matches that are determined to be close to the devices participating in the video call based on the determined proximities; and
  - identifying the unknown third-party as a certain potential match of the plurality of potential matches in response to determining that only the certain potential match is close to one of the devices participating in the video call based on the determined proximities, and
- wherein each device of the plurality of devices associated with the plurality of potential matches comprises:
  - a third memory;
  - a third transceiver configured to communicate with the network; and
  - a third processor coupled to the third memory and the third transceiver, and configured with processor-executable instructions to perform operations comprising:
    - receiving, from the first computing device via the third transceiver, the identity confirmation message requesting location information of each potential match; and
    - transmitting, via the third transceiver to the first computing device, one of the response messages indicating the location information.

77. The system of claim 65, wherein the first processor is configured with processor-executable instructions to perform operations further comprising:
- obtaining a second face image of the unknown third-party within the video call;
- applying facial recognition techniques to the second face image of the unknown third-party within the video call to generate new image characteristics data within the first computing device in response to obtaining the second face image;

determining whether the new image characteristics data matches the data within the first contacts database within the first computing device; and transmitting, to the second computing device via the first transceiver, a second message that includes the new image characteristics data and that requests the information regarding the unknown third-party in response to determining that the new image characteristics data does not match the data within the first contacts database of the first computing device.

78. The system of claim 65, further comprising:
a third computing device of an individual not participating in the video call, and
wherein the first processor is configured with processor-executable instructions to perform operations further comprising transmitting, via the first transceiver, a third message to the third computing device of the individual not participating in the video call that includes the generated image characteristics data and requests the information regarding the unknown third-party in response to determining that the generated image characteristics data does not match the data within the first contacts database within the first computing device.

79. The system of claim 65, wherein the first processor is configured with processor-executable instructions to perform operations further comprising:
detecting, within the video call, signaling information associated with the unknown third-party; and
obtaining identification information of the unknown third-party based on processing of the detected signaling information, and
wherein the detected signaling information is at least one of a sound, an image, sequences of images, sequences of sound, a symbol, and any form of Morse code signaling.

80. The system of claim 65, further comprising:
a plurality of devices participating in the video call, and
wherein the first processor is configured with processor-executable instructions to perform operations further comprising:
transmitting, via the first transceiver, messages that request the information regarding the unknown third-party to the plurality of devices participating in the video call in response to determining that the generated image characteristics data does not match the data from the second contacts database;
receiving, via the first transceiver, response messages corresponding to data within contacts databases of the plurality of devices participating in the video call;
determining whether the generated image characteristics data matches the data within the contacts databases of the plurality of devices participating in the video call based on the received response messages; and
obtaining the contact information corresponding to the unknown third-party in response to determining that the generated image characteristics data matches data from at least one contacts database of the plurality of devices participating in the video call, and
wherein each in the plurality of devices participating in the video call comprises:
a third memory;
a third transceiver configured to communicate with the network; and
a third processor coupled to the third memory and the third transceiver, and configured with processor-executable instructions to perform operations comprising:
receiving, via the third transceiver, one of the messages that request the information regarding the unknown third-party from the first computing device; and
transmitting, to the first computing device via the third transceiver, one of the response messages corresponding to the data within the contacts databases of the plurality of devices participating in the video call.

81. The system of claim 80, further comprising:
a plurality of descendant computing devices indicated within contact databases of the plurality of devices participating in the video call, and
wherein the first processor is configured with processor-executable instructions to perform operations further comprising:
transmitting, via the first transceiver to the plurality of devices participating in the video call, messages that request the information regarding the unknown third-party from the plurality of descendant computing devices in response to determining that the generated image characteristics data does not match data from any contacts database of the plurality of devices participating in the video call, wherein the second computing device is within the plurality of devices participating in the video call;
receiving, via the first transceiver, additional response messages corresponding to data within contacts databases of the plurality of descendant computing devices;
determining whether the generated image characteristics data matches the data within the contacts databases of the plurality of descendant computing devices based on the received additional response messages; and
obtaining the contact information corresponding to the unknown third-party in response to determining that the generated image characteristics data matches data from at least one contacts database of the plurality of descendant computing devices, and
wherein the third processor of each of the plurality of devices participating in the video call is configured with processor-executable instructions to perform operations further comprising transmitting, via the third transceiver, the messages that request the information regarding the unknown third-party to the plurality of descendant computing devices, wherein the plurality of descendant computing devices are contacted in order of proximity to the plurality of devices participating in the video call, and
wherein each of the plurality of descendant computing devices comprises:
a fourth memory;
a fourth transceiver configured to communicate with the network; and
a fourth processor coupled to the fourth memory and the fourth transceiver, and configured with processor-executable instructions to perform operations comprising:
receiving, via the fourth transceiver, one of the messages that request the information regarding the unknown third-party from the plurality of devices participating in the video call; and
transmitting, via the fourth transceiver to the first computing device, one of the additional response messages corresponding to the data within the contacts databases of the plurality of descendant computing devices.

82. The system of claim 81, wherein the first processor is configured with processor-executable instructions to perform operations further comprising:

recursively transmitting, via the first transceiver, additional messages that request the information regarding the unknown third-party from devices indicated within contacts databases of devices that have transmitted response messages received by the first computing device in response to determining that the generated image characteristics data does not match data from any contacts database of the plurality of descendant computing devices, wherein the devices that have transmitted the response messages includes at least the plurality of descendant computing devices; and determining whether to continue recursively transmitting the additional messages based on one of whether the first computing device has identified the unknown third-party based on received response messages, an elapsed timer, and a number of received response messages.

83. The system of claim 65, wherein the first processor is configured with processor-executable instructions to perform operations such that determining whether the generated image characteristics data matches data within a first contacts database within the first computing device comprises comparing the generated image characteristics data to images within the first contacts database on the first computing device.

* * * * *